United States Patent
Kim et al.

(10) Patent No.: US 11,999,847 B2
(45) Date of Patent: Jun. 4, 2024

(54) BIODEGRADABLE MOLDED ARTICLE AND BIODEGRADABLE POLYESTER RESIN COMPOSITION

(71) Applicant: Ecovance Co. Ltd., Gyeonggi-do (KR)

(72) Inventors: Seong Dong Kim, Gyeonggi-do (KR); Kyung Youn Kim, Gyeonggi-do (KR); Hoon Kim, Gyeonggi-do (KR); Jun Su Byeon, Gyeonggi-do (KR); Hye Jin Kim, Gyeonggi-do (KR)

(73) Assignee: ECOVANCE CO. LTD., Gyeonggi-Do (KR)

(*) Notice: Subject to any disclaimer, the term of this patent is extended or adjusted under 35 U.S.C. 154(b) by 0 days.

(21) Appl. No.: 18/320,795

(22) Filed: May 19, 2023

(65) Prior Publication Data
US 2023/0374297 A1    Nov. 23, 2023

(30) Foreign Application Priority Data

May 21, 2022   (KR) .................. 10-2022-0062440
May 21, 2022   (KR) .................. 10-2022-0062442

(51) Int. Cl.
| | | |
|---|---|---|
| *C08L 67/02* | (2006.01) | |
| *C08J 3/28* | (2006.01) | |
| *C08J 5/18* | (2006.01) | |
| *C08K 3/014* | (2018.01) | |
| *C08K 5/11* | (2006.01) | |
| *C08K 5/1535* | (2006.01) | |

(52) U.S. Cl.
CPC .................. *C08L 67/02* (2013.01); *C08J 3/28* (2013.01); *C08J 5/18* (2013.01); *C08K 3/014* (2018.01); *C08K 5/11* (2013.01); *C08K 5/1535* (2013.01); *C08J 2367/02* (2013.01); *C08L 2201/06* (2013.01); *C08L 2205/24* (2013.01)

(58) Field of Classification Search
None
See application file for complete search history.

(56) References Cited

U.S. PATENT DOCUMENTS

| | | |
|---|---|---|
| 8,747,974 B2 | 6/2014 | Nakano et al. |
| 2006/0173106 A1 | 8/2006 | McKenna et al. |

FOREIGN PATENT DOCUMENTS

| | | | |
|---|---|---|---|
| CA | 2775176 A1 | * | 5/2011 |
| CA | 2938142 C | * | 2/2022 |
| CN | 114292387 A | | 4/2022 |
| JP | H4-335060 A | | 11/1992 |
| JP | 3105020 B2 | | 10/2000 |

(Continued)

OTHER PUBLICATIONS 2-page brochure for Ecoflex F BX 7011 by BASF, downloaded on Jul. 10, 2023.*

(Continued)

*Primary Examiner* — Tae H Yoon
(74) *Attorney, Agent, or Firm* — IP & T GROUP LLP

(57) ABSTRACT

An eco-friendly biodegradable molded article, including: a polyester resin including a diol, an aromatic dicarboxylic acid and an aliphatic dicarboxylic acid, wherein, when continuously irradiated with ultraviolet rays from a UVA 340 ultraviolet light lamp at an intensity of 0.75 $W/m^2$, a tensile strength decrease rate from the beginning of the ultraviolet irradiation to 1 day ranges from 5% to 40%.

16 Claims, 2 Drawing Sheets

(56) References Cited

FOREIGN PATENT DOCUMENTS

| | | | |
|---|---|---|---|
| JP | 2014-156541 A | | 8/2014 |
| JP | 2014156540 A | * | 8/2014 |
| KR | 10-2001-0055721 A | | 7/2001 |
| KR | 2003-0011358 A | | 2/2003 |
| KR | 10-2010-0039458 A | | 4/2010 |
| KR | 10-2013-0075997 A | | 7/2013 |
| KR | 20190019541 A | * | 1/2019 |
| KR | 10-1998502 B1 | | 7/2019 |
| KR | 10-2020-0030165 A | | 3/2020 |
| KR | 10-2020-0060091 A | | 5/2020 |
| KR | 10-2269358 B1 | | 6/2021 |
| KR | 10-2022-0015623 A | | 2/2022 |
| WO | 2021/141236 A1 | | 7/2021 |

OTHER PUBLICATIONS 1-page brochure for hindered amine light stabilizer SUNOVIN 904 (CAS. No. 70624-18-9), downloaded on Jul. 11, 2023.*

Piotr Rychter et al., Study of Aliphatic-Aromatic Copolyester Degradation in Sandy Soil and Its Ecotoxicological Impact, Biomacromolecules, vol. 11, Mar. 1, 2010, pp. 839-847.

Extended European Search Report for the European Patent Application No. 23174227.1 issued by the European Patent Office dated Jul. 27, 2023.

International Search Report for the International Application No. PCT/KR2023/004723 issued by the International Searching Authority (Korean Intellectual Property Office) dated Aug. 7, 2023.

* cited by examiner

BIODEGRADABLE MOLDED ARTICLE AND BIODEGRADABLE POLYESTER RESIN COMPOSITION

CROSS-REFERENCE TO RELATED APPLICATION

This application claims priority to and the benefit of Korean Patent Application Nos. 10-2022-0062440, filed on May 21, 2022, and 10-2022-0062442, filed on May 21, 2022, the disclosure of which is incorporated herein by reference in its entirety.

BACKGROUND OF THE INVENTION

1. Field of the Invention

Embodiments relate to a biodegradable molded article, a biodegradable polyester resin composition and a biodegradable polyester film.

2. Description of Related Art

Recently, a solution to the handling various household items, especially disposable products, is required as concerns about environmental problems increase. Specifically, polymeric materials are inexpensive and have excellent processability properties, so they are widely used to manufacture various products such as films, fibers, packaging materials, bottles, containers, etc. However, polymer materials have the disadvantage that harmful substances are emitted when incinerated when the lifespan of a product is over, and it takes hundreds of years depending on the types thereof to completely decompose them naturally.

To address this concern, research on biodegradable polymers that are decomposed within a short period of time is being actively conducted. As examples of biodegradable polymers, polylactic acid (PLA), polybutyleneadipate terephthalate (PBAT), polybutylene succinate (PBS), and the like are being used.

Such biodegradable resin compositions are described in Korean Patent Application No. 2012-0103158, and the like.

SUMMARY OF THE INVENTION

Therefore, the present disclosure has been made in view of the above concerns, and one attribute of the present disclosure provides a biodegradable molded article and polyester resin composition that have high biodegradability while being highly resistant to ultraviolet rays and have improved mechanical properties, and a polyester film including the polyester resin composition.

In accordance with one aspect of the present disclosure, the above and other objects can be accomplished by the provision of a biodegradable molded article, including: a polyester resin including a diol, an aromatic dicarboxylic acid and an aliphatic dicarboxylic acid, wherein, when irradiated with ultraviolet rays from a UVA 340 ultraviolet light lamp at an intensity of 0.75 W/m$^2$, a tensile strength decrease rate from a beginning of the ultraviolet irradiation to 1 day is 5% to 40% based on a thickness of 300 μm.

The biodegradable molded article according to one embodiment may include nanocellulose that has an average diameter of 0.5 nm to 10 nm and an average length of 20 nm to 300 nm and includes a metal.

The biodegradable molded article according to one embodiment may include a light stabilizer that has a weight average molecular weight of 1800 g/mol to 5000 g/mol.

In accordance with another aspect of the present disclosure, there is provided a biodegradable polyester resin composition, including: a polyester resin including a diol, an aromatic dicarboxylic acid and an aliphatic dicarboxylic acid, wherein, when continuously irradiated with ultraviolet rays from a UVA 340 ultraviolet light lamp at an intensity of 0.75 W/m$^2$, a tensile strength decrease rate from a beginning of the ultraviolet irradiation to 1 day is 5% to 40%, wherein the tensile strength reduction rate is measured by a method below:

[Measurement Method]

The biodegradable polyester resin composition is dried at 80° C., placed in a stainless steel mold, and compressed at 210° C. under a pressure of 10 MPa for 3 minutes to produce a polyester sheet having a thickness of 300 μm, and the tensile strength reduction rate is obtained by dividing a difference between an initial tensile strength of the polyester sheet and a tensile strength after ultraviolet irradiation of the polyester sheet by the initial tensile strength.

In the biodegradable polyester resin composition according to one embodiment, a tensile strength reduction rate from the beginning of the ultraviolet irradiation to 3 days may be 40% to 65%.

In the biodegradable polyester resin composition according to one embodiment, a tensile strength reduction rate from the beginning of the ultraviolet irradiation to 6 days may be 67% or more.

In the biodegradable polyester resin composition according to one embodiment, when irradiated with the ultraviolet rays at an intensity of 0.35 W/m$^2$, a tensile strength decrease rate from the beginning of the ultraviolet irradiation to 1 day may be 1% to 20%.

In the biodegradable polyester resin composition according to one embodiment, when irradiated with the ultraviolet rays at an intensity of 0.35 W/m$^2$, a tensile strength reduction rate from the beginning of the ultraviolet irradiation to 9 days may be 65% or more.

In the biodegradable polyester resin composition according to one embodiment, the initial tensile strength may be 40 MPa to 60 MPa, and a tensile strength after 7 days may be 1 MPa to 15 MPa.

In the biodegradable polyester resin composition according to one embodiment, an elongation decrease rate at break from the beginning of the ultraviolet irradiation to 1 day may be 5% to 40%, and an elongation decrease rate at break from the beginning of the ultraviolet irradiation to 7 days may be 80% or more.

In the biodegradable polyester resin composition according to one embodiment, when irradiated with the ultraviolet rays at an intensity of 0.35 W/m$^2$, an elongation decrease rate at break from the beginning of the ultraviolet irradiation to 1 day may be 1% to 20%, and an elongation decrease rate at break from the beginning of the ultraviolet irradiation to 9 days may be 80% or more.

The biodegradable polyester film according to one embodiment may include a polyester resin including a diol, an aromatic dicarboxylic acid and an aliphatic dicarboxylic acid, wherein, when irradiated with ultraviolet rays from a UVA 340 ultraviolet light lamp at an intensity of 0.75 W/m$^2$, a tensile strength decrease rate from a beginning of the ultraviolet irradiation to 1 day is 5% to 40% based on a thickness of 300 μm.

In accordance with yet another aspect of the present disclosure, there is provided a biodegradable polyester resin composition, including: a polyester resin including a diol, an aromatic dicarboxylic acid and an aliphatic dicarboxylic acid; and a crystallinity regulator, wherein the biodegradable polyester resin composition has a crystallinity of 10% to 15%.

In the biodegradable polyester resin composition according to one embodiment, the crystallinity regulator may include diisopropyl adipate.

In the biodegradable polyester resin composition according to one embodiment, the diisopropyl adipate may be included in a content ranging from 10 ppm to 10000 ppm based on a weight of the polyester resin.

In the biodegradable polyester resin composition according to one embodiment, the biodegradable polyester resin composition may have a tensile strength of 40 MPa to 60 MPa, wherein the tensile strength is measured by a measurement method below:

[Measurement Method]

The biodegradable polyester resin composition is dried at 80° C., placed in a stainless steel mold, and compressed at 210° C. under a pressure of 10 MPa for 3 minutes to produce a polyester sheet having a thickness of 300 μm, and the tensile strength of the polyester sheet is measured.

In the biodegradable polyester resin composition according to one embodiment, the biodegradable polyester resin composition may have an elongation at break of 800% to 1200%, wherein the elongation at break is measured by a measurement method below:

[Measurement Method]

An elongation at break of the polyester sheet is measured.

In the biodegradable polyester resin composition according to one embodiment, the biodegradable polyester resin composition may have a Shore D hardness of 30 to 45, wherein the Shore D hardness is measured by a measurement method below:

[Measurement Method]

The biodegradable polyester resin composition is dried at 80° C., placed in a stainless steel mold, and compressed at 210° C. under a pressure of 10 MPa for 3 minutes to manufacture a polyester block having a thickness of 2.5 mm, and the Shore D hardness of the polyester block is measured.

In the biodegradable polyester resin composition according to one embodiment, the crystallinity regulator may include tetrahydrofuran.

In the biodegradable polyester resin composition according to one embodiment, a weight ratio of the diisopropyl adipate to the tetrahydrofuran may be 1:1 to 1:5.

In the biodegradable polyester resin composition according to one embodiment, an alternating ratio of the polyester resin may be 0.37 to 0.59, wherein the alternating ratio is a ratio of a diol, bonded between the aromatic dicarboxylic acid and the aliphatic dicarboxylic acid, among the diol.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

Figure 1:
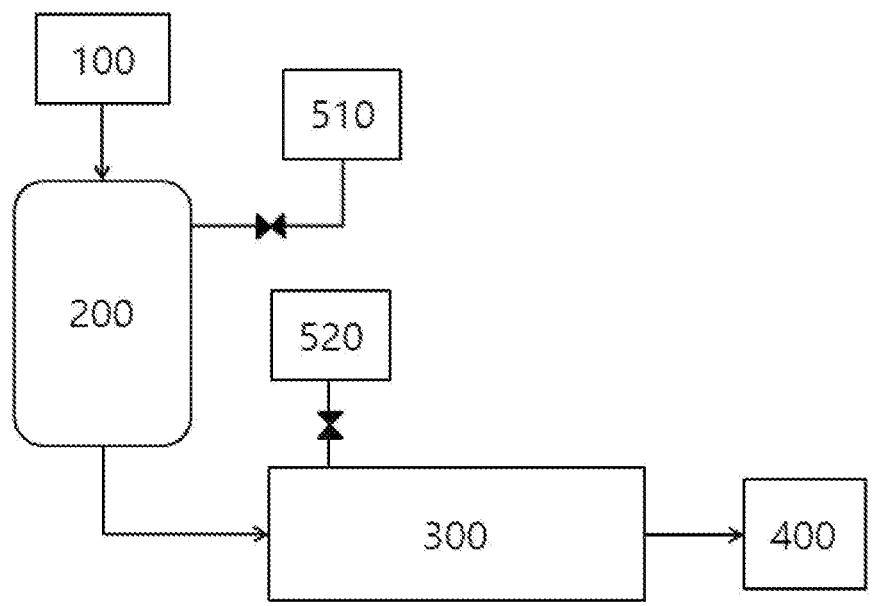
FIG. 1 is a diagram schematically illustrating an apparatus for producing a polyester resin composition according to one embodiment.

Hereinafter, the present disclosure will be described in more detail with reference to the following embodiments. The scope of the present disclosure is not limited to the following embodiments and covers modifications of the technical spirit substantially equivalent thereto.

In the specification, when a certain part "includes" a certain component, this indicates that the part may further include another component instead of excluding another component unless there is no different disclosure.

In addition, it should be understood that all numerical ranges representing physical property values, dimensions, etc. of components described in this specification are modified by the term 'about' in all cases unless otherwise specified, whereby 'about' represents standard deviations in the accuracy of the numerical ranges, defined herein as less than 2% of the values given (or the closest integral value when the range is expressed as a range of whole numbers). Furthermore, besides the disclosed ranges, the present disclosure includes any intervening ranges of those described.

In this specification, Terms such as first, second, primary, and secondary are used to describe various components, and the components are not limited by the terms. The terms are only used for the purpose of distinguishing one component from another.

In this specification, ppm is a unit based on mass. The 1 ppm is 1 in 1 million of the total mass. That is, the 1 ppm is 0.0001 wt % based on the total mass.

The biodegradable polyester resin composition according to one embodiment includes a biodegradable polyester resin. The biodegradable polyester resin composition according to one embodiment may include the biodegradable polyester resin alone or together with other resins or additives.

The biodegradable polyester resin includes a diol, an aromatic dicarboxylic acid and an aliphatic dicarboxylic acid. The biodegradable polyester resin includes a diol residue, an aromatic dicarboxylic acid residue and an aliphatic dicarboxylic acid residue. The diol residue is derived from the diol, the aromatic dicarboxylic acid residue is derived from the aromatic dicarboxylic acid, and the aliphatic dicarboxylic acid residue is derived from the aliphatic dicarboxylic acid. The biodegradable polyester resin includes a diol component, an aromatic dicarboxylic acid component and an aliphatic dicarboxylic acid component. Likewise, the diol component may be derived from the diol, the aromatic dicarboxylic acid component may be derived from the aromatic dicarboxylic acid, and the aliphatic dicarboxylic acid component may be derived from the aliphatic dicarboxylic acid.

In a description of the biodegradable polyester resin composition according to one embodiment, a diol residue may be expressed as a diol. In the biodegradable polyester resin, a dicarboxylic acid residue may be expressed as dicarboxylic acid. In addition, the residue may be expressed as a component.

The diol may be an aliphatic diol. The diol may be a bio-derived diol. The diol may be at least one or more selected from the group consisting of ethanediol, 1,2-propanediol, 1,3-propanediol, 2-methyl-1,3-propanediol, 2,2-dimethyl-1,3-propanediol, 2,2-diethyl-1,3-propanediol, 2-ethyl-2-isobutyl-1,3-propanediol, 1,2-butanediol, 1,4-butanediol, 1,5-pentanediol, 3-methyl-1,5-pentanediol, 2,2,4-trimethyl-1,3-pentanediol, 1,6-hexanediol, 2-ethyl-1,3-hexanediol, 2,4-dimethyl-2-ethyl-1,3-hexanediol, 2,2,4-trimethyl-1,6-hexanediol, 2-methyl-1,8-octanediol, 1,9-nonanediol, 1,10-decanediol and 1,12-octadecanediol or derivatives thereof.

The diol may be at least one or more selected from the group consisting of 1,4-butanediol, 1,2-ethanediol, 1,3-propanediol, diethylene glycol and neopentyl glycol or derivatives thereof.

The diol may be at least one or more selected from the group consisting of 1,4-butanediol, 1,2-ethanediol, 1,3-propanediol or derivatives thereof.

The diol may include 1,4-butanediol or a derivative thereof.

The aromatic dicarboxylic acid may be at least one or more selected from the group consisting of phthalic acid, terephthalic acid, isophthalic acid, 1,4-naphthalenedicarboxylic acid, 1,5-naphthalenedicarboxylic acid, 2,6-naphthalenedicarboxylic acid, 1,8-naphthalenedicarboxylic acid, 4,4'-diphenyl dicarboxylic acid, 4,4'-diphenyl ether dicarboxylic acid, anthracen dicarboxylic acid, and phenanthren dicarboxylic acid or derivatives thereof.

The aromatic dicarboxylic acid may be at least one or more selected from the group consisting of terephthalic acid, dimethyl terephthalate, 2,6-naphthalene dicarboxylic acid, isophthalic acid or derivatives thereof.

The aromatic dicarboxylic acid may include terephthalic acid, dimethyl terephthalate or a derivative thereof.

The aliphatic dicarboxylic acid may be at least one or more selected from the group consisting of oxalic acid, malonic acid, succinic acid, maleic acid, fumaric acid, glutaric acid, adipic acid, pimelic acid, serveric acid, azelaic acid, sebacic acid, dodecanedicarboxylic acid and 1,4-cyclohexanedicarboxylic acid or derivatives thereof.

The aliphatic dicarboxylic acid may be at least one or more selected from the group consisting of adipic acid, succinic acid and sebacic acid or derivatives thereof.

The aliphatic dicarboxylic acid may include an adipic acid or a derivative thereof.

In the biodegradable polyester resin, a molar ratio of all diol residues including the diol to all dicarboxylic acid residues including the aromatic dicarboxylic acid and the aliphatic dicarboxylic acid may range from about 1:0.9 to about 1:1.1. A molar ratio of all diol residues to all dicarboxylic acid residues may range from about 1:0.95 to about 1:1.05.

In the biodegradable polyester resin, a molar ratio of the aromatic dicarboxylic acid residue to the aliphatic dicarboxylic acid residue may range from about 3:7 to about 7:3. In the biodegradable polyester resin, a molar ratio of the aromatic dicarboxylic acid residue to the aliphatic dicarboxylic acid residue may range from about 3.3:6.7 to about 6.7:3.3. In the biodegradable polyester resin, a molar ratio of the aromatic dicarboxylic acid residue to the aliphatic dicarboxylic acid residue may range from about 4:6 to about 6:4. In the biodegradable polyester resin, a molar ratio of the aromatic dicarboxylic acid residue to the aliphatic dicarboxylic acid residue may range from about 4.2:5.8 to about 5:5.

The biodegradable polyester resin may include a diol residue derived from 1,4-butanediol in a content ranging from about 90 mol % or more based on the total diol. The biodegradable polyester resin may include a diol residue derived from 1,4-butanediol in a content ranging from about 95 mol % or more based on the total diol. The biodegradable polyester resin may include a diol residue derived from 1,4-butanediol in a content ranging from about 98 mol % or more based on the total diol.

The biodegradable polyester resin may include an aromatic dicarboxylic acid residue derived from terephthalic acid or dimethyl terephthalate in a content ranging from about 30 mol % to about 70 mol % based on the total dicarboxylic acid. The biodegradable polyester resin may include an aromatic dicarboxylic acid residue derived from terephthalic acid or dimethyl terephthalate in a content ranging from about 35 mol % to about 65 mol % based on the total dicarboxylic acid. The biodegradable polyester resin may include a dicarboxylic acid residue derived from terephthalic acid or dimethyl terephthalate in a content ranging from about 40 mol % to about 59 mol % based on the total dicarboxylic acid. The biodegradable polyester resin may include an aromatic dicarboxylic acid residue derived from terephthalic acid or dimethyl terephthalate in a content ranging from about 43 mol % to about 53 mol % based on the total dicarboxylic acid.

The biodegradable polyester resin may include an aliphatic dicarboxylic acid residue derived from adipic acid in a content ranging from about 30 mol % to about 70 mol % based on the total dicarboxylic acid. The biodegradable polyester resin may include an aliphatic dicarboxylic acid residue derived from adipic acid in a content ranging from about 35 mol % to about 65 mol % based on the total dicarboxylic acid. The biodegradable polyester resin may include an aliphatic dicarboxylic acid residue derived from adipic acid in a content ranging from about 41 mol % to about 60 mol % based on the total dicarboxylic acid. The biodegradable polyester resin may include an aliphatic dicarboxylic acid residue derived from adipic acid in a content ranging from about 47 mol % to about 57 mol % based on the total dicarboxylic acid.

In addition, the biodegradable polyester resin may include at least one or more first block and at least one or more second block. See for example the chemical blocks illustrated in formula (1), formula (2), formula (3), formula (4), and formula (5) below. The biodegradable polyester resin may have a molecular structure in which the first block and the second block are alternately bonded.

The first block may include the diol residue and the aromatic dicarboxylic acid residue. The first block may be formed by esterification of the diol and the aromatic dicarboxylic acid. The first block may include only the diol residue and the aromatic dicarboxylic acid residue. The first block may include only repeating units formed by the esterification of the diol and the aromatic dicarboxylic acid. That is, the first block may mean the sum of repeating units of the diol and the aromatic dicarboxylic acid before being combined with the aliphatic dicarboxylic acid.

The second block may include the diol residue and the aliphatic dicarboxylic acid residue. The second block may be formed by esterification of the diol and the aliphatic dicarboxylic acid. The second block may include only the diol residue and the aliphatic dicarboxylic acid residue. The second block may include only repeating units formed by the esterification of the diol and the aliphatic dicarboxylic acid. That is, the second block may mean the sum of repeating units of the diol and the aliphatic dicarboxylic acid before being combined with the aromatic dicarboxylic acid.

In the biodegradable polyester resin, a ratio (X/Y) of the number (X) of the first blocks to the number (Y) of the second blocks may range from about 0.5 to about 1.5. In the biodegradable polyester resin, the ratio (X/Y) of the number (X) of the first blocks to the number (Y) of the second blocks may range from about 0.6 to about 1.4. In the biodegradable polyester resin, the ratio (X/Y) of the number (X) of the first blocks to the number (Y) of the second blocks may range from about 0.7 to about 1.3. In the biodegradable polyester resin, the ratio (X/Y) of the number (X) of the first blocks to the number (Y) of the second blocks may range from about 0.75 to about 1.2. In addition, in the biodegradable polyester resin, the ratio (X/Y) of the number (X) of the first blocks to the number (Y) of the second blocks may be 0.8 to 1. The number of the first blocks may be smaller than the number of the second blocks.

The number of the first blocks may range from about 30 to about 300. The number of the first blocks may range from about 40 to about 250. The number of the first blocks may range from about 50 to about 220. The number of the first blocks may range from about 60 to about 200. The number of the first blocks may range from about 70 to about 200. The number of the first blocks may range from about 75 to about 200.

The number of the first blocks may vary depending upon the content ranging from the aromatic dicarboxylic acid, the molecular weight of the biodegradable polyester resin and an alternation ratio to be described below. That is, the number of the first blocks may increase as a molar ratio of the aromatic dicarboxylic acid increases, as the molecular weight of the biodegradable polyester resin increases, and as an alternation ratio to be described below increases.

The number of the second blocks may range from about 30 to about 300. The number of the second blocks may range from about 40 to about 250. The number of the second blocks may range from about 50 to about 220. The number of the second blocks may range from about 60 to about 200. The number of the second blocks may range from about 70 to about 200. The number of the second blocks may range from about 75 to about 200.

The number of the second blocks may vary depending upon the content ranging from the aliphatic dicarboxylic acid, the molecular weight of the biodegradable polyester resin and an alternating degree to be described below. That is, the number of the first blocks may increase as the molecular weight of the biodegradable polyester resin increases, the molar ratio of the aliphatic dicarboxylic acid increases, and an alternating degree to be described below increases.

When the biodegradable polyester resin includes the first block and the second block within the range, the biodegradable polyester resin composition according to one embodiment may have appropriate biodegradability while having appropriate mechanical strength. See tables and examples below. In addition, when the biodegradable polyester resin includes the first block and the second block within the range, the biodegradable polyester resin composition according to one embodiment may have an increased stiffness while having greater flexibility. Accordingly, the biodegradable polyester resin composition according to one embodiment may be used for an injection-molded article, etc. In addition, when the biodegradable polyester resin includes the first block and the second block within the range, the biodegradable polyester resin composition according to one embodiment may have appropriate biodegradability while having appropriate durability to ultraviolet light, and the like.

The first block may be represented by Formula 1 below:

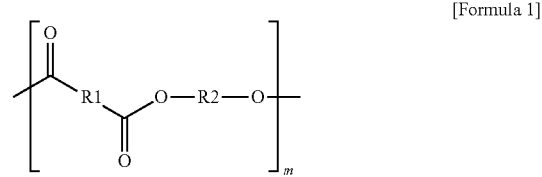

[Formula 1]

where R1 is a substituted or unsubstituted arylene group having 6 to 20 carbon atoms, R2 is a substituted or unsubstituted alkylene group having 1 to 20 carbon atoms, and m is 1 to 20.

R1 may be a substituted or unsubstituted phenylene group, and R2 may be a butylene group.

The second block may be represented by Formula 2 below:

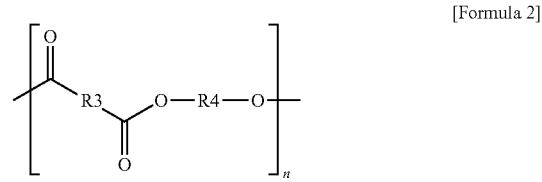

[Formula 2]

where R3 and R4 are each independently a substituted or unsubstituted alkylene group having 1 to 20 carbon atoms, and n is 1 to 20.

R3 and R4 may be a butylene group.

The biodegradable polyester resin may have a structure in which the first block and the second block are alternately bonded to each other. The biodegradable polyester resin may be represented by Formula 3 below.

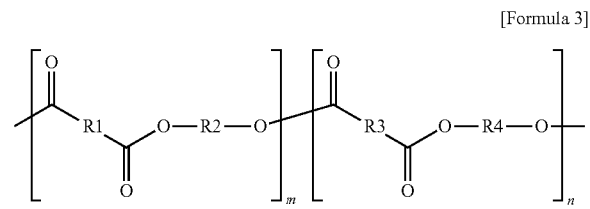

[Formula 3]

where R1 is a substituted or unsubstituted arylene group having 6 to 20 carbon atoms, R2 is a substituted or unsubstituted alkylene group having 1 to 20 carbon atoms, and m is 1 to 20. In addition, R3 and R4 are each independently a substituted or unsubstituted alkylene group having 1 to 20 carbon atoms, and n is 1 to 20.

The diol residue may include a residue of 1,4-butanediol or derivative thereof, the aromatic dicarboxylic acid residue may include a residue of terephthalic acid or derivative thereof, and the aliphatic dicarboxylic acid residue may include a residue of adipic acid or derivative thereof.

In one embodiment, the biodegradable polyester resin may include a first block including a residue of 1,4-butanediol or derivative thereof and a residue of terephthalic acid or derivative thereof.

Alternatively, the biodegradable polyester resin may include a first block including a residue of 1,4-butanediol or derivative thereof and a residue of dimethyl terephthalate or derivative thereof.

The biodegradable polyester resin may include a second block including a residue of 1,4-butanediol or derivative thereof and a residue of adipic acid or derivative thereof.

Alternatively, the biodegradable polyester resin may include a second block including a residue of 1,4-butanediol or derivative thereof and a residue of succinic acid or derivative thereof.

A biodegradable polyester resin according to one embodiment of the present disclosure may include a first block including a residue of 1,4-butanediol or derivative thereof and a residue of terephthalic acid or derivative thereof; and a second block including a residue of 1,4-butanediol or derivative thereof and a residue of adipic acid or derivative thereof.

The first block may be represented by Formula 4 below, and the second block may be represented by Formula 5 below:

[Formula 4]

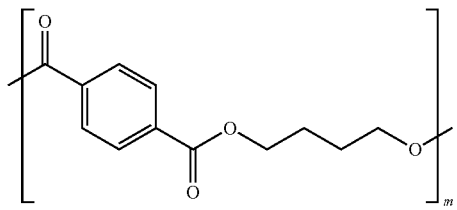

where m is 1 to 20.

[Formula 5]

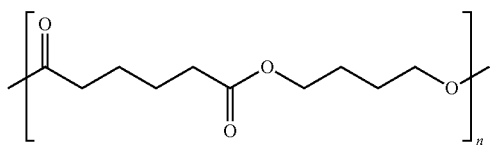

where n is 1 to 20.

In one embodiment, the biodegradable polyester resin may be represented by Formula 6 below:

[Formula 6]

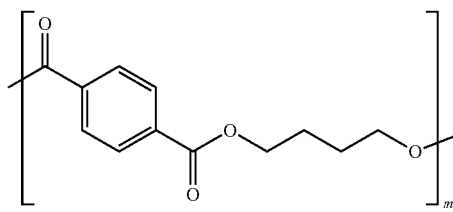

where m is 1 to 20, and n is 1 to 20.

When the first block and the second block satisfy the constitution above, a biodegradable polyester resin with these blocks may result in a biodegradable polyester sheet, film or molded article having excellent biodegradability and water degradability and improved properties. See tables and examples below.

In addition, when the biodegradable polyester resin includes the first block and the second block within the range, the biodegradable polyester resin composition according to one embodiment may have appropriate mechanical properties and appropriate UV resistance.

Since the first and second blocks have the characteristics, the mechanical properties of the biodegradable polyester resin composition according to one embodiment may be improved.

Since the first and second blocks have the characteristics, the biodegradable polyester resin composition according to one embodiment may have appropriate UV resistance.

Since the first and second blocks have the characteristics, the biodegradable polyester resin composition according to one embodiment may have an appropriate biodegradation rate.

Since the first and second blocks have the characteristics, the biodegradable polyester resin composition according to one embodiment may have an appropriate hydrolysis rate.

Since the first and second blocks have the characteristics, the biodegradable polyester resin composition according to one embodiment may have an appropriate biodegradation rate and improved UV resistance. See tables and examples below.

The biodegradable polyester resin may include the following bonding structures:

Aromatic dicarboxylic acid-diol-aliphatic dicarboxylic acid- [Bonding Structure 1]

Aromatic dicarboxylic acid-diol-aromatic dicarboxylic acid- [Bonding Structure 2]

Aliphatic dicarboxylic acid-diol-aliphatic dicarboxylic acid- [Bonding Structure 3]

The diol included in Bonding Structure 1 is formed between the aromatic dicarboxylic acid and the aliphatic dicarboxylic acid and bonded to the aromatic dicarboxylic acid and the aliphatic dicarboxylic acid. The diol included in Bonding Structure 1 may be formed between the aromatic dicarboxylic acid and the aliphatic dicarboxylic acid and directly esterified with the aromatic dicarboxylic acid and the aliphatic dicarboxylic acid.

In addition, the diol included in Bonding Structure 2 is formed between the aromatic dicarboxylic acid and the aromatic dicarboxylic acid (that is formed between two aromatic dicarboxylic acid groups) and bonded to the two aromatic dicarboxylic acid groups. The diol included in Bonding Structure 2 may be formed between the aromatic dicarboxylic acid and the aromatic dicarboxylic acid and may be directly esterified with the aromatic dicarboxylic acid and the aromatic dicarboxylic acid.

In addition, the diol included in Bonding Structure 3 is formed between one aliphatic dicarboxylic acid and another aliphatic dicarboxylic acid (that is formed between two aliphatic dicarboxylic acid groups) and bonded to the aliphatic dicarboxylic acid and the aliphatic dicarboxylic acid (that is bonded between the two aliphatic dicarboxylic acid groups). The diol included in Bonding Structure 3 may be formed between the aliphatic dicarboxylic acid and the aliphatic dicarboxylic acid and may be directly esterified with the aliphatic dicarboxylic acid and the aliphatic dicarboxylic acid.

In one example of a biodegradable polyester resin, Bonding Structure 1 may be represented by Formula 7 below:

[Formula 7]

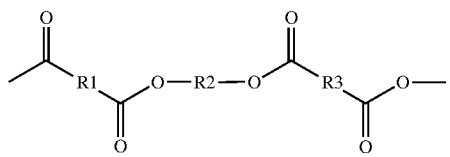

where R1 is a substituted or unsubstituted arylene group having 6 to 20 carbon atoms, R2 is a substituted or unsubstituted alkylene group having 1 to 20 carbon atoms, and R3 is a substituted or unsubstituted alkylene group having 1 to 20 carbon atoms.

In one example of a biodegradable polyester resin, Bonding Structure 2 may be represented by Formula 8 below:

[Formula 8]

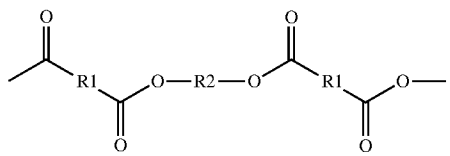

Likewise, R1 is a substituted or unsubstituted arylene group having 6 to 20 carbon atoms, and R2 is a substituted or unsubstituted alkylene group having 1 to 20 carbon atoms.

In one example of a biodegradable polyester resin, Bonding Structure 3 may be represented by Formula 9 below:

[Formula 9]

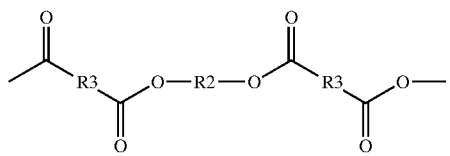

where R2 is a substituted or unsubstituted alkylene group having 1 to 20 carbon atoms, and R3 is a substituted or unsubstituted alkylene group having 1 to 20 carbon atoms.

In addition, Bonding Structure 1 may be represented by Formula 10 below:

[Formula 10]

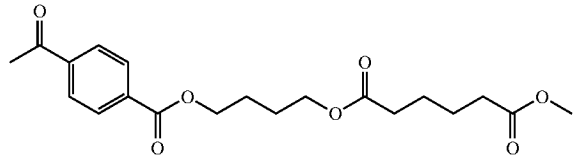

In addition, Bonding Structure 2 may be represented by Formula 11 below:

[Formula 11]

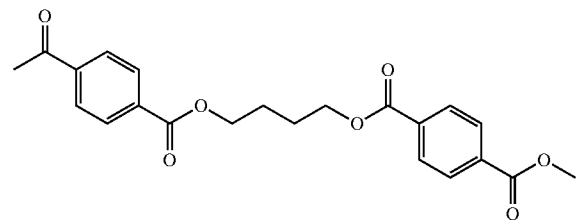

In addition, Bonding Structure 3 may be represented by Formula 12 below:

[Formula 12]

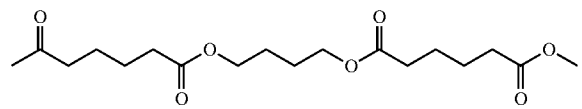

In one embodiment, the biodegradable polyester resin may have an alternating ratio.

The alternating ratio refers to a ratio of a diol bonded between the aromatic dicarboxylic acid and the aliphatic dicarboxylic acid among the diols. That is, the alternating ratio may be a ratio of a diol included in Bonding Structure 1 among the diols. The alternating ratio may be obtained by dividing the number of moles of a diol included in Bonding Structure 1 by the sum of a) the number of moles of a diol included in Bonding Structure 1, b) the number of moles of a diol included in Bonding Structure 2 and c) the number of moles of a diol included in Bonding Structure 3.

That is, the alternating ratio may be a ratio of a diol bonded between the heterogeneous dicarboxylic acids among the total diols.

The alternating ratio may be calculated according to Equation 1 below:

$$\text{Alternating ratio} = \frac{DM1}{DM1 + DM2 + DM3} \qquad \text{[Equation 1]}$$

where DM1 is a molar ratio of a diol included in Bonding Structure 1, DM2 is a molar ratio of a diol included in Bonding Structure 2, and DM3 is a molar ratio of a diol included in Bonding Structure 3.

In one example of a biodegradable polyester resin, the alternating ratio may range from about 0.3 to about 0.7. In another example of a biodegradable polyester resin, the alternating ratio may range from about 0.37 to about 0.59. In still another example of a biodegradable polyester resin, the alternating ratio may range from about 0.4 to about 0.56. In yet another example of a biodegradable polyester resin, the alternating ratio may range from about 0.45 to about 0.53.

In addition, the biodegradable polyester resin may include a hard segment ratio.

The hard segment ratio refers to a ratio of a diol bonded between one aromatic dicarboxylic acid and another aromatic dicarboxylic acid among the diols (that is bonded between two aromatic dicarboxylic acid groups).

The hard segment ratio may be a molar ratio of a diol included in Bonding Structure 2 among the total diols. The hard segment ratio may be obtained by dividing the number of moles of a diol included in Bonding Structure 2 by the sum of the number of moles of a diol included in Bonding Structure 1, the number of moles of a diol included in Bonding Structure 2 and the number of moles of a diol included in Bonding Structure 3.

The hard segment ratio may be represented by Equation 2 below:

$$\text{Hard segment ratio} = \frac{DM2}{DM1 + DM2 + DM3} \quad \text{[Equation 2]}$$

where DM1 is a molar ratio of a diol included in Bonding Structure 1, DM2 is a molar ratio of a diol included in Bonding Structure 2, and DM3 is a molar ratio of a diol included in Bonding Structure 3.

The hard segment ratio may range from about 0.15 to about 0.35. The hard segment ratio may range from about 0.2 to about 0.3. The hard segment ratio may range from about 0.21 to about 0.29. The hard segment ratio may range from about 0.22 to about 0.28.

In addition, the biodegradable polyester resin composition may include soft segments.

A soft segment ratio refers to a ratio of a diol bonded between one aliphatic dicarboxylic acid and another aliphatic dicarboxylic acid among the diols (that is bonded between two aliphatic dicarboxylic acid groups).

The soft segment ratio may be a molar ratio of a diol included in Bonding Structure 3 among the total diols. The soft segment ratio may be obtained by dividing the number of moles of a diol included in Bonding Structure 3 by the sum of a) the number of moles of a diol included in Bonding Structure 1, b) the number of moles of a diol included in Bonding Structure 2 and c) the number of moles of a diol included in Bonding Structure 3.

The soft segment ratio may be represented by Equation 3 below:

$$\text{Soft segment ratio} = \frac{DM3}{DM1 + DM2 + DM3} \quad \text{[Equation 3]}$$

where DM1 is a molar ratio of a diol included in Bonding Structure 1, DM2 is a molar ratio of a diol included in Bonding Structure 2, and DM3 is a molar ratio of a diol included in Bonding Structure 3.

The soft segment ratio may range from about 0.19 to about 0.29. The soft segment ratio may range from about 0.21 to about 0.29. The soft segment ratio may range from about 0.22 to about 0.29. The hard segment ratio may range from about 0.21 to about 0.28. The soft segment ratio may range from about 0.22 to about 0.28. The soft segment ratio may range from about 0.25 to about 0.28.

The soft segment ratio may be larger than the hard segment ratio.

A ratio of the hard segments to the soft segments may range from about 0.92 to about 0.99. That is, according to Equation 2 and Equation 3, DM2 divided by DM3 may range from about 0.92 to about 0.99.

The alternating ratio, the hard segment ratio and the soft segment ratio may be measured by nuclear magnetic resonance spectroscopy. The biodegradable polyester resin composition according to one embodiment may be dissolved in a solvent such as CDCl3, and may be analyzed by $^1$H-NMR and/or $^{13}$C-NMR analysis using a nuclear magnetic resonance (NMR) instrument at room temperature.

When the diol is 1,4-butanediol, the aromatic dicarboxylic acid is terephthalic acid or dimethyl terephthalate, and the aliphatic dicarboxylic acid is adipic acid, analysis of the biodegradable polyester resin by the nuclear magnetic resonance spectroscopy may include a first peak, a second peak, a third peak, a fourth peak, a fifth peak, a sixth peak, a seventh peak, an eighth peak, a ninth peak, a tenth peak, and an eleventh peak.

For example, when the diol is 1,4-butanediol, the aromatic dicarboxylic acid is terephthalic acid or dimethyl terephthalate, and the aliphatic dicarboxylic acid is adipic acid, analysis of the biodegradable polyester resin by the nuclear magnetic resonance spectroscopy may include a peak derived from the diol of Bonding Structure 1, a peak derived from the diol of Bonding Structure 2 and a peak derived from the diol of Bonding Structure 3 at about 3.5 ppm to about 4.6 ppm.

The −ppm direction may be an upfield direction or a shielded direction. For example, −3.4 ppm may mean a position of 3.4 ppm in an upfield direction. For example, −3.4 ppm may mean a position of 3.4 ppm in a shielded direction.

In a range of about 3.5 ppm to about 4.6 ppm, the first peak, the second peak, the third peak and the fourth peak may be defined in order from high ppm to low ppm. In addition, in a range of about −3.4 ppm to about −4.3 ppm based on the ppm of the ninth peak, the first peak, the second peak, the third peak and the fourth peak may be defined in order from high ppm to low ppm. Here, the first peak may be derived from the diol included in the second bonding unit, the second peak and the third peak may be derived from the diol included in the first bonding unit, and the fourth peak may be derived from the diol included in the third bonding unit.

In addition, analysis of the biodegradable polyester resin by the nuclear magnetic resonance spectroscopy may include a peak derived from the diol of Bonding Structure 1, a peak derived from the diol of Bonding Structure 2 and a peak derived from the diol of Bonding Structure 3 also at about 1.0 ppm to about 2.5 ppm.

In a range of about 1.0 ppm to about 2.5 ppm, the tenth peak, the fifth peak, the sixth peak, the seventh peak, the eighth peak and the eleventh peak may be defined in order from high ppm to low ppm. In a range of about −6.0 ppm to about −6.7 ppm based on the ppm of the ninth peak, the fifth peak, the sixth peak, the seventh peak, the eighth peak and the eleventh peak may be defined in order from high ppm to low ppm. Here, the fifth peak may be derived from the diol included in the second bonding unit, the sixth peak and the seventh peak may be derived from the diol included in the first bonding unit, and the eighth peak may be derived from the diol included in the third bonding unit.

In addition, in a range of about 7.5 ppm to about 8.5 ppm, the ninth peak may be formed. The ninth peak may be derived from the aromatic dicarboxylic acid. The ninth peak may be derived from an aromatic ring included in the aromatic dicarboxylic acid. The ninth peak may be derived from an aromatic ring included in the terephthalic acid or the dimethyl terephthalate.

The tenth peak and the eleventh peak may be derived from the aliphatic dicarboxylic acid. The tenth peak and the eleventh peak may be derived from the adipic acid.

The first peak may be located at about −3.6 ppm to about −3.68 ppm based on the ppm of the ninth peak. The second peak may be located at about −3.69 ppm to about −3.75 ppm based on the ppm of the ninth peak. The third peak may be located at about −3.9 ppm to about −3.97 ppm based on the ppm of the ninth peak. The fourth peak may be located at about −3.98 ppm to about −4.1 ppm based on the ppm of the ninth peak. The fifth peak may be located at about −6.0 ppm to about −6.19 ppm based on the ppm of the ninth peak. The sixth peak may be located at about −6.2 ppm to about −6.26 ppm based on the ppm of the ninth peak. The seventh peak may be located at about −6.27 ppm to about −6.34 ppm based on the ppm of the ninth peak. The eighth peak may be located at about −6.35 ppm to about −6.42 ppm based on the ppm of the ninth peak. The tenth peak may be located at about −5.6 ppm to about −5.8 ppm based on the ppm of the ninth peak. The eleventh peak may be located at about −6.421 ppm to about −6.5 ppm based on the ppm of the ninth peak. The position of the ninth peak based on ppm may be the position of each peak when the position of the ninth peak is 0 ppm.

In addition, the areas of the first peak, the second peak, the third peak, the fourth peak, the fifth peak, the sixth peak, the seventh peak, the eighth peak, the tenth peak and the eleventh peak may be normalized based on the area of the ninth peak. That is, when the area of the ninth peak is 1, the areas of the first peak, the second peak, the third peak, the fourth peak, the fifth peak, the sixth peak, the seventh peak, the eighth peak, the tenth peak and the eleventh peak may be relatively determined.

The alternating ratio may be derived by Equation 4 or 5 below:

$$\text{Alternating ratio} = \frac{PA2 + PA3}{PA1 + PA2 + PA3 + PA4} \quad \text{[Equation 4]}$$

where PA1 is the area of the first peak, PA2 is the area of the second peak, PA3 is the area of the third peak, and PA4 is the area of the fourth peak $$\text{Alternating ratio} = \frac{PA6 + PA7}{PA5 + PA6 + PA7 + PA8} \quad \text{[Equation 5]}$$

where PA5 is the area of the fifth peak, PA6 is the area of the sixth peak, PA7 is the area of the seventh peak, and PA8 is the area of the eighth peak.

The hard segment ratio may be derived by Equation 6 or 7 below:

$$\text{Hard segment ratio} = \frac{PA1}{PA1 + PA2 + PA3 + PA4} \quad \text{[Equation 6]}$$

where PA1 is the area of the first peak, PA2 is the area of the second peak, PA3 is the area of the third peak, and PA4 is the area of the fourth peak.

$$\text{Hard segment ratio} = \frac{PA5}{PA5 + PA6 + PA7 + PA8} \quad \text{[Equation 7]}$$

where PA5 is the area of the fifth peak, PA6 is the area of the sixth peak, PA7 is the area of the seventh peak, and PA8 is the area of the eighth peak.

The soft segment ratio may be derived by Equation 8 or 9 below:

$$\text{Soft segment ratio} = \frac{PA4}{PA1 + PA2 + PA3 + PA4} \quad \text{[Equation 8]}$$

where PA1 is the area of the first peak, PA2 is the area of the second peak, PA3 is the area of the third peak, and PA4 is the area of the fourth peak.

$$\text{Soft segment ratio} = \frac{PA8}{PA5 + PA6 + PA7 + PA8} \quad \text{[Equation 9]}$$

where PA5 is the area of the fifth peak, PA6 is the area of the sixth peak, PA7 is the area of the seventh peak, and PA8 is the area of the eighth peak.

The area of the first peak may range from about 0.35 to about 0.6. The area of the first peak may range from about 0.4 to about 0.55. The area of the first peak may range from about 0.43 to about 0.5 The area of the first peak may range from about 0.43 to about 0.52. The area of the first peak may range from about 0.45 to about 0.49.

The area of the second peak may range from about 0.37 to about 0.57. The area of the second peak may range from about 0.41 to about 0.54. The area of the second peak may range from about 0.45 to about 0.53. The area of the second peak may range from about 0.45 to about 0.55. The area of the second peak may range from about 0.47 to about 0.53.

The area of the third peak may range from about 0.37 to about 0.57. The area of the third peak may range from about 0.41 to about 0.54. The area of the third peak may range from about 0.45 to about 0.53. The area of the third peak may range from about 0.45 to about 0.55. The area of the third peak may range from about 0.47 to about 0.53.

The area of the fourth peak may range from about 0.4 to 0.7. The area of the fourth peak may range from about 0.45 to about 0.65. The area of the fourth peak may range from about 0.48 to about 0.6. The area of the fourth peak may range from about 0.48 to 0.60. The area of the fourth peak may range from about 0.50 to about 0.58.

The area of the fifth peak may range from about 0.35 to about 0.6. The area of the fifth peak may range from about 0.4 to about 0.55. The area of the fifth peak may be 0.43 to about 0.53.

The area of the fifth peak may range from about 0.43 to about 0.52. The area of the fifth peak may range from about 0.45 to about 0.49.

The area of the sixth peak may range from about 0.35 to about 0.6. The area of the sixth peak may range from about 0.4 to about 0.55. The area of the sixth peak may be 0.43 to about 0.5. The area of the sixth peak may range from about 0.45 to about 0.55. The area of the sixth peak may range from about 0.47 to about 0.53.

The area of the seventh peak may range from about 0.41 to about 0.71. The area of the seventh peak may range from about 0.45 to about 0.65. The area of the seventh peak may range from about 0.48 to about 0.6. The area of the seventh peak may range from about 0.45 to about 0.55. The area of the seventh peak may range from about 0.47 to about 0.53.

The area of the eighth peak may range from about 0.4 to about 0.7. The area of the eighth peak may range from about 0.45 to about 0.65. The area of the eighth peak may range from about 0.48 to about 0.6. The area of the eighth peak may range from about 0.48 to 0.60. The area of the eighth peak may range from about 0.50 to about 0.58.

The area of the tenth peak may range from about 0.7 to about 2.5. The area of the tenth peak may be 0.75 to about 2. The area of the tenth peak may be 0.8 to about 1.5. The area of the tenth peak may range from about 1.0 to about 1.15. The area of the tenth peak may range from about 1.02 to about 1.13.

The area of the eleventh peak may range from about 0.7 to about 3.5. The area of the eleventh peak may range from about 0.7 to about 3. The area of the eleventh peak may be 0.8 to about 2.5. The area of the eleventh peak may range from about 1.0 to about 1.15. The area of the eleventh peak may range from about 1.02 to about 1.13.

In addition, the sum of the area of the first peak, the area of the second peak, the area of the third peak and the area of the fourth peak may range from about 1.49 to about 2.44. The sum of the area of the first peak, the area of the second peak, the area of the third peak and the area of the fourth peak may range from about 1.81 to about 2.16. The sum of the area of the first peak, the area of the second peak, the area of the third peak and the area of the fourth peak may range from about 1.9 to about 2.2. The sum of the area of the first peak, the area of the second peak, the area of the third peak and the area of the fourth peak may range from about 1.95 to about 2.1. Here, the sum of the area of the first peak, the area of the second peak, the area of the third peak and the area of the fourth peak may mean the sum of the total number of ester bonds based on the number of terephthalic acids.

The sum of the area of the second peak and the area of the third peak may range from about 0.95 to about 1.10. The sum of the area of the second peak and the area of the third peak may range from about 0.98 to about 1.07. Here, the sum of the area of the first peak and the area of the third peak may mean the degree of extension of molecular bonds of the biodegradable polyester resin.

A ratio (the area of the fourth peak/the area of the first peak) of the area of the fourth peak to the area of the first peak may range from about 1.1 to about 1.3. A ratio of the area of the fourth peak to the area of the first peak may range from about 0.67 to about 2.00. A ratio of the area of the fourth peak to the area of the first peak may range from about 0.96 to about 1.40. A ratio of the area of the fourth peak to the area of the first peak may range from about 1.15 to about 1.25. A ratio of the area of the fourth peak to the area of the first peak may mean a ratio of soft segments to hard segments in the molecular structure of the biodegradable polyester resin. That is, the biodegradable polyester resin becomes softer as the ratio of the area of the fourth peak to the area of the first peak increases.

A ratio (the area of the fourth peak/the area of the third peak) of the area of the fourth peak to the area of the third peak may range from about 0.7 to about 1.89. A ratio of the area of the fourth peak to the area of the third peak may range from about 0.91 to about 1.33. A ratio of the area of the fourth peak to the area of the third peak may range from about 1.0 to about 1.2. A ratio of the area of the fourth peak to the area of the third peak may range from about 1.01 to about 1.1.

A ratio (the area of the first peak/the area of the second peak) of the area of the first peak to the area of the second peak may range from about 0.61 to about 1.62. A ratio of the area of the first peak to the area of the second peak may range from about 0.81 to about 1.11. A ratio of the area of the first peak to the area of the second peak may range from about 0.85 to about 0.95. A ratio of the area of the first peak to the area of the second peak may range from about 0.86 to about 0.94.

In addition, a ratio (the area of the fifth peak/the area of the first peak) of the area of the fifth peak to the area of the first peak may range from about 0.61 to about 1.71. A ratio of the area of the fifth peak to the area of the first peak may range from about 0.96 to about 1.40. A ratio of the area of the fifth peak to the area of the first peak may range from about 0.8 to about 1.2. A ratio of the area of the fifth peak to the area of the first peak may range from about 0.9 to about 1.1.

In addition, a ratio (the area of the sixth peak/the area of the second peak) of the area of the sixth peak to the area of the second peak may range from about 0.58 to about 1.71. A ratio of the area of the sixth peak to the area of the first peak may range from about 0.86 to about 1.16. A ratio of the area of the sixth peak to the area of the first peak may range from about 0.8 to about 1.2. A ratio of the area of the sixth peak to the area of the first peak may range from about 0.9 to about 1.1.

In addition, a ratio (the area of the seventh peak/the area of the third peak) of the area of the seventh peak to the area of the third peak may range from about 0.72 to about 1.92. A ratio of the area of the seventh peak to the area of the third peak may range from about 0.91 to about 1.33. A ratio of the area of the seventh peak to the area of the third peak may range from about 0.8 to about 1.2. A ratio of the area of the seventh peak to the area of the third peak may range from about 0.9 to about 1.1.

In addition, a ratio (the area of the eighth peak/the area of the fourth peak) of the area of the eighth peak to the area of the fourth peak may range from about 0.59 to about 1.75. A ratio of the area of the eighth peak to the area of the fourth peak may range from about 0.80 to about 1.25. A ratio of the area of the eighth peak to the area of the fourth peak may range from about 0.8 to about 1.2. A ratio of the area of the eighth peak to the area of the fourth peak may range from about 0.9 to about 1.1.

Since the biodegradable polyester resin has the above-described molecular structure, the biodegradable polyester resin composition according to one embodiment may be more advantageous in providing a biodegradable polyester sheet, film or molded article having excellent biodegradability and water degradability and improved physical properties. See tables and examples herein.

In addition, since the biodegradable polyester resin has the above-described molecular structure, the biodegradable polyester resin composition according to one embodiment may have appropriate mechanical properties and appropriate UV resistance.

Since the biodegradable polyester resin has the above-described molecular structure, the mechanical properties of the biodegradable polyester resin composition according to one embodiment may be improved.

Since the biodegradable polyester resin has the above-described molecular structure, the biodegradable polyester resin composition according to one embodiment may have appropriate UV resistance.

Since the first and second blocks have the characteristics, the biodegradable polyester resin composition according to one embodiment may have an appropriate biodegradation rate.

Since the biodegradable polyester resin has the above-described molecular structure, the biodegradable polyester resin composition according to one embodiment may have an appropriate hydrolysis rate.

The biodegradable polyester resin may further include a branching agent. The branching agent may include at least one or more selected from the group consisting of a trihydric or higher alcohol, an anhydride and a trihydric or higher carboxylic acid. The branching agent may react with the diol, the aromatic dicarboxylic acid and the aliphatic dicarboxylic acid. Accordingly, the branching agent may be included as a part of the molecular structure of the biodegradable polyester resin.

The trihydric or higher alcohol may be at least one or more selected from the group consisting of glycerol, pentaerythritol or trimethylolpropane.

The trihydric or higher carboxylic acid may be at least one or more selected from the group consisting of methane tricarboxylic acid, ethanetricarboxylic acid, citric acid, benzene-1,3,5-tricarboxylic acid, 5-sulfo-1,2,4-benzenetricarboxylic acid, ethane-1,1,2,2-tetracarboxylic acid, propane-1,1,2,3-tetracarboxylic acid, butane-1,2,3,4-tetracarboxylic acid, cyclopentane-1,2,3,4-tetracarboxylic acid and benzene-1,2,4,5-tetracarboxylic acid. The anhydride may include at least one or more selected from the group consisting of trimellitic anhydride, succinic anhydride, methylsuccinic anhydride, ethylsuccinic anhydride, 2,3-butanedicarboxylic anhydride, 2,4-pentanedicarboxylic anhydride, 3,5-heptanedicarboxylic anhydride, 1,2,3,4-butanetetracarboxylic dianhydride, maleic anhydride, dodecylsuccinic anhydride and pyromellitic anhydride.

The branching agent may be included in a content ranging from about 0.1 wt % to about 5 wt % in the biodegradable polyester resin based on the total amount of the biodegradable polyester resin. The branching agent may be included in a content ranging from about 0.1 wt % to about 3 wt % in the biodegradable polyester resin based on the total amount of the biodegradable polyester resin. The branching agent may be included in a content ranging from about 0.1 wt % to about 1 wt % in the biodegradable polyester resin based on the total amount of the biodegradable polyester resin.

Since the biodegradable polyester resin includes the branching agent within the range, the biodegradable polyester resin composition according to one embodiment may have appropriate mechanical characteristics and appropriate biodegradability.

The biodegradable polyester resin may further include an ester polyol. The ester polyol may be included in a molecular structure bonded to the biodegradable polyester resin.

The ester polyol may be prepared by a dehydration condensation reaction of a dibasic acid and a polyhydric alcohol. The dibasic acid may be at least one or more selected from the group consisting of adipic acid, isophthalic acid and sebacic acid. The polyhydric alcohol may be at least one or more selected from the group consisting of ethylene glycol, diethylene glycol, neopentyl glycol, 1,6-hexanediol and 1,2-propanediol.

the weight average molecular weight of the ester polyol may range from about 500 to about 5000. The weight average molecular weight of the ester polyol may range from about 700 to about 4000. The weight average molecular weight of the ester polyol may range from about 800 to about 3500.

In addition, the viscosity of the ester polyol may range from about 300 cps to about 20000 cps. The viscosity of the ester polyol may range from about 400 cps to about 15000 cps. The viscosity of the ester polyol may range from about 500 cps to about 14000 cps. The viscosity of the ester polyol may be Brookfield viscosity at about 25° C.

The OH value of the ester polyol may range from about 50 mgKOH/g to about 350 mgKOH/g. The OH value of the ester polyol may range from about 50 mgKOH/g to about 300 mgKOH/g.

The acid value of the ester polyol may range from about 3 mgKOH/g or less. The acid value of the ester polyol may range from about 2.5 mgKOH/g or less. The acid value of the ester polyol may range from about 2 mgKOH/g or less.

The ester polyol may be included in a content ranging from about 0.1 parts by weight to about 5 parts by weight in the biodegradable polyester resin based on 100 parts by weight of the biodegradable polyester resin. The ester polyol may be included in a content ranging from about 0.5 parts by weight to about 3 parts by weight in the biodegradable polyester resin based on 100 parts by weight of the biodegradable polyester resin. The ester polyol may be included in a content ranging from about 1 part by weight to about 3 parts by weight in the biodegradable polyester resin based on 100 parts by weight of the biodegradable polyester resin.

Since the ester polyol has the characteristics, the biodegradable polyester resin composition according to one embodiment may have appropriate wet hardness, appropriate mechanical properties, appropriate solvent resistance, appropriate hydrolysis and appropriate biodegradability.

The biodegradable polyester resin composition according to one embodiment may include the biodegradable resin in a content ranging from about 30 wt % or more based on the total weight of the composition. The biodegradable polyester resin composition according to one embodiment may include the biodegradable resin in a content ranging from about 50 wt % or more based on the total weight of the composition. The biodegradable polyester resin composition according to one embodiment may include the biodegradable resin in a content ranging from about 70 wt % or more based on the total weight of the composition. The biodegradable polyester resin composition according to one embodiment may include the biodegradable resin in a content ranging from about 80 wt % or more based on the total weight of the composition. The biodegradable polyester resin composition according to one embodiment may include the biodegradable resin in a content ranging from about 90 wt % or more based on the total weight of the composition. The biodegradable polyester resin composition according to one embodiment may include the biodegradable resin in a content ranging from about 95 wt % or more based on the total weight of the composition. The biodegradable polyester resin composition according to one embodiment may include the biodegradable resin in a content ranging from about 99 wt % or more based on the total weight of the composition. A maximum content ranging from the biodegradable resin in the biodegradable polyester resin composition according to one embodiment may range from about 100 wt % based on the total weight of the composition.

The biodegradable polyester resin composition according to one embodiment may further include a reinforcing material. The reinforcing material may improve the mechanical properties of the biodegradable polyester resin composition according to one embodiment and the mechanical properties of a film or molded article made of the composition. In addition, the reinforcing material may control the deformation characteristics of the biodegradable polyester resin composition according to one embodiment due to ultraviolet rays. In addition, the reinforcing material may control the hydrolysis characteristics of the biodegradable polyester resin composition according to one embodiment. In addition, the reinforcing material may control the biodegradability of the biodegradable polyester resin according to one embodiment.

The reinforcing material may be a fiber derived from biomass. The reinforcing material may be a fiber made of an organic material. The reinforcing material may be nanocellulose.

The nanocellulose may be one or more selected from the group consisting of nanocrystalline cellulose, cellulose nanofiber, microfibrillated cellulose, hydroxymethyl cellulose, hydroxyethyl cellulose, hydroxypropyl cellulose, hydroxypropylmethyl cellulose, cellulose acetate, methyl cellulose, ethyl cellulose, propyl cellulose, butyl cellulose, pentyl cellulose, hexyl cellulose and cyclohexyl cellulose.

The nanocellulose may include an ion-bonded metal. The nanocrystalline cellulose may include elemental sodium. In addition, the nanocrystalline cellulose may include sulphate. The nanocrystalline cellulose may include a carboxylate. The nanocrystalline cellulose may include a cellulose hydrogen sulphate sodium salt.

The nanocellulose may be represented by Formula 13 below:

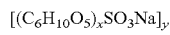  [Formula 13]

where x is 1 to 35, and y is 1 to 10. x may be 15 to 35, and y may be 1 to 10.

The specific surface area of the nanocellulose may range from about 200 m$^2$/g to about 600 m$^2$/g. The specific surface area of the nanocellulose may range from about 250 m$^2$/g to about 500 m$^2$/g.

The weight average molecular weight of the nanocellulose may range from about 10000 g/mol to about 40000 g/mol. The weight average molecular weight of the nanocrystalline cellulose may range from about 11000 g/mol to about 35000 g/mol.

The moisture content ranging from the nanocrystalline cellulose may range from about 2 wt % to about 8 wt %. The moisture content ranging from the nanocrystalline cellulose may range from about 4 wt % to about 6 wt %.

The average diameter of the nanocellulose may range from about 0.5 nm to about 10 nm. The average diameter of the nanocellulose may range from about 1 nm to about 8 nm. The average diameter of the nanocellulose may range from about 1.5 nm to about 7 nm.

The average length of the nanocellulose may range from about 20 nm to about 300 nm. The average length of the nanocellulose may range from about 30 nm to about 180 nm. The average length of the nanocellulose may range from about 35 nm to about 150 nm.

When the diameter and length of the nanocellulose satisfy the ranges, the biodegradability and properties of the biodegradable polyester resin or the biodegradability and properties of a biodegradable polyester sheet, film and molded article made using the biodegradable polyester resin may be further improved. See tables and examples herein.

The diameter and length of the nanocellulose may be measured by atomic force microscopy in a water-dispersed state.

The sulfur content ranging from the nanocellulose may range from about 0.1 wt % to about 1.2 wt % based on the total amount of the nanocrystalline cellulose. The sulfur content ranging from the nanocellulose may range from about 0.2 wt % to about 1.1 wt % based on the total amount of the nanocellulose.

The pH of the nanocellulose may be 5 to 8. The pH of the nanocellulose may be 6 to 8.

The zeta potential of the nanocellulose may range from about −25 mV to about −50 mV. The zeta potential of the nanocellulose may range from about −30 mV to about −45 mV.

The nanocellulose may be included in a content ranging from about 0.01 parts by weight to about 2 parts by weight in the biodegradable polyester resin composition according to one embodiment based on 100 parts by weight of the biodegradable polyester resin. The nanocellulose may be included in a content ranging from about 0.03 parts by weight to about 1.5 parts by weight in the biodegradable polyester resin composition according to one embodiment based on 100 parts by weight of the biodegradable polyester resin. The nanocellulose may be included in a content ranging from about 0.04 parts by weight to about 1.2 parts by weight in the biodegradable polyester resin composition according to one embodiment based on 100 parts by weight of the biodegradable polyester resin. The nanocellulose may be included in a content ranging from about 0.05 parts by weight to about 1 part by weight in the biodegradable polyester resin composition according to one embodiment based on 100 parts by weight of the biodegradable polyester resin.

Since the nanocellulose has the characteristics, it may be uniformly dispersed in the biodegradable polyester resin composition according to one embodiment.

Since the nanocellulose has the characteristics, it may improve the mechanical properties of the biodegradable polyester resin composition according to one embodiment.

In addition, the nanocellulose severs as a nucleating agent, thereby being capable of improving the crystallization rate of the biodegradable polyester resin composition according to one embodiment. Accordingly, the nanocellulose may increase the crystallization temperature of the biodegradable polyester resin composition according to one embodiment.

Since the nanocellulose has the characteristics, the biodegradable polyester resin composition according to one embodiment may have appropriate UV resistance.

Since the nanocellulose has the characteristics, the biodegradable polyester resin composition according to one embodiment may have an appropriate biodegradation rate.

Since the nanocellulose has the characteristics, the biodegradable polyester resin composition according to one embodiment may have an appropriate hydrolysis rate.

The biodegradable polyester resin composition according to one embodiment may further include a light stabilizer.

The light stabilizer may be a hindered amine-based light stabilizer. The light stabilizer may include SUNOVIN 904 manufactured by SUNSHOW.

The light stabilizer may have a high molecular weight. The weight average molecular weight of the light stabilizer may range from about 1800 g/mol to about 5000 g/mol. The weight average molecular weight of the light stabilizer may range from about 2000 g/mol to about 4000 g/mol.

The melting point of the light stabilizer may range from about 100° C. to about 200° C. The melting point of the light stabilizer may range from about 110° C. to about 150° C.

When thermogravimetric analysis is performed up to about 424° C., the volatilization amount of the light stabilizer may range from about 1 wt % or less. In addition, when thermogravimetric analysis is performed up to about 424° C., the carbonization amount of the light stabilizer may range from about 0.1 wt % or less.

The light stabilizer may be included in a content ranging from about 0.01 parts by weight to about 5 parts by weight in the biodegradable polyester resin composition according to one embodiment based on 100 parts by weight of the biodegradable polyester resin. The light stabilizer may be included in a content ranging from about 0.05 parts by weight to about 1 part by weight in the biodegradable polyester resin composition according to one embodiment based on 100 parts by weight of the biodegradable polyester resin. The light stabilizer may be included in a content ranging from about 0.1 parts by weight to about 0.5 parts by weight in the biodegradable polyester resin composition according to one embodiment based on 100 parts by weight of the biodegradable polyester resin.

Since the light stabilizer has the above characteristics, it may be uniformly dispersed in the biodegradable polyester resin composition according to one embodiment.

Since the light stabilizer has the above characteristics, it may improve the mechanical properties of the biodegradable polyester resin composition according to one embodiment.

Since the light stabilizer has the above characteristics, the biodegradable polyester resin composition according to one embodiment may have appropriate UV resistance.

Since the light stabilizer has the above characteristics, the biodegradable polyester resin composition according to one embodiment may have an appropriate biodegradation rate.

Since the light stabilizer has the above characteristics, the biodegradable polyester resin composition according to one embodiment may have an appropriate hydrolysis rate.

The biodegradable polyester resin composition according to one embodiment may include a metal salt.

The metal salt may be included in a content ranging from about 0.1 ppm to about 1000 ppm based on the total weight of the biodegradable polyester resin composition according to one embodiment. The metal salt may be included in a content ranging from about 1 ppm to about 500 ppm based on the total weight of the biodegradable polyester resin composition according to one embodiment. The metal salt may be included in a content ranging from about 1 ppm to about 100 ppm based on the total weight of the biodegradable polyester resin composition according to one embodiment. The metal salt may be included in a content ranging from about 1 ppm to about 50 ppm based on the total weight of the biodegradable polyester resin composition according to one embodiment.

The metal salt may be at least one or more selected from the group consisting of a nitrate, a sulfate, hydrochloride, a carboxylate and the like. The metal salt may be at least one or more selected from the group consisting of titanium salt, silicon salt, sodium salt, calcium salt, potassium salt, magnesium salt, copper salt, iron salt, aluminum salt, silver salt and the like. The metal salt may be at least one or more selected from the group consisting of magnesium acetate, calcium acetate, potassium acetate, copper nitrate, silver nitrate, sodium nitrate, and the like.

The metal salt may include one or more selected from the group consisting of iron (Fe), magnesium (Mg), nickel (Ni), cobalt (Co), copper (Cu), palladium (Pd), zinc (Zn), vanadium (V), titanium (Ti), indium (In), manganese (Mn), silicon (Si) and tin (Sn).

In addition, the metal salt may be selected from the group consisting of acetate, nitrate, nitride, sulfide, sulfate, sulfoxide, hydroxide, hydrate, chloride, chlorinate and bromide.

Since the biodegradable polyester resin composition according to one embodiment includes the metal salt within the content, a hydrolysis rate and a biodegradation rate may be appropriately controlled.

The biodegradable polyester resin composition according to one embodiment may include an elongation improver. Examples of the elongation improver include oil such as paraffin oil, naphthenic oil, or aromatic oil, or adipate such as dibutyl adipate, diethylhexyl adipate, dioctyl adipate, or diisopropyl adipate.

The elongation improver may be included in a content ranging from about 0.001 parts by weight to about 1 part by weight in the biodegradable polyester resin composition according to one embodiment based on 100 parts by weight of the biodegradable polyester resin. The elongation improver may be included in a content ranging from about 0.01 parts by weight to about 1 part by weight in the biodegradable polyester resin composition according to one embodiment based on 100 parts by weight of the biodegradable polyester resin.

Since the elongation improver has the characteristics, it may improve the mechanical properties of the biodegradable polyester resin composition according to one embodiment.

Since the elongation improver has the characteristics, the biodegradable polyester resin composition according to one embodiment may have appropriate UV resistance.

Since the elongation improver has the characteristics, the biodegradable polyester resin composition according to one embodiment may have an appropriate biodegradation rate.

Since the elongation improver has the characteristics, the biodegradable polyester resin composition according to one embodiment may have an appropriate hydrolysis rate.

The biodegradable polyester resin composition according to one embodiment includes a crystallization regulator. Since the biodegradable polyester resin composition according to one embodiment appropriately includes the crystallization regulator, it may appropriately control crystal properties.

In addition, the elongation improver may be used as the crystallization regulator. Since the biodegradable polyester resin composition according to one embodiment appropriately includes the elongation improver, it may appropriately control crystal properties.

The crystallization regulator may include diisopropyl adipate. In addition, the crystallization regulator may include the diisopropyl adipate and tetrahydrofuran. In addition, the crystallization regulator may include the diisopropyl adipate, the tetrahydrofuran and cyclopentanone.

The crystallization regulator may be included in a content ranging from about 10 ppm to about 20000 ppm in the biodegradable polyester resin composition according to one embodiment based on the total weight of the biodegradable polyester resin composition according to one embodiment. The crystallization regulator may be included in a content ranging from about 10 ppm to about 10000 ppm in the biodegradable polyester resin composition according to one embodiment based on the total weight of the biodegradable polyester resin composition according to one embodiment. The crystallization regulator may be included in a content ranging from about 100 ppm to about 5000 ppm in the biodegradable polyester resin composition according to one embodiment based on the total weight of the biodegradable polyester resin composition according to one embodiment. The crystallization regulator may be included in a content ranging from about 50 ppm to about 5000 ppm in the biodegradable polyester resin composition according to one embodiment based on the total weight of the biodegradable polyester resin composition according to one embodiment.

In addition, a weight ratio of the diisopropyl adipate to the tetrahydrofuran may range from about 1:1 to about 1:5. A weight ratio of the diisopropyl adipate to the tetrahydrofuran may range from about 1:2 to about 1:4. A weight ratio of the diisopropyl adipate to the tetrahydrofuran may range from about 1:2.5 to about 1:3.5.

In addition, a weight ratio of the diisopropyl adipate to the cyclopentanone may range from about 1:1 to about 1:5. A weight ratio of the diisopropyl adipate to the cyclopentanone may range from about 1:2 to about 1:4. A weight ratio of the diisopropyl adipate to the cyclopentanone may range from about 1:2.5 to about 1:3.5.

The crystallization regulator may be added in the process of preparing the biodegradable polyester resin, or the content ranging from the crystallization regulator may be controlled depending upon reaction of input raw materials. That is, to appropriately control the content ranging from the crystallization regulator, input amounts and/or process conditions may be appropriately controlled during the preparation process.

When the crystallization regulator has the characteristics, the biodegradable resin composition according to an example may have appropriate crystal properties and appropriate mechanical characteristics.

The biodegradable polyester resin composition according to one embodiment may further include an anti-hydrolysis agent.

The anti-hydrolysis agent may be at least one or more selected from among silicone-based compounds such as silane, silazane and siloxane.

The anti-hydrolysis agent may include alkoxy silane. The anti-hydrolysis agent may include trimethoxy silane and/or triethoxy silane. The anti-hydrolysis agent may include alkoxy silane including an epoxy group. The anti-hydrolysis agent may include at least one or more selected from the group consisting of 2-(3,4-epoxycyclohexyl) ethyltrimethoxysilane, 3-glycidoxypropyl methyldimethoxysilane, 3-glycidoxypropyl trimethoxysilane, 3-glycidoxypropyl methyldiethoxysilane and 3-glycidoxypropyl triethoxysilane.

The anti-hydrolysis agent may be included in a content ranging from about 1 ppm to about 10000 ppm in the biodegradable polyester resin composition according to one embodiment. The anti-hydrolysis agent may be included in a content ranging from about 1 ppm to about 1000 ppm in the biodegradable polyester resin composition according to one embodiment. The anti-hydrolysis agent may be included in a content ranging from about 5 ppm to 500 ppm in the biodegradable polyester resin composition according to one embodiment. The anti-hydrolysis agent may be included in a content ranging from about 10 ppm to 300 ppm in the biodegradable polyester resin composition according to one embodiment.

The anti-hydrolysis agent may be bonded to the biodegradable polyester resin.

The anti-hydrolysis agent may be chemically bonded to the biodegradable polyester resin. The anti-hydrolysis agent may be chemically bonded to a polymer included in the biodegradable polyester resin. The anti-hydrolysis agent may couple polymers included in the biodegradable polyester resin.

Since the biodegradable polyester resin composition according to one embodiment includes the anti-hydrolysis agent within the range, it may have appropriate hydrolysis resistance. In particular, since the biodegradable polyester resin according to one embodiment includes the anti-hydrolysis agent within the range, it may have appropriate initial hydrolysis characteristics and improved biodegradability.

Accordingly, the biodegradable polyester resin composition according to one embodiment may include a silicon element. The biodegradable polyester resin composition according to one embodiment may include the silicon element in a content ranging from about 1 ppm to about 150 ppm. The biodegradable polyester resin composition according to one embodiment may include the silicon element in a content ranging from about 0.1 ppm to about 100 ppm. The biodegradable polyester resin composition according to one embodiment may include the silicon element in a content ranging from about 0.1 ppm to about 50 ppm. The biodegradable polyester resin composition according to one embodiment may include the silicon element in a content ranging from about 0.1 ppm to about 20 ppm.

In addition, the anti-hydrolysis agent may also react with a terminal carboxyl group or an unreacted carboxyl group. Accordingly, the biodegradable polyester resin composition according to one embodiment may have a low acid value.

In addition, the anti-hydrolysis agent may couple polymers included in the biodegradable polyester resin, so that the biodegradable polyester resin composition according to one embodiment may increase the ratio of high-molecular-weight polymers. Accordingly, the mechanical properties of the biodegradable polyester resin composition according to one embodiment may be improved.

The biodegradable polyester resin composition according to one embodiment may further include a chain extender.

The chain extender may include isocyanate.

The chain extender may be at least one or more selected from the group consisting of monofunctional isocyanate or polyfunctional isocyanate.

The chain extender may be at least one or more selected from the group consisting of tolylene 2,4-diisocyanate, tolylene 2,6-diisocyanate, diphenylmethane 4,4'-diisocyanate and 2,4'-diisocyanate, naphthalene 1,5-diisocyanate, xylylene diisocyanate, hexamethylene diisocyanate, pentamethylene diisocyanate, isophorone diisocyanate and methylenebis(4-isocyanatocyclohexane).

The chain extender may include triisocyanate. The chain extender may include tri (4-isocyanatophenyl)methane.

The chain extender may include an acrylic polymer. The acrylic polymer may include an acryl group. The acryl group may be bonded to a main chain as a side chain. The acrylic polymer may include an epoxy group. The epoxy group may be bonded to the main chain as a side chain.

The chain extender may include a styrene-based polymer. The chain extender may include a styrene-based glycidyl acrylate.

The chain extender may be chemically bonded to the biodegradable polyester resin. The chain extender may be chemically bonded to a polymer included in the biodegradable polyester resin. The chain extender may be bonded to a terminal of the polymer included in the biodegradable polyester resin. In addition, the chain extender may be bonded to terminals of three polymers included in the biodegradable polyester resin.

The chain extender may be included in the biodegradable polyester resin composition according to one embodiment in a content ranging from about 0.1 wt % to about 10 wt % based on the total amount of the composition. The chain extender may be included in the biodegradable polyester resin composition according to one embodiment in a content ranging from about 0.2 wt % to about 8 wt % based on the total amount of the composition. The chain extender may be included in the biodegradable polyester resin composition according to one embodiment in a content ranging from about 0.3 wt % to about 7 wt % based on the total amount of the composition.

When the biodegradable polyester resin composition according to one embodiment includes the chain extender within the range, it may have appropriate hydrolysis resistance and appropriate biodegradability.

In addition, the chain extender may react with a terminal carboxyl group or an unreacted carboxyl group. Accordingly, the biodegradable polyester resin composition according to one embodiment may have a low acid value.

In addition, the chain extender couples polymers included in the biodegradable polyester resin, so that the biodegradable polyester resin composition according to one embodiment may increase the ratio of high-molecular-weight polymers. Accordingly, the mechanical properties of the biodegradable polyester resin composition according to one embodiment may be improved.

The biodegradable polyester resin composition according to one embodiment may include an oligomer. The molecular weight of the oligomer may range from about 400 to about 1300.

The oligomer may be included in the biodegradable polyester resin composition according to one embodiment in a content ranging from about 3000 ppm to about 30000 ppm based on the total amount of the resin composition. The oligomer may be included in the biodegradable polyester resin composition according to one embodiment in a content ranging from about 5000 ppm to about 20000 ppm based on the total amount of the resin composition. The oligomer may be included in the biodegradable polyester resin composition according to one embodiment in a content ranging from about 5000 ppm to about 15000 ppm based on the total amount of the resin composition. The oligomer may be included in the biodegradable polyester resin composition according to one embodiment in a content ranging from about 7000 ppm to about 15000 ppm based on the total amount of the resin composition.

The oligomer may be a reaction product of at least two or more of the diol, the aromatic dicarboxylic acid and the aliphatic dicarboxylic acid. The oligomer may be a reaction product of 1,4-butanediol, terephthalic acid and adipic acid.

The oligomer may include an oligomer in which a molar ratio of the aliphatic dicarboxylic acid is higher than that of the aromatic dicarboxylic acid. In the oligomer, a ratio of an oligomer containing a relatively large amount of the aliphatic dicarboxylic acid may be higher than a ratio of an oligomer containing a relatively large amount of the aromatic dicarboxylic acid.

The oligomer may appropriately control the hydrolysis degree of the biodegradable polyester resin composition according to one embodiment. The oligomer may be a hydrolysis regulator that appropriately controls the hydrolysis degree of the biodegradable polyester resin composition according to one embodiment.

In addition, the oligomer may appropriately control the biodegradability of the biodegradable polyester resin composition according to one embodiment. The oligomer may be a biodegradation regulator that appropriately controls the biodegradability of the biodegradable polyester resin composition according to one embodiment.

The biodegradable polyester resin composition according to one embodiment may comprise a heat stabilizer. The heat stabilizer may be a phosphorus-based heat stabilizer.

The heat stabilizer may be at least one or more selected from the group consisting of an amine-based high-temperature heat stabilizer such as tetraethylenepentamine, triethylphosphonoacetate, phosphoric acid, phosphorous acid, polyphosphoric acid, trimethyl phosphate (TMP), triethyl phosphate, trimethyl phosphine, triphenyl phosphine and the like.

In addition, the heat stabilizer may be an antioxidant having an antioxidant function.

The content ranging from the heat stabilizer may range from about 3000 ppm or less based on the total weight of the biodegradable polyester resin. The content ranging from the heat stabilizer may be, for example, 10 ppm to 3,000 ppm, 20 ppm to 2,000 ppm, 20 ppm to 1,500 ppm or 20 ppm to 1,000 ppm based on the total weight of the biodegradable polyester resin. When the content ranging from the heat stabilizer satisfies the range, the deterioration of the polymer due to high temperature during the reaction process may be controlled so that terminal groups of the polymer may be reduced and the color may be improved. In addition, the heat stabilizer may suppress the activation of a titanium-based catalyst, thereby controlling a reaction rate.

The biodegradable polyester resin composition according to one embodiment may include an elongation improver. Examples of the elongation improver include oil such as paraffin oil, naphthenic oil, or aromatic oil, or adipate such as dibutyl adipate, diethylhexyl adipate, dioctyl adipate, or diisopropyl adipate.

The elongation improver may be included in the biodegradable polyester resin composition according to one embodiment in a content ranging from about 0.001 parts by weight to about 1 part by weight based on 100 parts by weight of the biodegradable polyester resin. The elongation improver may be included in a content ranging from about 0.01 parts by weight to about 1 part by weight based on 100 parts by weight of the biodegradable polyester resin in the biodegradable polyester resin composition according to one embodiment.

The biodegradable polyester resin composition according to one embodiment may include an inorganic filler. The inorganic filler may be at least one or more selected from the group consisting of calcium sulfate, barium sulfate, talc, talc powder, bentonite, kaolinite, chalk powder, calcium carbonate, graphite, gypsum, electrically conductive carbon black, calcium chloride, iron oxide, aluminum oxide, potassium oxide, dolomite, silicon dioxide, wollastonite, titanium dioxide, silicate, mica, glass fiber, mineral fiber, and the like.

In a particle diameter distribution obtained by laser diffraction for the inorganic filler, a cumulative 50% particle diameter ($D_{50}$) based on volume may range from about 100 μm or less, about 85 μm or less, about 70 μm or less, about 50 μm or less, about 25 μm or less, about 10 μm or less, about 5 μm or less, about 3 μm or less or about 1 μm or less.

In addition, the specific surface area of the inorganic filler may range from about 100 $\mu m^2/g$ or more. For example, the specific surface area of the inorganic filler may range from about 100 $\mu m^2/g$ or more, about 105 $\mu m^2/g$ or more or about 110 $\mu m^2/g$ or more.

The inorganic filler may be included in the biodegradable polyester resin composition according to one embodiment in a content ranging from about 3 parts by weight to about 50 parts by weight based on 100 parts by weight of the biodegradable polyester resin. The inorganic filler may be included in the biodegradable polyester resin composition according to one embodiment in a content ranging from about 5 parts by weight to about 30 parts by weight based on 100 parts by weight of the biodegradable polyester resin.

The inorganic filler may be included in a content ranging from about 3,000 ppm or less based on the total weight of the biodegradable polyester resin composition according to one embodiment. For example, the content ranging from the inorganic filler may range from about 3,000 ppm or less, about 1,500 ppm or less, about 1,200 ppm or less, about 800 ppm or less or about 600 ppm or less, particularly about 50 ppm or more, about 100 ppm or more, about 130 ppm or more, about 150 ppm or more or about 180 ppm or more based on the total weight of the biodegradable polyester resin composition according to one embodiment.

Since the biodegradable polyester resin composition according to one embodiment includes the inorganic filler within the range, the biodegradable polyester resin composition according to one embodiment may have mechanical properties, appropriate UV resistance, an appropriate biodegradation rate and an appropriate hydrolysis rate. See tables and examples herein.

The biodegradable polyester resin composition according to one embodiment may further include a heterogeneous biodegradable resin. The biodegradable polyester resin composition according to an example may be a composite resin composition including two or more types of resins, a filler and an additive.

The heterogeneous biodegradable resin may be at least one or more selected from the group consisting of polybutylene azelate terephthalate (PBAzT), polybutylene sebacate terephthalate (PBSeT) and polybutylene succinate terephthalate (PBST), polyhydroxyalkanoate (PHA) or polylactic acid (PLA).

The heterogeneous biodegradable resin may be included in the biodegradable polyester resin composition according to one embodiment in a content ranging from about 10 parts by weight to about 100 parts by weight based on 100 parts by weight of the biodegradable polyester resin. The heterogeneous biodegradable resin may be included in the biodegradable polyester resin composition according to one embodiment in a content ranging from about 10 parts by weight to about 60 parts by weight based on 100 parts by weight of the biodegradable polyester resin. The heterogeneous biodegradable resin may be included in the biodegradable polyester resin composition according to one embodiment in a content ranging from about 20 parts by weight to about 50 parts by weight based on 100 parts by weight of the biodegradable polyester resin.

The heterogeneous biodegradable resin may supplement the mechanical, optical and chemical properties of the biodegradable polyester resin. Since the biodegradable polyester resin composition according to one embodiment includes the heterogeneous biodegradable resin in the content, the biodegradable polyester resin composition according to one embodiment may have mechanical properties, appropriate UV resistance, an appropriate biodegradation rate and an appropriate hydrolysis rate.

In addition, the amount of carboxyl terminal groups of the biodegradable polyester resin composition according to one embodiment may range from about 50 eq/ton or less. For example, the number of the carboxyl terminal groups of the biodegradable polyester resin according to one embodiment may range from about 50 eq/ton or less, about 48 eq/ton or less, about 45 eq/ton or less or about 42 eq/ton or less. When the number of the carboxyl terminal groups is adjusted to the range, deterioration may be prevented and improved mechanical properties may be implemented when the biodegradable polyester resin composition according to one embodiment is extruded to form a molded article.

In addition, the intrinsic viscosity (IV) of the biodegradable polyester resin composition according to one embodiment may range from about 0.9 dl/g or more. The intrinsic viscosity of the biodegradable polyester resin composition according to one embodiment may range from about 0.95 dl/g or more, about 1.0 dl/g or more, about 1.1 dl/g or more, about 1.2 dl/g or more or about 1.3 dl/g or more. The intrinsic viscosity of the biodegradable polyester resin composition according to one embodiment may range from about 0.95 dl/g to about 1.7 dl/g. The intrinsic viscosity of the biodegradable polyester resin composition according to one embodiment may range from about 1.3 dl/g to about 1.7 dl/g. The intrinsic viscosity of the biodegradable polyester resin composition according to one embodiment may range from about 1.4 dl/g to about 1.7 dl/g.

A process of preparing the biodegradable polyester resin composition according to one embodiment is as follows.

Referring to FIG. 1, an apparatus for producing the biodegradable polyester resin includes a slurry stirrer 100, an esterification part 200, a polycondensation reaction part 300, a post-treatment part 400, a first recovery part 510 and a second recovery part 520.

A method of preparing the biodegradable polyester resin includes a step of preparing a slurry including the diol and the aromatic dicarboxylic acid.

The step of preparing a slurry includes a step of mixing and processing the diol and the aromatic dicarboxylic acid. That is, the step of preparing a slurry is a pretreatment step before an esterification and may be a step of mixing the diol and the aromatic dicarboxylic acid and slurrying the mixture. Here, the diol may include a biomass-based diol component.

The temperature of the slurry of the diol and the aromatic dicarboxylic acid may range from about 5° C. to about 15° C. higher than the melting point of the diol. For example, when the diol is 1,4-butanediol, the temperature of the slurry may range from about 35° C. to about 45° C.

The diol and the aromatic dicarboxylic acid are fed into and stirred in the slurry stirrer 100, thereby preparing the slurry.

By mixing, pre-treating, and slurrying the diol and the aromatic dicarboxylic acid, the diol and the aromatic dicarboxylic acid may be uniformly reacted and the speed of an esterification may be effectively accelerated, thereby increasing reaction efficiency.

In particular, when an aromatic dicarboxylic acid, such as terephthalic acid, has complete crystallinity and is in powder form, it may be difficult to cause a homogeneous reaction due to very low solubility in the diol. Therefore, the slurrying pretreatment process may play a very important role in providing a biodegradable polyester resin, sheet, film and molded article having excellent properties according to one embodiment of the present disclosure and improving reaction efficiency.

When the aromatic dicarboxylic acid is terephthalic acid, the terephthalic acid is a white crystal that has complete crystallinity and sublimes at around 300° C. under atmospheric pressure without a melting point. In addition, the terephthalic acid has very low solubility in the diol, making it difficult for a homogeneous reaction to occur. Accordingly, when a pretreatment process is performed before an esterification, a uniform reaction may be induced by increasing the surface area for reacting with a diol in a solid matrix of terephthalic acid.

In addition, when the aromatic dicarboxylic acid is dimethyl terephthalate, the dimethyl terephthalate may be made into a molten state at about 142° C. to 170° C. by the pretreatment process and reacted with the diol, so that an esterification can be proceeded faster and more efficiently.

Meanwhile, in the pretreatment step of preparing the slurry, the structure and properties of the biodegradable polyester resin may vary depending on the particle diameter, particle diameter distribution, pretreatment reaction conditions, and the like of the aromatic dicarboxylic acid.

For example, the aromatic dicarboxylic acid may include terephthalic acid, and the terephthalic acid may have an average particle diameter (D50) of 10 μm to 400 μm measured by a particle diameter analyzer Microtrac S3500 in a particle diameter distribution (PSD), and a standard deviation of the average particle diameter (D50) may be 100 or less. The standard deviation means the square root of the variance. The average particle diameter (D50) of the terephthalic acid may be for example 20 μm to 200 μm, for example 30 μm to 180 μm, or for example 100 μm to 160 μm. When the average particle diameter (D50) of the terephthalic acid satisfies the range, it may be more advantageous in terms of the solubility improvement of the diol and the reaction rate.

In the pretreatment process, the diol and the aromatic dicarboxylic acid may be mixed and fed into the slurry stirrer 100 (tank).

The slurry stirrer 100 may be provided with, for example, an anchor-type bottom, a height to the agitator of 20 mm or more, and two or more rotary blades, which may be more advantageous to achieve an efficient stirring effect.

For example, the slurry stirrer 100 has a height of 20 mm or more to the agitator, i.e., the reactor and the bottom of the agitator may be almost attached to each other. In this case, a slurry may be obtained without precipitation. If the shape, shape and rotary blades of the agitator do not satisfy the conditions, the aromatic dicarboxylic acid may precipitate to the bottom when the diol and the aromatic dicarboxylic acid are initially mixed. In this case, phase separation may occur.

The pretreatment step of preparing the slurry may include a step of mixing the diol and the aromatic dicarboxylic acid and stirring the mixture about 50 rpm to about 200 rpm at about 30° C. to about 100° C. for 10 minutes or more, for example 10 minutes to 200 minutes.

The diol may have characteristics as described above.

The diol may be added at one time or dividedly. For example, the diol may be added dividedly when mixing with an aromatic dicarboxylic acid and when mixing with an aliphatic dicarboxylic acid.

The aromatic dicarboxylic acid may have characteristics as described above.

In the pretreatment step of preparing the slurry, a molar ratio of the diol to the aromatic dicarboxylic acid may range from about 0.8:1 to about 2:1. In the pretreatment step of preparing the slurry, a molar ratio of the diol to the aromatic dicarboxylic acid may range from about 1.1:1 to about 1.5:1. In the pretreatment step of preparing the slurry, a molar ratio of the diol to the aromatic dicarboxylic acid may range from about 1.2:1 to about 1.5:1.

When the diol is added in a larger amount than the aromatic dicarboxylic acid, the aromatic dicarboxylic acid may be easily dispersed.

In addition, an additive may be added to the slurry. The nanocellulose and/or the metal salt may be added in the form of a dispersion or solution to the slurry.

In the method of preparing the biodegradable polyester resin, a prepolymer is obtained by esterification using a slurry obtained by mixing and pretreating a diol and an aromatic dicarboxylic acid, and the prepolymer is condensation-polymerized, so that the desired structure and physical properties of the biodegradable polyester resin according to the embodiment of the present disclosure may be efficiently achieved.

The method of preparing the biodegradable polyester resin includes a step of esterifying the slurry and the aliphatic dicarboxylic acid to prepare a prepolymer. The slurry and the aliphatic dicarboxylic acid may be reacted in the ester reaction part.

In the esterification, the reaction time may be shortened by using the slurry. For example, a slurry obtained from the pretreatment step may shorten the reaction time of the esterification by 1.5 times or more.

The esterification may be performed at least twice. A prepolymer to be added to a condensation polymerization process may be formed by the esterification.

In one embodiment, the esterification may be performed at once after adding an aliphatic dicarboxylic acid, or a diol and an aliphatic dicarboxylic acid to the slurry. That is, the esterification may proceed when the slurry is fed into the esterification reactor and the aliphatic dicarboxylic acid alone or the aliphatic dicarboxylic acid and the diol are fed into the esterification reactor.

The diol and the aliphatic dicarboxylic acid may be added in the form of a slurry to a slurry including the aromatic dicarboxylic acid.

In the slurry of the diol and the aliphatic dicarboxylic acid, the average particle diameter (D50) of the aliphatic dicarboxylic acid may range from about 50 μm to about 150 μm. In the slurry of the diol and the aliphatic dicarboxylic acid, the average particle diameter (D50) of the aliphatic dicarboxylic acid may range from about 60 μm to about 120 μm.

In the esterification, the total number of moles of the diols introduced may range from about 1.0 to about 1.8 relative to the total number of moles of the aromatic dicarboxylic acid and the aliphatic dicarboxylic acid. In the esterification, the total number of moles of the diols introduced may range from about 1.1 to about 1.6 relative to the total number of moles of the aromatic dicarboxylic acid and the aliphatic dicarboxylic acid.

In addition, the temperature of the slurry of the diol and the aliphatic dicarboxylic acid may range from about 5° C. to about 15° C. higher than the melting point of the diol.

In addition, various additives such as the nanocellulose may also be added to the slurry of the diol and the aliphatic dicarboxylic acid.

The esterification may be performed at about 250° C. or less for about 0.5 hours to about 5 hours. Specifically, the esterification may be performed at about 180° C. to about 250° C., about 185° C. to about 240° C. or about 200° C. to about 240° C. under normal pressure or reduced pressure until the theoretical amount of water as a by-product reaches 95%. For example, the esterification may be performed for 0.5 hours to 5.5 hours, 0.5 hours to 4.5 hours or 1 hour to 4 hours, but is not limited thereto.

In one embodiment, the slurry, the aliphatic dicarboxylic acid and the diol may be mixed, and a first esterification may be performed. In the reaction mixture for the first esterification, a molar ratio of an aromatic dicarboxylic acid to the aliphatic dicarboxylic acid may be 1:0.05 to 1:0.5.

In addition, after the first esterification, the mixture of the slurry, the aliphatic dicarboxylic acid and the diol is fed into the esterification part and may undergo a second esterification together with the first esterification product. In the mixture fed into the second esterification, a molar ratio of the aromatic dicarboxylic acid to the aliphatic dicarboxylic acid may be 0.05:1 to 0.5:1.

The first esterification may be performed at 250° C. or less for 1.25 hours to 4 hours. Specifically, the first esterification may be performed at 180° C. to 250° C., 185° C. to 240° C. or 200° C. to 240° C. under normal pressure or reduced pressure until the theoretical amount of water as a by-product reaches 95%. For example, the first esterification may be performed for 1.25 hours to 4 hours, 1.25 hours to 3.5 hours or 2.5 hours to 3 hours, but is not limited thereto.

The second esterification may be performed for 0.25 hours to 3.5 hours at about 250° C. or less. Specifically, the second esterification may be performed at 180° C. to 250° C., 185° C. to 240° C. or 200° C. to 240° C. under normal pressure or reduced pressure until the theoretical amount of water as a by-product reaches 95%. For example, the second esterification may be performed for 0.5 hours to 3 hours, 1 hour to 2.5 hours or 1.5 hours to 2.5 hours, but is not limited thereto.

In the first esterification and the second esterification, the number ratio, the alternating ratio, the hard segment ratio, the soft segment ratio, and the like of the first block and the second block may be controlled by adjusting the reaction temperature, the reaction time, and the contents of diol, aromatic dicarboxylic acid, and aliphatic dicarboxylic acid added, respectively. In addition, when the esterification is divided into the first esterification and the second esterification, the overall esterification may be precisely controlled. Accordingly, when the esterification is divisionally performed, the reaction stability and reaction uniformity of the esterification may be improved.

In addition, in the second esterification, the branching agent may be additionally added. That is, the prepolymer may be formed by reacting the mixture of the slurry, the aliphatic dicarboxylic acid and the diol, the branching agent and the first esterification product. The characteristics and content ranging from the branching agent may be the same as described above.

In the second esterification, a prepolymer may be formed.

Alternatively, after the second esterification, third esterification may be performed and the prepolymer may be formed.

After completing the second esterification, a third esterification may be performed. Here, a monomer composition including at least one or more of the diol, the aromatic dicarboxylic acid and the aliphatic dicarboxylic acid may be added to the second esterification product and the third esterification may be performed.

The monomer composition may be added to the second esterification product in a content ranging from about 0.5 parts by weight to about 10 parts by weight based on 100 parts by weight of the second esterification product.

In addition, in the monomer composition, a molar ratio of the aromatic dicarboxylic acid to the aliphatic dicarboxylic acid may range from about 1:1 to about 1:3. In the monomer composition, a molar ratio of the aromatic dicarboxylic acid to the aliphatic dicarboxylic acid may range from about 1:1.3 to about 1:3.

In addition, in the monomer composition, a molar ratio of the diol to all the dicarboxylic acids may range from about 0.8:1 to 1:1.2.

The third esterification may be performed at about 250° C. or less for 0.1 hours to 0.5 hours. Specifically, the third esterification may be performed at 180° C. to 250° C., 185° C. to 240° C. or 200° C. to 240° C. under normal pressure or reduced pressure. For example, the third esterification may be performed for 5 minutes to 60 minutes, 10 minutes to 50 minutes or 10 minutes to 40 minutes, but is not limited thereto.

By the third esterification, a prepolymer may be formed.

When using the monomer composition and performing the third esterification under the above-described conditions, the alternating ratio, the hard segment ratio and the soft segment ratio may be appropriately controlled.

In the third esterification, the second esterification product may not be used. That is, the third esterification may be performed by the monomer composition and other additives such as a catalyst. Next, the second esterification product and the third esterification product are mixed to produce the prepolymer. Here, the third esterification product may be mixed with the second esterification product in a content ranging from about 0.1 parts by weight to about 5 parts by weight based on 100 parts by weight of the second esterification product, thereby producing the prepolymer.

The number average molecular weight of the prepolymer may range from about 500 to about 10000 g/mol. For example, the number average molecular weight of the prepolymer may range from about 500 to about 8500 g/mol, about 500 to about 8000 g/mol, about 500 to about 7000 g/mol, about 500 g/mol to about 5000 g/mol, or about 800 g/mol to about 4000 g/mol. When the number average molecular weight of the prepolymer satisfies the range, the molecular weight of a polymer in a polycondensation reaction may be efficiently increased.

The number average molecular weight may be measured using gel permeation chromatography (GPC). Specifically, data obtained by gel permeation chromatography includes various items such as Mn, Mw and Mp. Thereamong, the molecular weight may be measured based on the number average molecular weight (Mn).

The reinforcing material, the branching agent, the ester polyol or the metal salt may be added together with the slurry before the esterification. The reinforcing material, the branching agent, the ester polyol and/or the metal salt may be fed into the esterification part 200 in the middle of the esterification. The reinforcing material, the branching agent, the ester polyol and/or the metal salt may be fed into the esterification product after the esterification. In addition, the reinforcing material, the branching agent, the ester polyol and/or the metal salt may be added together with the aliphatic dicarboxylic acid. In addition, the reinforcing material, the branching agent, the ester polyol and/or the metal salt may be fed into the esterification part 200 after the first esterification and before the second esterification.

Since the reinforcing material and/or the metal salt is added during the esterification, the reinforcing material and/or the metal salt may be uniformly dispersed in the biodegradable polyester resin.

The reinforcing material may have the above-described characteristics. In particular, the nanocellulose may be used as the reinforcing material.

The elongation improver and the crystallization regulator may have the above-described characteristics.

The nanocellulose may be pre-treated by a bead mill, pre-treated by ultrasonic waves, or pre-treated by high-speed dispersion at about 1000 rpm to about 1500 rpm before being introduced. Specifically, the nano-cellulose may be water-dispersed nano-cellulose pre-treated with a bead mill or pre-treated with ultrasonic waves.

First, the bead mill pretreatment may be performed with a vertical mill or horizontal mill as a wet milling device. The horizontal mill is preferable in that the amount of beads that can be filled into a chamber is larger, and the uneven wear of the machine is reduced, the wear of the beads is reduced, and maintenance is easier, but is not limited thereto.

The bead mill pretreatment may be performed using one or more bead types selected from the group consisting of zirconium, zircon, zirconia, quartz and aluminum oxide.

Specifically, the bead mill pretreatment may be performed using beads having a diameter of about 0.3 mm to about 1 mm. For example, the diameter of the beads may range from about 0.3 mm to about 0.9 mm, about 0.4 mm to about 0.8 mm, about 0.45 mm to about 0.7 mm or about 0.45 mm to about 0.6 mm.

When the diameter of the beads satisfies the range, the dispersibility of nanocellulose may be further improved. When the diameter of the beads exceeds the range, the average particle diameter and average particle deviation of nanocellulose increase, resulting in low dispersibility.

In addition, in the bead mill pretreatment, it is preferable to use beads with a higher specific gravity than that of nanocellulose in that sufficient energy can be delivered. For example, the beads may be one or more selected from the group consisting of zirconium, zircon, zirconia, quartz and aluminum oxide which have a higher specific gravity than water-dispersed nanocellulose, and zirconium beads having a specific gravity four times or higher than the water-dispersed nanocellulose are preferred, without being not limited thereto.

In addition, the ultrasonic pretreatment is a method of physically closing or pulverizing nanoparticles with waves generated by emitting 20 kHz ultrasound into a solution.

The ultrasonic pretreatment may be performed for less than 30 minutes at an output of 30000 J/s or less. For example, the ultrasonic pretreatment may be performed at an output of 25000 J/s or less or 22000 J/s or less for 25 minutes or less, 20 minutes or less or 18 minutes or less. When the output and the execution time satisfy the above ranges, the effect, i.e., the improvement of dispersibility, of the ultrasonic pretreatment may be maximized. When the output exceeds the above range, the nanoparticles may rather re-agglomerate and the dispersibility may be lowered.

The nanocellulose according to one embodiment may be pre-treated with a bead mill or pre-treated with ultrasonic waves. Alternatively, the nanocellulose according to one embodiment may be pre-treated with a bead mill and pre-treated with ultrasonic waves. Here, it is preferred to perform ultrasonic pretreatment after pre-treating with a bead mill in terms of improving dispersibility by preventing re-agglomeration.

The nanocellulose according to one embodiment may be pre-treated with a bead mill or pre-treated with ultrasonic waves. Alternatively, the nanocellulose according to one embodiment may be pre-treated with a bead mill and pre-treated with ultrasonic waves. Here, it is preferred to perform ultrasonic pretreatment after pretreatment with a bead mill in terms of improving dispersibility by preventing reagglomeration.

Since the nanocellulose includes an ion-bonded metal, it has very high dispersibility in water. In addition, an aqueous dispersion having a very high dispersion of the nanocellulose may be obtained by the bead mill pretreatment and/or the ultrasonic pretreatment. In the aqueous nanocellulose dispersion, the content ranging from the nanocellulose may range from about 1 wt % to about 50 wt %.

In the esterification, a titanium-based catalyst and/or a germanium-based catalyst may be used. Specifically, the titanium-based catalyst and/or the germanium-based catalyst may be added to the slurry, and the esterification may be performed.

In addition, the titanium-based catalyst and/or the germanium-based catalyst may be added to the slurry before the first esterification, and the titanium-based catalyst and/or the germanium-based catalyst may be further added to the product of the first esterification.

The biodegradable polyester resin may include one or more titanium-based catalysts selected from the group consisting of titanium isopropoxide, antimony trioxide, dibutyltin oxide, tetrapropyl titanate, tetrabutyl titanate, tetraisopropyl titanate, antimonia acetate, calcium acetate and magnesium acetate, or one or more germanium-based catalysts selected from the group consisting of germanium oxide, germanium methoxide, germanium ethoxide, tetramethyl germanium, tetraethyl germanium and germanium sulfide.

In addition, the content ranging from the catalyst may range from about 50 ppm to 2000 ppm based on a total weight of a diol, an aromatic dicarboxylic acid, and an aliphatic dicarboxylic acid. For example, about 60 ppm to about 1600 ppm, about 70 ppm to about 1400 ppm, about 80 ppm to about 1200 ppm or about 100 ppm to about 1100 ppm of titanium-based catalyst or germanium-based catalyst may be included. When the content ranging from the catalyst satisfies the range, the physical properties may be further improved.

In addition, the heat stabilizer may be added together with the slurry before the esterification. The heat stabilizer may be fed into the esterification part 200 in the middle of the esterification. The heat stabilizer may be added to the esterification product after the esterification. In addition, the heat stabilizer may be added together with the aliphatic dicarboxylic acid. In addition, the heat stabilizer may be fed into the esterification part 200 after the first esterification and before the second esterification.

The characteristics of the heat stabilizer may be as described above.

The content ranging from the heat stabilizer may be 3,000 ppm or less based on a total weight of a diol, an aromatic dicarboxylic acid, and an aliphatic dicarboxylic acid. Specifically, the content ranging from the heat stabilizer may be, for example, 10 ppm to 3,000 ppm, 20 ppm to 2,000 ppm, 20 ppm to 1,500 ppm or 20 ppm to 1,000 ppm based on a total weight of a diol, an aromatic dicarboxylic acid, and an aliphatic dicarboxylic acid. When the content ranging from the heat stabilizer satisfies the range, the deterioration of the polymer due to high temperature during the reaction process may be controlled, the terminal groups of the polymer may be reduced and the color may be improved.

After completion of the esterification, one or more selected from the group consisting of an additive such as silica, potassium or magnesium and a color-correcting agent such as cobalt acetate may be further added to the esterification product. That is, after completion of the esterification, the additive and/or the color-correcting agent may be added and stabilized, and then a polycondensation reaction may be performed. The additive and/or the color-correcting agent may be added after completion of the esterification, and may be fed into the polycondensation reaction part 300 together with the prepolymer. Accordingly, the additive and/or the color-correcting agent may be uniformly dispersed in the biodegradable polyester resin.

In addition, after completion of the esterification, the inorganic filler may be added to the esterification product. That is, the inorganic filler is added and stabilized after completion of the esterification, and then the polycondensation reaction may be performed. The characteristics of the inorganic filler are as described above. The inorganic filler may be fed into the polycondensation reaction part 300 together with the prepolymer, and the condensation polymerization process may be performed. Accordingly, the inorganic filler may be uniformly dispersed in the biodegradable polyester resin.

In addition, the first recovery part 510 recovers by-products such as water from the esterification part 200. The first recovery part 510 may recover by-products generated from the esterification by applying vacuum pump to the esterification part 200 or proceeding with reflux.

The method of preparing the biodegradable polyester resin includes a step of polycondensing the prepolymer. The polycondensation reaction may be performed as follows.

The prepolymer is fed into the polycondensation reaction part 300. In addition, at least one or more of the reinforcing material, the heat stabilizer, the color-correcting agent, the inorganic filler, the metal salt and other additives may be fed into the polycondensation reaction part 300 together with the prepolymer.

Next, the polycondensation reaction may be performed at about 180° C. to about 280° C. and about 10 Torr or less for about 1 hour to about 5 hours. For example, the polycondensation reaction may be performed at about 190° C. to about 270° C., about 210° C. to about 260° C. or about 230° C. to about 255° C. under about 0.9 Torr or less, about 0.7 Torr or less, about 0.2 Torr to about 10 torr, about 0.2 Torr to about 0.9 Torr or about 0.2 Torr to about 0.6 Torr for about 1.5 hours to about 5 hours, about 2 hours to about 4.5 hours or about 2 hours to about 4 hours.

In addition, the polycondensation reaction may include first polycondensation and second polycondensation.

For example, the first polycondensation may be performed at about 260° C. or less, about 250° C. or less, about 215° C. to about 250° C., about 215° C. to about 245° C. or about 230° C. to about 245° C. under about 1 torr to about 200 torr, about 2 Torr to about 100 torr, about 4 Torr to about 50 torr, about 5 Torr to about 45 Torr or about 8 Torr to about 32 Torr for about 0.5 hours to about 3.5 hours, about 0.5 hours to about 3.0 hours or about 0.5 hours to about 2.8 hours.

In addition, the second polycondensation may be performed at about 220° C. to about 265° C., about 230° C. to about 260° C. or about 235° C. to about 255° C. under about 1 torr or less, about 0.8 Torr or less, about 0.6 Torr or less, about 0.1 Torr to about 1 torr, about 0.2 Torr to about 0.8 Torr or about 0.2 Torr to about 0.6 Torr for about 0.5 hours to about 4 hours, about 1 hour to about 3.5 hours or about 1.5 hours to about 3.5 hours.

In addition, before the polycondensation reaction, a titanium-based catalyst or a germanium-based catalyst may be further added to the prepolymer. In addition, before the polycondensation reaction, one or more selected from the group consisting of an additive such as silica, potassium or magnesium; an amine-based stabilizer such as trimethyl phosphate, triphenyl phosphate, trimethyl phosphine, phosphoric acid, phosphorous acid, or tetraethylenepentamine; and a polymerization catalyst such as antimony trioxide, antimony trioxide or tetrabutyl titanate may be further added to the prepolymer.

The number average molecular weight of the polymer may range from about 30000 g/mol or more. For example, the number average molecular weight of the polymer may range from about 33000 g/mol or more, about 35000 g/mol or more or about 40000 g/mol to about 90000 g/mol. When the number average molecular weight of the polymer satisfies the range, physical properties, impact resistance, durability and moldability may be further improved.

In addition, the second recovery part 520 recovers by-products such as water from the polycondensation reaction part 300. The second recovery part 520 may apply vacuum pressure to the polycondensation reaction part 300, and may recover by-products generated in the polycondensation reaction.

The second recovery part 520 may apply a vacuum pressure of about 0.1 Torr to about 1 torr to the inside of the polycondensation reaction part 300. The second recovery part 520 may apply a vacuum pressure of about 0.1 Torr to about 0.9 Torr to the inside of the polycondensation reaction part 300.

Next, the anti-hydrolysis agent and/or the chain extender are added to the polymer. Next, the polymer, the anti-hydrolysis agent and the chain extender are uniformly mixed and allowed to stand at about 200° C. to about 260° C. for about 1 minute to about 15 minutes. Accordingly, the polymer reacts with the anti-hydrolysis agent and/or the chain extender.

Alternatively, the anti-hydrolysis agent and/or the chain extender may be fed into the polycondensation reaction part 300 through a static mixer and reacted with the polymer. A reaction temperature of the anti-hydrolysis agent and/or the chain extender in the polycondensation reaction part 300 may range from about 200° C. to about 260° C. In addition, a reaction time of the anti-hydrolysis agent and/or the chain extender in the polycondensation reaction part 300 may range from about 1 minute to about 15 minutes.

The chain extender may have the characteristics described above.

The anti-hydrolysis agent may have the characteristics described above.

Accordingly, the biodegradable polyester resin composition according to one embodiment may have appropriate hydrolysis and a high biodegradability degree.

Next, a pellet may be produced from the polymer.

Specifically, the pellet may be produced by cooling the polymer to about 15° C. or less, about 10° C. or less or about 6° C. or less, and then cutting the cooled polymer. Alternatively, the polymer may be cut at about 40° C. to about 60° C.

The cutting step may be performed using any pellet cutting machine used in the art without limitation, and the pellet may have various shapes. The pellet cutting method may include an underwater cutting method or a strand cutting method.

The pellet may be subjected to an additional post-treatment process. The pellet may be fed into the post-treatment part 400, and the post-treatment process may be performed.

The post-treatment process may be performed in the post-treatment part 400. The pellet is fed into the post-treatment part 400. Next, the post-treatment part 400 may melt and re-extrude the fed pellet by frictional heat. That is, the post-treatment part 400 may include an extruder such as a twin-screw extruder.

The temperature of the post-treatment process may range from about 230° C. to about 270° C. The temperature of the post-treatment process may range from about 230° C. to about 260° C. The temperature of the post-treatment process may range from about 240° C. to about 265° C. The temperature of the post-treatment process may range from about 240° C. to about 260° C.

The post-treatment process time may range from about 30 seconds to about 3 minutes. The post-treatment process time may range from about 50 seconds to about 2 minutes. The post-treatment process time may range from about 1 minute to about 2 minutes.

Next, A resin extruded by the extruder may be cooled, cut, and processed into post-treated pellets. That is, the resin extruded from the extruder may be reprocessed into a pellet through the cutting step described above.

Crystallinity of the pellet may be improved in the post-treatment process. In addition, the content ranging from the residue included in the pellet may be adjusted in the post-treatment process. In particular, the content ranging from an oligomer contained in the pellet may be controlled by the post-treatment process. The amount of residual solvent contained in the pellet may be controlled by the post-treatment process.

Accordingly, the post-treatment process may appropriately control the mechanical properties, biodegradability, UV resistance, optical properties, or hydrolysis resistance of the biodegradable polyester resin.

After the pellet is produced, the biodegradable polyester resin may be compounded with the heterogeneous biodegradable resin. In addition, at least one or more of the inorganic filler, the light stabilizer, the color-correcting agent and the other additives may be compounded with the biodegradable polyester resin and the heterogeneous biodegradable resin.

The compounding process may be as follows.

The biodegradable polyester resin and the heterogeneous biodegradable polyester resin are mixed with at least one or more of the inorganic filler, the heat stabilizer, the color-correcting agent, the metal salt or the other additives and fed into an extruder. The mixed biodegradable polyester resin composition is melted and mixed at about 120° C. to about 260° C. in the extruder. Next, the melt-mixed biodegradable polyester resin composition is extruded, cooled, cut, and re-pelletized. By this process, the biodegradable polyester resin composition according to one embodiment may be prepared by combining it with the heterogeneous biodegradable polyester resin.

Alternatively, the inorganic filler, the heat stabilizer, the color-correcting agent, the metal salt and the other additives may be added in the middle of the process of polymerizing the biodegradable polyester resin.

Alternatively, the inorganic filler, the heat stabilizer, the color-correcting agent, the elongation improver, the crystallization regulator and the other additives may be added in the middle of the process of polymerizing the biodegradable polyester resin.

By the biodegradable polyester resin according to one embodiment, a biodegradable polyester film may be prepared.

The thickness of the biodegradable polyester film may range from about 5 μm to about 300 μm4. For example, the thickness of the biodegradable polyester film may range from about 5 μm to about 180 μm, about 5 μm to about 160 μm, about 10 μm to about 150 μm, about 15 μm to about 130 μm, about 20 μm to about 100 μm, about 25 μm to about 80 μm or about 25 μm to about 60 μm.

The biodegradable polyester film according to one embodiment may have substantially the same hydrolysis degree and biodegradability as the biodegradable polyester resin composition described above.

Meanwhile, the biodegradable polyester film may be prepared using the biodegradable polyester resin or a biodegradable polyester resin pellet.

Specifically, the method of preparing the biodegradable polyester film may include a step of preparing a biodegradable resin composition according to an example and a step of drying and melt extruding the biodegradable resin composition.

In the step of drying and melt extruding the biodegradable resin composition, the drying may be performed at about 60° C. to about 100° C. for about 2 hours to about 12 hours. Specifically, the drying may be performed at about 65° C. to about 95° C., about 70° C. to about 90° C. or about 75° C. to about 85° C. for about 3 hours to about 12 hours or about 4 hours to about 10 hours. When drying conditions of a pellet are within the ranges, the quality of a produced biodegradable polyester film or molded article may be further improved.

In the drying and melt extruding step, the melt extruding may be performed at about 270° C. or less. For example, the melt extruding may be performed at about 265° C. or less, about 260° C. or less, about 255° C. or less, about 150° C. to about 270° C., about 150° C. to about 255° C. or about 150° C. to about 240° C. The melt extruding may be performed by a blown film process. The melt extruding may proceed in a T-die.

In addition, the film preparation process may be a calendering process.

Biodegradable Polyester Molded Article

A biodegradable polyester molded article may be manufactured using the biodegradable polyester resin.

Specifically, the molded article may be manufactured by molding the biodegradable polyester resin composition in a method, such as extrusion or injection, known in the art, and the molded article may be an injection-molded article, an extrusion-molded article, a thin-film molded product, a blow molding or blow-molded article, 3D filament, an interior material for construction, or the like, but is not limited thereto.

Figure 2:
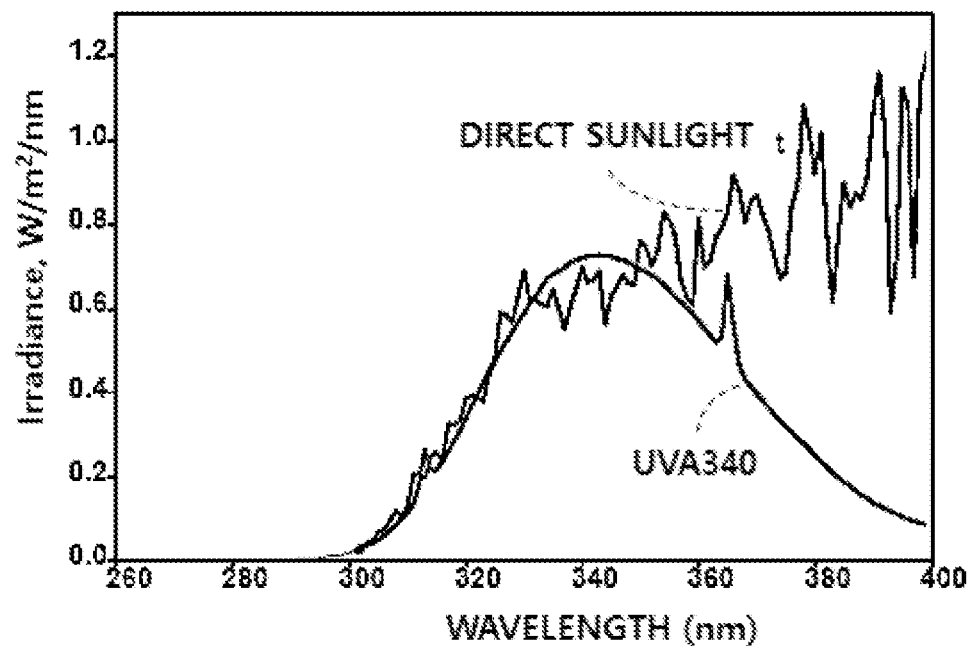
FIG. 2 is a diagram illustrating an example of a spectrum of light emitted by a UVA 340 lamp.
Figure 3:
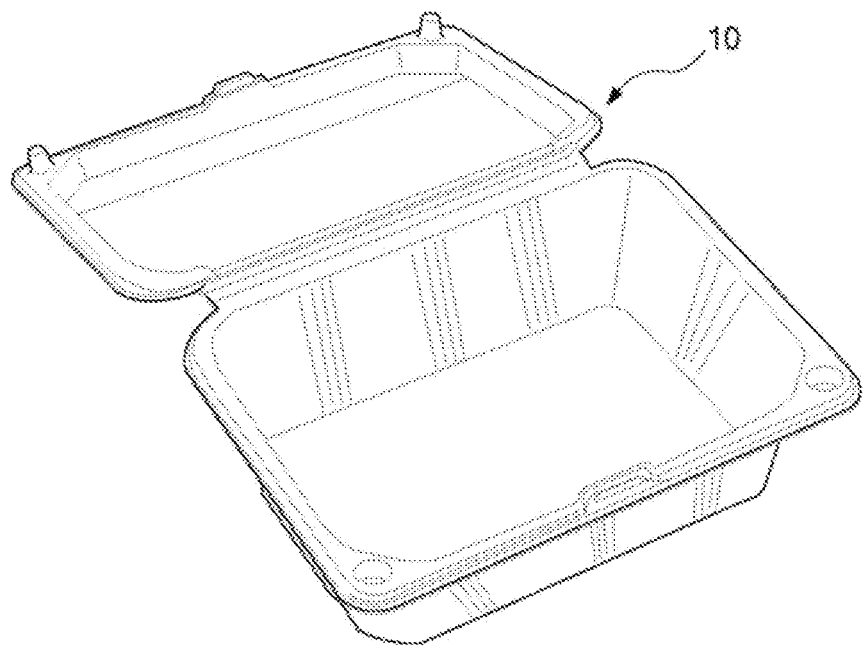
FIG. 3 is a diagram illustrating an example of a biodegradable molded article formed of a polyester resin composition according to one embodiment.

For example, the molded article may be in the form of a film or sheet that can be used as an agricultural mulching film, disposable gloves, a disposable film, a disposable bag, a food packaging material, a volume-rate garbage bag, etc., and may be in the form of a fiber that can be used as woven, knitted, non-woven, or a rope. In addition, as shown in FIG. 2, the molded article may be in the form of a disposable container that can be used as a container for packaging food such as a lunch box. In addition, the molded article may be a molded article in various forms such as a disposable straw, a cutlery (spoon), a food plate, or a fork.

In particular, since the molded article may be formed from the biodegradable polyester resin capable of improving physical properties such as shock absorption energy and hardness, in particular, impact resistance and durability, it may exhibit excellent properties when applied to packaging materials for products stored and transported at low temperatures, interior materials for automobiles requiring durability, garbage bags, mulching films, and disposable products.

The physical properties of the biodegradable film and the biodegradable molded article may be measured in a manner similar to those of the biodegradable polyester resin composition according to one embodiment.

The tensile strength reduction rate of the biodegradable polyester resin composition according to one embodiment may be measured by a measurement method below.

First, to measure the tensile strength reduction rate of the biodegradable polyester resin composition according to one embodiment, a biodegradable polyester sheet is made of the biodegradable polyester resin composition according to one embodiment.

The biodegradable polyester resin composition according to one embodiment is dried at about 80° C. for about 1 hour, placed in a stainless steel mold, and compressed at about 210° C. under a pressure of about 10 MPa for about 3 minutes, thereby producing a biodegradable polyester sheet having a thickness of about 300 μm.

Next, the biodegradable polyester sheet is irradiated with ultraviolet rays from a UVA 340 ultraviolet light lamp at a constant output for a certain time. After the ultraviolet irradiation, the tensile strength of the biodegradable polyester sheet is measured. The UVA 340 ultraviolet light lamp may be a fluorescent lamp that emits light of a spectrum having a maximum peak of about 340 nm. The UVA 340 ultraviolet light lamp may have an emission spectrum as shown in FIG. 2.

Here, the tensile strength reduction rate is obtained by dividing a difference between the initial tensile strength and the tensile strength after the ultraviolet irradiation by the initial tensile strength.

For example, the tensile strength reduction rate (TR, %) may be represented by Equation 10 below:

$$TR = \frac{TS1 - TS2}{TS1} \times 100 \quad \text{[Equation 10]}$$

where TS1 is an initial tensile strength, and TS2 is a tensile strength after ultraviolet irradiation. For example, TS2 may be a tensile strength 1 day after the ultraviolet irradiation. TS2 may be a tensile strength 1 day after the ultraviolet irradiation. TS2 may be a tensile strength 2 days after the ultraviolet irradiation. TS2 may be a tensile strength 1 day after the ultraviolet irradiation. TS2 may be a tensile strength 3 days after the ultraviolet irradiation. TS2 may be a tensile strength 4 days after the ultraviolet irradiation. TS2 may be a tensile strength 5 days after the ultraviolet irradiation. TS2 may be a tensile strength 6 days after the ultraviolet irradiation. For example, TS2 may be a tensile strength 7 days after the ultraviolet irradiation. For example, TS2 may be a tensile strength 9 days after the ultraviolet irradiation.

In addition, the elongation decrease rate at break of the biodegradable polyester resin composition according to one embodiment may be measured by the measurement method below.

First, to measure the elongation decrease rate at break of the biodegradable polyester resin composition according to one embodiment, a biodegradable polyester sheet is made of the biodegradable polyester resin composition in the same manner as described above.

That is, the biodegradable polyester resin composition according to one embodiment is dried at about 80° C. for about 1 hour, placed in a stainless steel mold, and compressed at about 210° C. under a pressure of about 10 MPa for about 3 minutes, thereby producing a biodegradable polyester sheet having a thickness of about 300 μm.

Next, the initial elongation at break of the biodegradable polyester sheet is measured. Next, the biodegradable polyester sheet is irradiated with ultraviolet rays from a UVA 340 ultraviolet light lamp at a certain output for a certain time. After the ultraviolet irradiation, the elongation at break of the biodegradable polyester sheet is measured.

Here, the elongation decrease rate at break is obtained by dividing a difference between the initial elongation at break and the elongation at break after ultraviolet irradiation by the initial elongation at break.

For example, the elongation decrease rate at break (ER, %) may be represented by Equation 12 below:

$$ER = \frac{EL1 - EL2}{EL1} \times 100 \quad \text{[Equation 12]}$$

where EL1 is an initial elongation at break, and EL2 is an elongation at break after ultraviolet irradiation. For example, EL2 may be an elongation at break 1 day after the ultraviolet irradiation. For example, EL2 may be an elongation at break 2 days after the ultraviolet irradiation. For example, EL2 may be an elongation at break 3 days after the ultraviolet irradiation. For example, EL2 may be an elongation at break 4 days after the ultraviolet irradiation. For example, EL2 may be an elongation at break 5 days after the ultraviolet irradiation. For example, EL2 may be an elongation at break 6 days after the ultraviolet irradiation. For example, EL2 may be an elongation at break 7 days after the ultraviolet irradiation. For example, EL2 may be an elongation at break 9 days after the ultraviolet irradiation.

The tensile strength and the elongation at break may be measured by the following methods. The biodegradable polyester sheet according to one embodiment is cut based on American Society for Testing and Materials (ASTM) D638 V-type, and then tested at a tensile speed of 100 mm/min by means of a universal testing machine (UTM, model name 4206-001) manufactured by INSTRON, followed by measuring a tensile strength (kgf/mm$^2$=9.8 Mpa) and an elongation at break using a program built in the equipment.

In the biodegradable polyester resin composition according to one embodiment, when ultraviolet rays from a UVA 340 ultraviolet light lamp are continuously irradiated at an intensity of about 0.75 W/m$^2$, a tensile strength decrease rate from the beginning of the ultraviolet irradiation to 1 day may range from about 5% to about 40%. In the biodegradable polyester resin composition according to another embodiment, when ultraviolet rays from a UVA 340 ultraviolet light lamp are continuously irradiated at an intensity of about 0.75 W/m$^2$, a tensile strength decrease rate from the beginning of the ultraviolet irradiation to 1 day may range from about 10% to about 35%. In the biodegradable polyester resin composition according to yet another embodiment, when ultraviolet rays from a UVA 340 ultraviolet light lamp are continuously irradiated at an intensity of about 0.75 W/m$^2$, a tensile strength decrease rate from the beginning of the ultraviolet irradiation to 1 day may range from about 15% to 30%.

In the biodegradable polyester resin composition according to one embodiment, when ultraviolet rays are continuously irradiated at an intensity of about 0.75 W/m$^2$, a tensile strength reduction rate from the beginning of the ultraviolet irradiation to 3 days may range from about 40% to about 75%. In the biodegradable polyester resin composition according to another embodiment, when ultraviolet rays are continuously irradiated at an intensity of about 0.75 W/m$^2$, a tensile strength reduction rate from the beginning of the ultraviolet irradiation to 3 days may range from about 40% to about 70%. In the biodegradable polyester resin composition according to still another embodiment, when ultraviolet rays are continuously irradiated at an intensity of about 0.75 W/m$^2$, a tensile strength reduction rate from the beginning of the ultraviolet irradiation to 3 days may range from about 50% to about 65%.

In the biodegradable polyester resin composition according to one embodiment, when ultraviolet rays are continuously irradiated at an intensity of about 0.75 W/m$^2$, a tensile strength reduction rate from the beginning of the ultraviolet irradiation to 6 days may range from about 67% or more. In the biodegradable polyester resin composition according to another embodiment, when ultraviolet rays are continuously irradiated at an intensity of about 0.75 W/m$^2$, a tensile strength reduction rate from the beginning of the ultraviolet irradiation to 6 days may range from about 70% or more. In the biodegradable polyester resin composition according to yet another embodiment, when ultraviolet rays are continuously irradiated at an intensity of about 0.75 W/m², a tensile strength reduction rate from the beginning of the ultraviolet irradiation to 6 days may range from about 72% or more. In the biodegradable polyester resin composition according to still another embodiment, when ultraviolet rays are continuously irradiated at an intensity of about 0.75 W/m², a tensile strength reduction rate from the beginning of the ultraviolet irradiation to 6 days may range from about 75% or more.

In the biodegradable polyester resin composition according to one embodiment, when ultraviolet rays are continuously irradiated at an intensity of about 0.75 W/m², a tensile strength reduction rate from the beginning of the ultraviolet irradiation to 7 days may range from about 70% or more. In the biodegradable polyester resin composition according to another embodiment, when ultraviolet rays are continuously irradiated at an intensity of about 0.75 W/m², a tensile strength reduction rate from the beginning of the ultraviolet irradiation to 7 days may range from about 75% or more. In the biodegradable polyester resin composition according to yet another embodiment, when ultraviolet rays are continuously irradiated at an intensity of about 0.75 W/m², a tensile strength reduction rate from the beginning of the ultraviolet irradiation to 7 days may range from about 80% or more.

In the biodegradable polyester resin composition according to one embodiment, when ultraviolet rays are continuously irradiated at an intensity of about 0.75 W/m², a difference between the tensile strength decrease rate from the beginning of the ultraviolet irradiation to 1 day and the tensile strength reduction rate from the beginning of the ultraviolet irradiation to 3 days may range from about 25% to about 50%. In the biodegradable polyester resin composition according to another embodiment, when ultraviolet rays are continuously irradiated at an intensity of about 0.75 W/m², a difference between the tensile strength decrease rate from the beginning of the ultraviolet irradiation to 1 day and the tensile strength reduction rate from the beginning of the ultraviolet irradiation to 3 days may range from about 29% to about 45%.

In the biodegradable polyester resin composition according to one embodiment, when ultraviolet rays are continuously irradiated at an intensity of about 0.75 W/m², a difference between the tensile strength reduction rate from the beginning of the ultraviolet irradiation to 3 days and the tensile strength reduction rate from the beginning of the ultraviolet irradiation to 6 days may range from about 7% to about 20%. In the biodegradable polyester resin composition according to another embodiment, when ultraviolet rays are continuously irradiated at an intensity of about 0.75 W/m², a difference between the tensile strength reduction rate from the beginning of the ultraviolet irradiation to 3 days and the tensile strength reduction rate from the beginning of the ultraviolet irradiation to 6 days may range from about 9% to about 17%.

In the biodegradable polyester resin composition according to one embodiment, when ultraviolet rays are continuously irradiated at an intensity of about 0.75 W/m², a difference between the tensile strength reduction rate from the beginning of the ultraviolet irradiation to 6 days and the tensile strength reduction rate from the beginning of the ultraviolet irradiation to 7 days may range from about 5% or less. In the biodegradable polyester resin composition according to another embodiment, when ultraviolet rays are continuously irradiated at an intensity of about 0.75 W/m², a difference between the tensile strength reduction rate from the beginning of the ultraviolet irradiation to 6 days and the tensile strength reduction rate from the beginning of the ultraviolet irradiation to 7 days may range from about 3% or less.

In the biodegradable polyester resin composition according to one embodiment, when the ultraviolet rays are irradiated at an intensity of about 0.35 W/m², a tensile strength decrease rate from the beginning of the ultraviolet irradiation to 1 day may range from about 1% to about 30%. In the biodegradable polyester resin composition according to another embodiment, when the ultraviolet rays are irradiated at an intensity of about 0.35 W/m², a tensile strength decrease rate from the beginning of the ultraviolet irradiation to 1 day may range from about 5% to about 25%. In the biodegradable polyester resin composition according to yet another embodiment, when the ultraviolet rays are irradiated at an intensity of about 0.35 W/m², a tensile strength decrease rate from the beginning of the ultraviolet irradiation to 1 day may range from about 10% to about 20%.

In the biodegradable polyester resin composition according to one embodiment, when the ultraviolet rays are irradiated at an intensity of about 0.35 W/m², a tensile strength reduction rate from the beginning of the ultraviolet irradiation to 2 days may range from about 25% to about 50%. In the biodegradable polyester resin composition according to another embodiment, when the ultraviolet rays are irradiated at an intensity of about 0.35 W/m², a tensile strength reduction rate from the beginning of the ultraviolet irradiation to 2 days may range from about 30% to about 50%. In the biodegradable polyester resin composition according to yet another embodiment, when the ultraviolet rays are irradiated at an intensity of about 0.35 W/m², a tensile strength reduction rate from the beginning of the ultraviolet irradiation to 2 days may range from about 30% to about 45%.

In the biodegradable polyester resin composition according to one embodiment, when the ultraviolet rays are irradiated at an intensity of about 0.35 W/m², a tensile strength reduction rate from the beginning of the ultraviolet irradiation to 3 days may range from about 40% to about 55%. In the biodegradable polyester resin composition according to another embodiment, when the ultraviolet rays are irradiated at an intensity of about 0.35 W/m², a tensile strength reduction rate from the beginning of the ultraviolet irradiation to 3 days may range from about 45% to about 55%. In the biodegradable polyester resin composition according to yet another embodiment, when the ultraviolet rays are irradiated at an intensity of about 0.35 W/m², a tensile strength reduction rate from the beginning of the ultraviolet irradiation to 3 days may range from about 45% to about 50%.

In the biodegradable polyester resin composition according to one embodiment, when the ultraviolet rays are irradiated at an intensity of about 0.35 W/m², a tensile strength reduction rate from the beginning of the ultraviolet irradiation to 7 days may range from about 55% to about 95%. In the biodegradable polyester resin composition according to another embodiment, when the ultraviolet rays are irradiated at an intensity of about 0.35 W/m², a tensile strength reduction rate from the beginning of the ultraviolet irradiation to 7 days may range from about 60% to about 95%. In the biodegradable polyester resin composition according to yet another embodiment, when the ultraviolet rays are irradiated at an intensity of about 0.35 W/m², a tensile strength reduction rate from the beginning of the ultraviolet irradiation to 7 days may range from about 65% to about 90%.

In the biodegradable polyester resin composition according to one embodiment, when the ultraviolet rays are irradiated at an intensity of about 0.35 W/m², a tensile strength reduction rate from the beginning of the ultraviolet irradiation to 9 days may range from about 65% or more. In the biodegradable polyester resin composition according to another embodiment, when the ultraviolet rays are irradiated at an intensity of about 0.35 W/m², a tensile strength reduction rate from the beginning of the ultraviolet irradiation to 9 days may range from about 68% or more. In the biodegradable polyester resin composition according to yet another embodiment, when the ultraviolet rays are irradiated at an intensity of about 0.35 W/m², a tensile strength reduction rate from the beginning of the ultraviolet irradiation to 9 days may range from about 70% or more. In the biodegradable polyester resin composition according to still another embodiment, when the ultraviolet rays are irradiated at an intensity of about 0.35 W/m², a tensile strength reduction rate from the beginning of the ultraviolet irradiation to 9 days may range from about 72% or more.

In the biodegradable polyester resin composition according to one embodiment, when the ultraviolet rays are continuously irradiated at an intensity of about 0.35 W/m², a difference between the tensile strength decrease rate from the beginning of the ultraviolet irradiation to 1 day and the tensile strength reduction rate from the beginning of the ultraviolet irradiation to 2 days may range from about 10% to about 35%. In the biodegradable polyester resin composition according to another embodiment, when the ultraviolet rays are continuously irradiated at an intensity of about 0.35 W/m², a difference between the tensile strength decrease rate from the beginning of the ultraviolet irradiation to 1 day and the tensile strength reduction rate from the beginning of the ultraviolet irradiation to 2 days may range from about 15% to about 30%.

In the biodegradable polyester resin composition according to one embodiment, when the ultraviolet rays are continuously irradiated at an intensity of about 0.35 W/m², a difference between the tensile strength reduction rate from the beginning of the ultraviolet irradiation to 2 days and the tensile strength reduction rate from the beginning of the ultraviolet irradiation to 3 days may range from about 5% to about 20%. In the biodegradable polyester resin composition according to another embodiment, when the ultraviolet rays are continuously irradiated at an intensity of about 0.35 W/m², a difference between the tensile strength reduction rate from the beginning of the ultraviolet irradiation to 2 days and the tensile strength reduction rate from the beginning of the ultraviolet irradiation to 3 days may range from about 8% to about 15%.

In the biodegradable polyester resin composition according to one embodiment, when the ultraviolet rays are continuously irradiated at an intensity of about 0.35 W/m², a difference between the tensile strength reduction rate from the beginning of the ultraviolet irradiation to 3 days and the tensile strength reduction rate from the beginning of the ultraviolet irradiation to 7 days may range from about 17% to about 27%. In the biodegradable polyester resin composition according to another embodiment, when the ultraviolet rays are continuously irradiated at an intensity of about 0.35 W/m², a difference between the tensile strength reduction rate from the beginning of the ultraviolet irradiation to 3 days and the tensile strength reduction rate from the beginning of the ultraviolet irradiation to 7 days may range from about 20% to about 25%.

In the biodegradable polyester resin composition according to one embodiment, when the ultraviolet rays are continuously irradiated at an intensity of about 0.35 W/m², a difference between the tensile strength reduction rate from the beginning of the ultraviolet irradiation to 7 days and the tensile strength reduction rate from the beginning of the ultraviolet irradiation to 9 days may range from about 15% or less. In the biodegradable polyester resin composition according to another embodiment, a difference between the tensile strength reduction rate from the beginning of the ultraviolet irradiation to 7 days and the tensile strength reduction rate from the beginning of the ultraviolet irradiation to 9 days when the ultraviolet rays are continuously irradiated at an intensity of about 0.35 W/m² may range from about 10% or less. In the biodegradable polyester resin composition according to yet another embodiment, a difference between the tensile strength reduction rate from the beginning of the ultraviolet irradiation to 7 days and the tensile strength reduction rate from the beginning of the ultraviolet irradiation to 9 days when the ultraviolet rays are continuously irradiated at an intensity of about 0.35 W/m² may range from about 7% or less.

In the biodegradable polyester resin composition according to one embodiment, the initial tensile strength may range from about 30 MPa to about 60 MPa. In the biodegradable polyester resin composition according to another embodiment, the initial tensile strength may range from about 35 MPa to about 60 MPa. In the biodegradable polyester resin composition according to yet another embodiment, the initial tensile strength may range from about 40 MPa to about 60 MPa. In the biodegradable polyester resin composition according to a further embodiment, the initial tensile strength may range from about 45 MPa to about 60 MPa.

In the biodegradable polyester resin composition according to one embodiment, when ultraviolet rays are continuously irradiated at an intensity of about 0.75 W/m², a tensile strength after 1 day may range from about 27 MPa to about 37 MPa. In the biodegradable polyester resin composition according to another embodiment, when ultraviolet rays are continuously irradiated at an intensity of about 0.75 W/m², a tensile strength after 1 day may range from about 30 MPa to about 37 MPa. In the biodegradable polyester resin composition according to yet another embodiment, when ultraviolet rays are continuously irradiated at an intensity of about 0.75 W/m², a tensile strength after 7 days may range from about 30 MPa to about 35 MPa.

In the biodegradable polyester resin composition according to one embodiment, when ultraviolet rays are continuously irradiated at an intensity of about 0.75 W/m², a tensile strength after 3 days may range from about 13 MPa to about 20 MPa. In the biodegradable polyester resin composition according to another embodiment, when ultraviolet rays are continuously irradiated at an intensity of about 0.75 W/m², a tensile strength after 3 days may range from about 15 MPa to about 19 MPa. In the biodegradable polyester resin composition according to yet another embodiment, when ultraviolet rays are continuously irradiated at an intensity of about 0.75 W/m², a tensile strength after 3 days may range from about 16 MPa to about 18 MPa.

In the biodegradable polyester resin composition according to one embodiment, when ultraviolet rays are continuously irradiated at an intensity of about 0.75 W/m², a tensile strength after 6 days may range from about 2 MPa to about 15 MPa. In the biodegradable polyester resin composition according to another embodiment, when ultraviolet rays are continuously irradiated at an intensity of about 0.75 W/m², a tensile strength after 6 days may range from about 7 MPa to about 13 MPa. In the biodegradable polyester resin composition according to yet another embodiment, when ultraviolet rays are continuously irradiated at an intensity of about 0.75 W/m², a tensile strength after 6 days may range from about 8 MPa to about 12 MPa.

In the biodegradable polyester resin composition according to one embodiment, when ultraviolet rays are continuously irradiated at an intensity of about 0.75 W/m², a tensile strength after 7 days may range from about 1 MPa to about 15 MPa. In the biodegradable polyester resin composition according to another embodiment, when ultraviolet rays are continuously irradiated at an intensity of about 0.75 W/m², a tensile strength after 7 days may range from about 5 MPa to about 13 MPa. In the biodegradable polyester resin composition according to yet another embodiment, when ultraviolet rays are continuously irradiated at an intensity of about 0.75 W/m², a tensile strength after 7 days may range from about 7 MPa to about 12 MPa.

In the biodegradable polyester resin composition according to one embodiment, when ultraviolet rays are continuously irradiated at an intensity of about 0.75 W/m², an elongation decrease rate at break from the beginning of the ultraviolet irradiation to 1 day may range from about 5% to about 40%. In the biodegradable polyester resin composition according to another embodiment, when ultraviolet rays are continuously irradiated at an intensity of about 0.75 W/m², an elongation decrease rate at break from the beginning of the ultraviolet irradiation to 1 day may range from about 5% to about 30%. In the biodegradable polyester resin composition according to yet another embodiment, when ultraviolet rays are continuously irradiated at an intensity of about 0.75 W/m², an elongation decrease rate at break from the beginning of the ultraviolet irradiation to 1 day may range from about 5% to about 27%. In the biodegradable polyester resin composition according to still another embodiment, when ultraviolet rays are continuously irradiated at an intensity of about 0.75 W/m², an elongation decrease rate at break from the beginning of the ultraviolet irradiation to 1 day may range from about 10% to about 25%.

In the biodegradable polyester resin composition according to one embodiment, when ultraviolet rays are continuously irradiated at an intensity of about 0.75 W/m², an elongation decrease rate at break from the beginning of the ultraviolet irradiation to 3 days may range from about 50% to about 70%. In the biodegradable polyester resin composition according to another embodiment, when ultraviolet rays are continuously irradiated at an intensity of about 0.75 W/m², an elongation decrease rate at break from the beginning of the ultraviolet irradiation to 3 days may range from about 55% to about 65%.

In the biodegradable polyester resin composition according to one embodiment, when ultraviolet rays are continuously irradiated at an intensity of about 0.75 W/m², an elongation decrease rate at break from the beginning of the ultraviolet irradiation to 6 days may range from about 70% or more. In the biodegradable polyester resin composition according to another embodiment, when ultraviolet rays are continuously irradiated at an intensity of about 0.75 W/m², an elongation decrease rate at break from the beginning of the ultraviolet irradiation to 6 days may range from about 80% or more.

In the biodegradable polyester resin composition according to one embodiment, when ultraviolet rays are continuously irradiated at an intensity of about 0.75 W/m², an elongation decrease rate at break from the beginning of the ultraviolet irradiation to 7 days may range from about 80% or more. In the biodegradable polyester resin composition according to another embodiment, when ultraviolet rays are continuously irradiated at an intensity of about 0.75 W/m², an elongation decrease rate at break from the beginning of the ultraviolet irradiation to 7 days may range from about 85% or more. In the biodegradable polyester resin composition according to yet another embodiment, when ultraviolet rays are continuously irradiated at an intensity of about 0.75 W/m², an elongation decrease rate at break from the beginning of the ultraviolet irradiation to 7 days may range from about 90% or more.

In the biodegradable polyester resin composition according to one embodiment, when ultraviolet rays are continuously irradiated at an intensity of about 0.75 W/m², a difference between the elongation decrease rate at break from the beginning of the ultraviolet irradiation to 1 day and the elongation decrease rate at break from the beginning of the ultraviolet irradiation to 3 days may range from about 30% to about 50%. In the biodegradable polyester resin composition according to another embodiment, when ultraviolet rays are continuously irradiated at an intensity of about 0.75 W/m², a difference between the elongation decrease rate at break from the beginning of the ultraviolet irradiation to 1 day and the elongation decrease rate at break from the beginning of the ultraviolet irradiation to 3 days may range from about 35% to about 45%.

In the biodegradable polyester resin composition according to one embodiment, when ultraviolet rays are continuously irradiated at an intensity of about 0.75 W/m², a difference between the elongation decrease rate at break from the beginning of the ultraviolet irradiation to 3 days and the elongation decrease rate at break from the beginning of the ultraviolet irradiation to 6 days may range from about 20% to about 40%. In the biodegradable polyester resin composition according to another embodiment, when ultraviolet rays are continuously irradiated at an intensity of about 0.75 W/m², a difference between the elongation decrease rate at break from the beginning of the ultraviolet irradiation to 3 days and the elongation decrease rate at break from the beginning of the ultraviolet irradiation to 6 days may range from about 25% to about 37%.

In the biodegradable polyester resin composition according to one embodiment, when ultraviolet rays are continuously irradiated at an intensity of about 0.75 W/m², a difference between the elongation decrease rate at break from the beginning of the ultraviolet irradiation to 6 days and the elongation decrease rate at break from the beginning of the ultraviolet irradiation to 7 days may range from about 10% or less. In the biodegradable polyester resin composition according to another embodiment, when ultraviolet rays are continuously irradiated at an intensity of about 0.75 W/m², a difference between the elongation decrease rate at break from the beginning of the ultraviolet irradiation to 6 days and the elongation decrease rate at break from the beginning of the ultraviolet irradiation to 7 days may range from about 5% or less.

In the biodegradable polyester resin composition according to one embodiment, the initial elongation at break may range from about 800% to about 1200%. In the biodegradable polyester resin composition according to another embodiment, the initial elongation at break may range from about 800% to about 1100%. In the biodegradable polyester resin composition according to one embodiment, the initial elongation at break may range from about 850% to about 1050%.

In the biodegradable polyester resin composition according to one embodiment, when the ultraviolet rays are irradiated at an intensity of about 0.75 W/m², an elongation at break after 1 day from the beginning of the ultraviolet irradiation may range from about 600% to about 800%. In the biodegradable polyester resin composition according to another embodiment, when the ultraviolet rays are irradiated at an intensity of about 0.75 W/m², an elongation at break after 1 day from the beginning of the ultraviolet irradiation may range from about 650% to about 750%.

In the biodegradable polyester resin composition according to one embodiment, when the ultraviolet rays are irradiated at an intensity of about 0.75 W/m², an elongation at break after 3 days from the beginning of the ultraviolet irradiation may range from about 300% to about 400%. In the biodegradable polyester resin composition according to another embodiment, when the ultraviolet rays are irradiated at an intensity of about 0.75 W/m², an elongation at break after 3 days from the beginning of the ultraviolet irradiation may range from about 350% to about 400%.

In the biodegradable polyester resin composition according to one embodiment, when the ultraviolet rays are irradiated at an intensity of about 0.75 W/m², an elongation at break after 6 days from the beginning of the ultraviolet irradiation may range from about 100% or less. In the biodegradable polyester resin composition according to another embodiment, when the ultraviolet rays are irradiated at an intensity of about 0.75 W/m², an elongation at break after 6 days from the beginning of the ultraviolet irradiation may range from about 90% or less.

In the biodegradable polyester resin composition according to one embodiment, when the ultraviolet rays are irradiated at an intensity of about 0.75 W/m², an elongation at break after 7 days from the beginning of the ultraviolet irradiation may range from about 90% or less. In the biodegradable polyester resin composition according to another embodiment, when the ultraviolet rays are irradiated at an intensity of about 0.75 W/m², an elongation at break after 7 days from the beginning of the ultraviolet irradiation may range from about 80% or less.

In the biodegradable polyester resin composition according to one embodiment, when the ultraviolet rays are irradiated at an intensity of about 0.75 W/m², a difference between the elongation decrease rate at break after 1 day from the beginning of the ultraviolet irradiation and the elongation decrease rate at break after 3 days from the beginning of the ultraviolet irradiation may range from about 30% to about 50%.

In the biodegradable polyester resin composition according to one embodiment, when the ultraviolet rays are irradiated at an intensity of about 0.75 W/m², a difference between the elongation decrease rate at break after 3 days from the beginning of the ultraviolet irradiation and the elongation decrease rate at break after 6 days from the beginning of the ultraviolet irradiation may range from about 30% to about 40%.

In the biodegradable polyester resin composition according to one embodiment, when the ultraviolet rays are irradiated at an intensity of about 0.75 W/m², a difference between the elongation decrease rate at break after 6 days from the beginning of the ultraviolet irradiation and the elongation at break after 7 days from the beginning of the ultraviolet irradiation may range from about 5% or less.

In the biodegradable polyester resin composition according to one embodiment, when the ultraviolet rays are irradiated at an intensity of about 0.35 W/m², an elongation decrease rate at break from the beginning of the ultraviolet irradiation to 1 day may range from about 1% to about 20%. In the biodegradable polyester resin composition according to another embodiment, when the ultraviolet rays are irradiated at an intensity of about 0.35 W/m², an elongation decrease rate at break from the beginning of the ultraviolet irradiation to 1 day may range from about 2% to about 20%. In the biodegradable polyester resin composition according to yet another embodiment, when the ultraviolet rays are irradiated at an intensity of about 0.35 W/m², an elongation decrease rate at break from the beginning of the ultraviolet irradiation to 1 day may range from about 3% to about 18%. In the biodegradable polyester resin composition according to still another embodiment, when the ultraviolet rays are irradiated at an intensity of about 0.35 W/m², an elongation decrease rate at break from the beginning of the ultraviolet irradiation to 1 day may range from about 3% to about 17%.

In the biodegradable polyester resin composition according to one embodiment, when the ultraviolet rays are irradiated at an intensity of about 0.35 W/m², an elongation decrease rate at break from the beginning of the ultraviolet irradiation to 2 days may range from about 15% to about 35%. In the biodegradable polyester resin composition according to another embodiment, when the ultraviolet rays are irradiated at an intensity of about 0.35 W/m², an elongation decrease rate at break from the beginning of the ultraviolet irradiation to 2 days may range from about 20% to about 30%.

In the biodegradable polyester resin composition according to one embodiment, when the ultraviolet rays are irradiated at an intensity of about 0.35 W/m², an elongation decrease rate at break from the beginning of the ultraviolet irradiation to 3 days may range from about 30% to about 45%. In the biodegradable polyester resin composition according to another embodiment, when the ultraviolet rays are irradiated at an intensity of about 0.35 W/m², an elongation decrease rate at break from the beginning of the ultraviolet irradiation to 3 days may range from about 35% to about 40%.

In the biodegradable polyester resin composition according to one embodiment, when the ultraviolet rays are irradiated at an intensity of about 0.35 W/m², an elongation decrease rate at break from the beginning of the ultraviolet irradiation to 7 days may range from about 55% to about 75%. In the biodegradable polyester resin composition according to another embodiment, when the ultraviolet rays are irradiated at an intensity of about 0.35 W/m², an elongation decrease rate at break from the beginning of the ultraviolet irradiation to 7 days may range from about 60% to about 70%.

In the biodegradable polyester resin composition according to one embodiment, when the ultraviolet rays are irradiated at an intensity of about 0.35 W/m², an elongation decrease rate at break from the beginning of the ultraviolet irradiation to 9 days may range from about 80% or more. In the biodegradable polyester resin composition according to another embodiment, when the ultraviolet rays are irradiated at an intensity of about 0.35 W/m², an elongation decrease rate at break from the beginning of the ultraviolet irradiation to 9 days may range from about 85% or more.

In the biodegradable polyester resin composition according to one embodiment, when the ultraviolet rays are irradiated at an intensity of about 0.35 W/m², an elongation at break after 1 day from the beginning of the ultraviolet irradiation may range from about 700% to about 950%.

In the biodegradable polyester resin composition according to one embodiment, when the ultraviolet rays are irradiated at an intensity of about 0.35 W/m², an elongation at break after 2 days from the beginning of the ultraviolet irradiation may range from about 600% to about 800%.

In the biodegradable polyester resin composition according to one embodiment, when the ultraviolet rays are irradiated at an intensity of about 0.35 W/m², an elongation at break after 3 days from the beginning of the ultraviolet irradiation may range from about 500% to about 650%.

In the biodegradable polyester resin composition according to one embodiment, when the ultraviolet rays are irradiated at an intensity of about 0.35 W/m², an elongation at break after 7 days from the beginning of the ultraviolet irradiation may range from about 250% to about 350%.

In the biodegradable polyester resin composition according to one embodiment, when the ultraviolet rays are irradiated at an intensity of about 0.35 W/m², an elongation at break after 9 days from the beginning of the ultraviolet irradiation may range from about 200% or less.

In the biodegradable polyester resin composition according to one embodiment, when the ultraviolet rays are irradiated at an intensity of about 0.35 W/m², a difference between the elongation decrease rate at break from the beginning of the ultraviolet irradiation to 1 day and the elongation decrease rate at break from the beginning of the ultraviolet irradiation to 2 days may range from about 10% to about 20%.

In the biodegradable polyester resin composition according to one embodiment, when the ultraviolet rays are irradiated at an intensity of about 0.35 W/m², a difference between the elongation decrease rate at break from the beginning of the ultraviolet irradiation to 2 days and the elongation decrease rate at break from the beginning of the ultraviolet irradiation to 3 days may range from about 8% to about 20%.

In the biodegradable polyester resin composition according to one embodiment, when the ultraviolet rays are irradiated at an intensity of about 0.35 W/m², a difference between the elongation decrease rate at break from the beginning of the ultraviolet irradiation to 3 days and the elongation decrease rate at break from the beginning of the ultraviolet irradiation to 7 days may range from about 20% to about 35%.

In the biodegradable polyester resin composition according to one embodiment, when the ultraviolet rays are irradiated at an intensity of about 0.35 W/m², a difference between the elongation decrease rate at break from the beginning of the ultraviolet irradiation to 7 days and the elongation decrease rate at break from the beginning of the ultraviolet irradiation to 9 days may range from about 20% to about 30%.

In addition, in the biodegradable polyester film according to one embodiment, an initial tensile strength, a tensile strength after ultraviolet irradiation, an initial elongation at break, and an elongation at break after ultraviolet irradiation may be measured based on a thickness of about 300 μm. A sample having a thickness of about 300 μm may be manufactured by overlapping several sheets of the biodegradable polyester film according to one embodiment or by compressing the sheets under an appropriate pressure and at an appropriate temperature. The initial tensile strength, the tensile strength after ultraviolet irradiation, the initial elongation at break and the elongation at break after ultraviolet irradiation of the sample manufactured as described above may be measured.

Accordingly, in the biodegradable polyester film according to one embodiment, a tensile strength reduction rate and an elongation decrease rate at break may be derived based on a thickness of about 300 μm for the polyester film.

For example, the initial tensile strength of a sample made of the biodegradable polyester film is measured. Next, the sample made of the biodegradable polyester film is irradiated with ultraviolet rays from a UVA 340 ultraviolet light lamp at a certain output for a certain time. After the ultraviolet irradiation, the tensile strength of the biodegradable polyester sample is measured.

In addition, the initial elongation at break of the sample made of the biodegradable polyester film is measured. Next, the sample made of the biodegradable polyester film is irradiated with ultraviolet rays from a UVA 340 ultraviolet light lamp at a certain output for a certain time. After the ultraviolet irradiation, the elongation at break of the sample made of the biodegradable polyester film is measured.

Based on a thickness of about 300 μm for the polyester film, the biodegradable polyester film according to one embodiment may have characteristics substantially the same as the above-described characteristics of the biodegradable polyester resin composition. That is, in the biodegradable polyester film according to this embodiment, the characteristics based on a thickness of about 300 μm may be substantially the same as the above-described characteristics of the biodegradable polyester resin composition.

For example, in the biodegradable polyester film according to one embodiment, a tensile strength decrease rate from the beginning of the ultraviolet irradiation to 1 day may range from about 5% to about 40% when continuously irradiated with ultraviolet rays from a UVA 340 ultraviolet light lamp at an intensity of about 0.75 W/m² based on a thickness of about 300 μm.

For example, in the biodegradable polyester film according to one embodiment, a tensile strength reduction rate from the beginning of the ultraviolet irradiation to 3 days may range from about 40% to about 65%, when ultraviolet rays are continuously irradiated at an intensity of about 0.75 W/m² based on a thickness of about 300 μm.

For example, in the biodegradable polyester film according to another embodiment, a tensile strength reduction rate from the beginning of the ultraviolet irradiation to 6 days may range from about 67% or more when ultraviolet rays are continuously irradiated at an intensity of about 0.75 W/m² based on a thickness of about 300 μm.

For example, in the biodegradable polyester film according to yet another embodiment, a tensile strength decrease rate from the beginning of the ultraviolet irradiation to 1 day may range from about 1% to about 20% when the ultraviolet rays are irradiated at an intensity of about 0.35 W/m² based on a thickness of about 300 μm.

For example, in the biodegradable polyester film according to still another embodiment, a tensile strength reduction rate from the beginning of the ultraviolet irradiation to 9 days may range from about 65% or more when the ultraviolet rays are irradiated at an intensity of about 0.35 W/m² based on a thickness of about 300 μm.

For example, in the biodegradable polyester film according to one embodiment, the initial tensile strength may range from about 40 MPa to about 60 MPa.

For example, in the biodegradable polyester film according to one embodiment, a tensile strength after 7 days may range from about 1 MPa to about 15 MPa when ultraviolet rays are continuously irradiated at an intensity of about 0.75 W/m² based on a thickness of about 300 μm.

For example, in the biodegradable polyester film according to one embodiment, an elongation decrease rate at break from the beginning of the ultraviolet irradiation to 1 day may range from about 5% to about 40% when ultraviolet rays are continuously irradiated at an intensity of about 0.75 W/m² based on a thickness of about 300 μm.

For example, in the biodegradable polyester film according to one embodiment, an elongation decrease rate at break from the beginning of the ultraviolet irradiation to 7 days may range from about 80% or more when ultraviolet rays are continuously irradiated at an intensity of about 0.75 W/m² based on a thickness of about 300 µm.

For example, in the biodegradable polyester film according to another embodiment, an elongation decrease rate at break from the beginning of the ultraviolet irradiation to 1 day may range from about 1% to about 20% when ultraviolet rays are irradiated at an intensity of 0.35 W/m² based on a thickness of about 300 µm.

For example, in the biodegradable polyester film according to yet another embodiment, an elongation decrease rate at break from the beginning of the ultraviolet irradiation to 9 days may range from about 80% or more when ultraviolet rays are irradiated at an intensity of 0.35 W/m² based on a thickness of about 300 µm.

The biodegradable polyester resin composition according to one embodiment may have a molecular weight reduction rate of about 80% or more. The biodegradable polyester resin composition according to another embodiment may have a molecular weight reduction rate of about 85% or more. The biodegradable polyester resin composition according to yet another embodiment may have a molecular weight reduction rate of about 90% or more. To measure the molecular weight reduction rate, the biodegradable polyester resin composition was mixed with compost and subjected to a biodegradation acceleration test at 60° C. and a humidity of 90%. In the polyester resin compositions of the examples and the comparative examples, a number average molecular weight after 63 days had elapsed was measured using gel permeation chromatography (GPC). A molecular weight reduction rate was derived by dividing a difference between an initial number average molecular weight and a number average molecular weight after a certain period by the initial number average molecular weight.

The molecular weight reduction rate may be derived by Equation 13 below:

[Equation 13]

Molecular weight reduction rate (%) =

$$\frac{\text{Initial number average molecular weight} - \text{number average molecular weight after 63 days}}{\text{Initial number average molecular weight}} \times 100$$

Here, the biodegradable polyester resin composition according to one embodiment is mixed with compost and subjected to a biodegradation acceleration test at 60° C. and a humidity of 90% for about 63 days. Before performing the biodegradation acceleration test, an initial number average molecular weight of the biodegradable polyester resin composition and a number average molecular weight after 63 days of the biodegradable polyester resin composition subjected to the biodegradation acceleration test for 63 days are measured by gel permeation chromatography (GPC).

The molecular weight reduction rate was derived by dividing a difference between the initial number average molecular weight and the number average molecular weight after a certain period, e.g., 63 days, by the initial number average molecular weight.

In addition, the compost may include about 40 wt % of pig manure, about 15 wt % of chicken manure, about 37 wt % of sawdust, about 5 wt % of zeolite and about 3 wt % of a microbial agent.

In addition, the compost may be Jisaengto (by-product fertilizer grade 1 compost) manufactured by Taeheung F&G.

In addition, when measuring the molecular weight reduction rate, the biodegradable polyester resin composition according to one embodiment is manufactured into a sheet having a thickness of about 300 µm. Next, the manufactured sheet is cut into a size of about 3 cm×3 cm to produce flakes. The flakes are mixed with the compost, and the biodegradation acceleration test is performed.

The biodegradable polyester film according to one embodiment may have a molecular weight reduction rate as described above. Likewise, the biodegradable polyester film according to one embodiment is cut into a size of about 3 cm×3 cm to produce flakes. The flakes may be mixed with the compost, and the biodegradation acceleration test may be performed.

The biodegradable polyester resin composition according to one embodiment may have a biodegradability of about 80% or more. The biodegradable polyester resin composition according to another embodiment may have a biodegradability of about 85% or more. The biodegradable polyester resin composition according to yet another embodiment may have a biodegradability of about 90% or more. The biodegradability may be derived from Equation 14 below.

[Equation 14]

Biodegradability (%) =

$$\frac{\text{Amount of } CO_2 \text{ generated from test container} - \text{Amount of } CO_2 \text{ generated from inoculum container}}{\text{Theoretical } CO_2 \text{ generation amount of biodegradable resin}} \times 100$$

The biodegradability of the biodegradable polyester resin composition according to one embodiment may be measured based on the generation amount of carbon dioxide according to KS M3100-1. Specifically, an inoculum container containing only compost manufactured in a compost factory is prepared, and a test container, into which flakes of the biodegradable polyester resin composition of 5% by weight of the dry weight of the compost are fed, is prepared. Next, the compost and the flakes are incubated for 180 days under conditions of 58±2° C., a moisture content ranging from 50% and an oxygen concentration of 6% or more, carbon dioxide generated in each container is collected, and the amount of carbon dioxide generated in each container is measured by titration of an aqueous phenolphthalein solution. As in Equation 14, the biodegradability was derived from a ratio of carbon dioxide generated in the biodegradable polyester resin composition relative to a theoretical carbon dioxide generation amount.

When measuring the biodegradability, flakes of the biodegradable polyester resin composition may be manufactured by substantially the same method as the method of manufacturing the flakes when measuring the molecular weight reduction rate.

The biodegradable polyester film according to one embodiment may be biodegradable as described above. Likewise, the biodegradable polyester film according to one embodiment is cut into a size of about 3 cm×3 cm, and flakes are manufactured. The flakes may be mixed with the compost, and the biodegradation test may be performed.

The hydrolysis degree of the biodegradable polyester resin composition according to one embodiment may be measured by the following method.

To measure the hydrolysis degree, the biodegradable polyester resin composition according to an example is immersed in 80° C. water (100% RH), and a hydrolysis acceleration test is performed. After a certain period, the number average molecular weight of the biodegradable polyester resin composition according to one embodiment was measured using gel permeation chromatography (GPC). A hydrolysis degree was derived by dividing a difference between an initial number average molecular weight and a number average molecular weight after hydrolysis for a certain period by the initial number average molecular weight.

The hydrolysis degree may be calculated by Equation 15 below:

$$\text{Hydrolysis degree (\%)} = \frac{\text{Initial number average molecular weight} - \text{Number average molecular weight after hydrolysis}}{\text{Initial number average molecular weight}} \times 100 \quad \text{[Equation 15]}$$

Here, the biodegradable polyester resin composition according to one embodiment is immersed in 80° C. water, and then subjected to a hydrolysis acceleration test for a certain period. An initial number average molecular weight of the biodegradable polyester resin composition before performing the hydrolysis acceleration test and a number average molecular weight after hydrolysis of the biodegradable polyester resin composition subjected to the hydrolysis acceleration test for a certain period are measured by gel permeation chromatography (GPC).

The hydrolysis degree was derived by dividing a difference between the initial number average molecular weight and the number average molecular weight after hydrolysis for a certain period by an initial number average molecular weight.

In addition, when measuring the hydrolysis degree, the biodegradable polyester resin composition according to one embodiment is manufactured into a sheet having a thickness of about 300 μm. Next, the manufactured sheet is cut into a size of about 30 mm×30 mm to produce flakes. The flakes may be immersed in the hot water, and the hydrolysis acceleration test may be performed.

In the biodegradable polyester resin composition according to one embodiment, a hydrolysis degree after one week may range from about 40% to about 65%. In the biodegradable polyester resin composition according to another embodiment, the hydrolysis degree after one week may range from about 45% to about 63%.

In the biodegradable polyester resin composition according to one embodiment, a hydrolysis degree after two weeks may range from about 80% to about 93%. In the biodegradable polyester resin composition according to one embodiment, the hydrolysis degree after two weeks may range from about 85% to about 92%.

In the biodegradable polyester resin composition according to one embodiment, a hydrolysis degree after three weeks may range from about 90% to about 97%. In the biodegradable polyester resin composition according to another embodiment, a hydrolysis degree after three weeks may range from about 91% to about 96%.

In the biodegradable polyester resin composition according to one embodiment, a hydrolysis degree after four weeks may range from about 92% to about 99%. In the biodegradable polyester resin composition according to another embodiment, a hydrolysis degree after four weeks may range from about 93% to about 97%.

In the biodegradable polyester resin composition according to one embodiment, a hydrolysis degree after six weeks may range from about 94% or more. In the biodegradable polyester resin composition according to another embodiment, a hydrolysis degree after six weeks may range from about 95% or more.

In the biodegradable polyester resin composition according to one embodiment, a hydrolysis degree after nine weeks may range from about 95% or more. In the biodegradable polyester resin composition according to another embodiment, a hydrolysis degree after nine weeks may range from about 96% or more.

Since the biodegradable polyester resin composition according to one embodiment has a hydrolysis degree and hydrolysis degree increase rate within the range, the biodegradable polyester resin composition according to another embodiment has appropriate durability in daily life and may be hydrolyzed when discarded. That is, since the biodegradable polyester resin composition according to this embodiment has a hydrolysis degree and hydrolysis degree increase rate in an appropriate range, it may have sufficient hydrolysis resistance when used for an appropriate period, such as in disposable packaging. In addition, the biodegradable polyester resin composition according to this embodiment may be degraded by hydrolysis and biodegradation when sufficient time passes, not only when disposed of in the soil, but also when disposed of in the river or the sea after sufficient time passes.

In addition, the acid value of the biodegradable polyester resin composition according to one embodiment may range from about 0.01 mg KOH/g to about 3 mg KOH/g. The acid value of the biodegradable polyester resin composition according to other embodiment range from about 0.1 mg KOH/g to about 2.8 mg KOH/g. The acid value of the biodegradable polyester resin composition according to yet another embodiment may range from about 0.1 mg KOH/g to about 2.5 mg KOH/g.

Since the biodegradable polyester resin composition according to one embodiment has an acid value within the ranges above, it may have hydrolysis and biodegradability characteristics as described above.

The biodegradable polyester resin composition according to one embodiment may have crystallinity.

The crystallinity of the biodegradable polyester resin composition according to another embodiment may range from about 5% to about 20%. The crystallinity of the biodegradable polyester resin composition according to yet another embodiment may range from about 7% to about 18%. The crystallinity of the biodegradable polyester resin composition according to still another embodiment may range from about 8% to about 16%. The crystallinity of the biodegradable polyester resin composition according to a further embodiment may range from about 10% to about 15%. The crystallinity of the biodegradable polyester resin composition according to a still further embodiment may range from about 11% to about 14%. The crystallinity of the biodegradable polyester resin composition according to a yet further embodiment may range from about 11% to about 13%.

In addition, the crystallinity of the biodegradable polyester film according to one embodiment may range from about 5% to about 20%. The crystallinity of the biodegradable polyester film according to another embodiment may range from about 7% to about 18%. The crystallinity of the biodegradable polyester film according to yet another embodiment may range from about 8% to about 16%. The crystallinity of the biodegradable polyester film according to still another embodiment may range from about 10% to about 15%. The crystallinity of the biodegradable polyester film according to a further embodiment may range from about 11% to about 14%. The crystallinity of the biodegradable polyester film according to a still further embodiment may range from about 11% to about 13%.

In addition, the crystallinity of the biodegradable polyester molded article according to one embodiment may range from about 5% to about 20%. The crystallinity of the biodegradable polyester molded article according to another embodiment may range from about 7% to about 18%. The crystallinity of the biodegradable polyester molded article according to yet another embodiment may range from about 8% to about 16%. The crystallinity of the biodegradable polyester molded article according to still another embodiment may range from about 10% to about 15%. The crystallinity of the biodegradable polyester molded article according to a further embodiment may range from about 11% to about 14%. The crystallinity of the biodegradable polyester molded article according to still a further embodiment may range from about 11% to about 13%.

The crystallinity of the biodegradable polyester resin composition, film and molded article according to one embodiment may be calculated by Equation 16 below:

$$\text{Crystallinity} = \frac{\Delta H_m}{\Delta H_{m100}} \times 100 \qquad \text{[Equation 16]}$$

To measure the crystallinity of the biodegradable polyester resin composition, film and molded article according to one embodiment, a sample having a weight of about 5 mg to about 10 mg may be obtained from the biodegradable polyester resin composition, film and molded article.

The sample is fed into a differential scanning calorimeter (for example, Q2000, TA Instruments) and stabilized at about 25° C. for about 1 minute. Next, the sample is cooled at a rate of about −5° C./min to about −70° C. and heated up to about 200° C. at a rate of about 10° C./min. Next, the sample is allowed to stand at about 200° C. for about 1 minute, and then cooled to about 25° C. An enthalpy change in the process of heating and cooling the sample may be measured. Here, a minimum point of an endothermic peak may be a melting point (Tm). In addition, a point where heat flow starts to change may be a glass transition temperature (Tg), and a maximum temperature of the exothermic peak may be a crystallization temperature (Tc). In addition, $\Delta H_m$ may be the area of an endothermic peak at a melting point. That is, $\Delta H_m$ may be the melting point enthalpy of the sample. In addition, $\Delta H_{m100}$ is a melting enthalpy when crystallinity is 100%. $\Delta H_{m100}$ may be 114 J/g. In addition, the cooled sample is heated again, and thus the absorption enthalpy and the exothermic enthalpy may be measured again.

Since the biodegradable polyester resin composition, film and molded article according to one embodiment has crystallinity within the ranges disclosed above, it may have appropriate mechanical characteristics, appropriate biodegradability, appropriate hydrolysis, appropriate thermal properties and appropriate chemical resistance. In particular, since the biodegradable polyester resin composition, film and molded article according to one embodiment has crystallinity within the ranges disclosed above, it may have appropriate flexibility.

In addition, the biodegradable polyester resin composition, film and molded article according to one embodiment may have tensile strength.

In the biodegradable polyester resin composition, film and molded article according to another embodiment, the tensile strength may range from about 30 MPa to about 60 MPa. In the biodegradable polyester resin composition, film and molded article according to yet another embodiment, the tensile strength may range from about 35 MPa to about 60 MPa. In the biodegradable polyester resin composition, film and molded article according to still another embodiment, the tensile strength may range from about 40 MPa to about 60 MPa. In the biodegradable polyester resin composition, film and molded article according to a further embodiment, the tensile strength may range from about 45 MPa to about 60 MPa.

In the biodegradable polyester resin composition, film and molded article according to one embodiment, the initial elongation at break may range from about 800% to about 1200%. In the biodegradable polyester resin composition, film and molded article according to another embodiment, the initial elongation at break may range from about 800% to about 1100%. In the biodegradable polyester resin composition, film and molded article according to yet another embodiment, the initial elongation at break may range from about 850% to about 1050%.

The biodegradable polyester resin composition according to one embodiment is dried at about 80° C. for about 1 hour, placed in a stainless steel mold, and compressed at about 210° C. under a pressure of about 10 MPa for about 3 minutes, thereby manufacturing a biodegradable polyester sheet having a thickness of about 300 μm.

The tensile strength and the elongation at break may be measured by the following methods. After the biodegradable polyester sheet, film, and molded article (according to this embodiment) are cut based on ASTM D638 V-type to manufacture a specimen, the specimen is tested at a tensile speed of 100 mm/min by a universal testing machine (UTM, model name: 4206-001) of INSTRON, and then a tensile strength and an elongation at break may be measured by the program built into the equipment.

The biodegradable polyester resin composition, film and molded article according to one embodiment may have a hardness. The hardness may be Shore D hardness.

In the biodegradable polyester resin composition, film and molded article according to another embodiment, Shore D hardness as the hardness may range from about 30 to about 45. In the biodegradable polyester resin composition, film and molded article according to yet another embodiment, Shore D hardness as the hardness may range from about 33 to about 43. In the biodegradable polyester resin composition, film and molded article according to still another embodiment, Shore D hardness as the hardness may range from about 35 to about 41.

The biodegradable polyester resin composition according to one embodiment may be dried at about 80° C. for about 20 minutes, placed in a stainless steel mold, and compressed at about 210° C. under a pressure of about 10 MPa for about 5 minutes, thereby producing a polyester block having a thickness of about 2.5 mm.

The hardness of the polyester block made of the biodegradable polyester resin composition according to one embodiment may be measured using a durometer.

The biodegradable polyester resin composition according to one embodiment may have appropriate crystallinity due to the above-described composition and/or process. In addition, a film and molded article made of the biodegradable polyester resin composition according to one embodiment may also have appropriate crystallinity.

For example, the biodegradable polyester resin composition according to one embodiment includes a crystallinity regulator. Accordingly, the biodegradable polyester resin composition according to this embodiment may have appropriate crystallinity.

In particular, a chain extension reaction and/or a post-treatment reaction may be performed in the process of preparing the biodegradable polyester resin composition according to one embodiment. Here, the biodegradable polyester resin composition according to this embodiment may have appropriate crystallinity by appropriately applying the crystallinity regulator. For example, when the chain extension reaction and/or the post-treatment reaction are performed, the crystallinity may increase. Here, the crystallinity regulator may appropriately lower the crystallinity.

Accordingly, as described above, a film and molded article made of the biodegradable polyester resin composition according to this embodiment may appropriately maintain mechanical strength within a normal period of use.

For example, the biodegradable polyester resin composition according to one embodiment may have appropriate tensile strength, appropriate elongation at break and/or appropriate hardness.

In addition, even though the biodegradable polyester resin composition according to one embodiment includes aliphatic carboxylic acid in a high content, it may have improved mechanical properties. Accordingly, the biodegradable polyester resin composition according to one embodiment may have both improved mechanical properties and appropriate biodegradability.

In the biodegradable polyester resin composition according to one embodiment, the initial tensile strength, the tensile strength after ultraviolet irradiation, the tensile strength reduction rate, the initial elongation at break, the elongation at break after ultraviolet irradiation and the elongation decrease rate at break may be appropriately controlled by adjusting the process of preparing the biodegradable polyester resin, a ratio of the number of the first block to the number of the second blocks, the reinforcing material, the light stabilizer and the elongation improver.

The biodegradable polyester resin composition according to one embodiment has a low tensile strength reduction rate from the beginning of the ultraviolet rays to 1 day. A film and the like made of the biodegradable polyester resin composition according to one embodiment may be used for general purposes such as packaging. Here, when the biodegradable polyester resin composition according to one embodiment is exposed to ultraviolet rays, the initial tensile strength reduction rate thereof is low. Accordingly, when a film made of the biodegradable polyester resin composition according to this embodiment is exposed to ultraviolet rays within a normal use period, a decrease in the tensile strength thereof is low.

Accordingly, a molded article made of the biodegradable polyester resin composition according to this embodiment may appropriately maintain mechanical strength within a normal period of use.

In addition, when the biodegradable polyester resin composition according to this embodiment is exposed to ultraviolet rays for a long time, a tensile strength reduction rate may be high. For example, the tensile strength reduction rate of the biodegradable polyester resin composition according to one embodiment after 6 days from the beginning of ultraviolet irradiation may be 67% or more.

Accordingly, the biodegradable polyester resin composition according to one embodiment may be easily degraded when exposed to sunlight for a long time after being discarded. A molded article made of the biodegradable polyester resin composition according to one embodiment may be degraded by sunlight as well as biodegradation. In addition, a molded article made of the biodegradable polyester resin composition according to this embodiment may be more efficiently degraded in a natural state because decomposition by sunlight promotes biodegradation. A molded article made of the biodegradable polyester resin composition according to this embodiment may be decomposed by ultraviolet rays or the like even when discarded in the sea.

Therefore, the biodegradable polyester resin composition according to this embodiment may reduce the burden on the global environment, particularly may reduce pollution of the marine ecosystem.

A molded article made of the biodegradable polyester resin composition according to one embodiment may be efficiently decomposed when discarded while maintaining required mechanical properties within an actual use period.

The above contents are described in more detail through the following examples. However, the following examples are only for illustrating the present disclosure, but the present disclosure is not limited thereto.

Preparation Example

Preparation of Pretreated Cellulose Nanocrystals (CNC)

Dry powder-type cellulose nanocrystals (NVC-100, Manufacturer: Celluforce) having a particle size of about 1 µm to about 50 µm were dispersed in water at 1% by weight, and then sonicated at an output of 20000 J/5 for 1 minute using a tip-type ultrasonic disperser, thereby producing pretreated nanocellulose.

Light stabilizer: SUNOVIN 904 (manufactured by SUN-SHOW)
Chain extender: Hexamethylenediisocyanate
Crystallinity regulator: Diisopropyl adipate (DPA), tetrahydrofuran (THF) or cyclopentanone (CPN)

EXAMPLE

Example 1

Preparation of Biodegradable Polyester Resin
First Step: Pretreating to Obtain Slurry As shown in Table 1, pretreated nanocellulose, a light stabilizer, diisopropyl adipate, 1,4-butanediol (1,4-BDO) and terephthalic acid (TPA) were mixed in a molar ratio (1,4-BDO:TPA) of 1.4:1 and fed into a slurry tank (the bottom of the slurry tank was an anchor type, the height to an agitator was 40 mm, and three rotary blades were provided) in a non-catalytic state. Here, D50 of the terephthalic acid (TPA) was 130 µm. The contents of the nanocellulose, the light stabilizer and the elongation improver were wt % based on the total raw materials input.

Next, the mixture was pretreated by stirring at 60° C. and 100 rpm for 1 hour, and a slurry was obtained by phase separation.

Second Step: Obtaining Prepolymer

The slurry obtained in the first step was fed into a reactor through a supply line, and tetrabutyl titanate (Dupont, Tyzor TnBT product) as a titanium-based catalyst was fed at 250 ppm thereinto, followed by performing first esterification at 200° C. under normal pressure for about 1 hour 30 minutes until 95% of by-product water was discharged.

To the reaction product, 52 mol % of 1,4-butanediol (1,4-BDO) based on the total number of moles of diol, 40 mol % of adipic acid (AA) based on the total number of moles of dicarboxylic acid, and tetrabutyl titanate (Dupont, Tyzor TnBT product) as a titanium-based catalyst were added in an amount of 200 ppm based on the total weight of a diol, an aromatic dicarboxylic acid and an aliphatic dicarboxylic acid, and then second esterification was performed at 210° C. under normal pressure for about 2 hours 10 minutes until 95% of by-products was discharged, thereby preparing a prepolymer having a number average molecular weight of 5500 g/mol.

Third Step: Polycondensing

Based on the total weight of the diol, the aromatic dicarboxylic acid and the aliphatic dicarboxylic acid, 150 ppm of tetrabutyl titanate (Dupont, Tyzor TnBT product) as a titanium-based catalyst and 500 ppm of a triethylene phosphate stabilizer were added to the prepolymer obtained in the second step and stabilized for about 10 minutes. Next, the temperature of the reaction mixture was elevated to 250° C., and then a polycondensation reaction was performed at 0.5 Torr for 4 hours, thereby producing a polymer having a number average molecular weight of 55000 g/mol. The polymer was cooled at a rate of 5° C., and then cut using a pellet cutter, thereby obtaining a biodegradable polyester resin pellet.

Examples 2 to 7

As shown in Table 1 below, the contents of adipic acid, dimethyl terephthalate, terephthalic acid, cellulose nanocrystals, a light stabilizer, and additives were varied. In addition, as shown in Table 3, process temperatures and times in first esterification and second esterification were varied. Other processes, except for the contents and the processes, were substantially the same as those of Example 1.

Examples 8 to 14

First Step: Pretreating to Obtain Slurry

As shown in Table 1, pretreated nanocellulose, diisopropyl adipate, tetrahydrofuran, cyclopentanone, 1,4-butanediol (1,4-BDO) and terephthalic acid (TPA) were mixed in a molar ratio (1,4-BDO:TPA) of 1.2:1 and fed into a slurry tank (the bottom of the slurry tank was an anchor type, the height to an agitator was 40 mm, and three rotary blades were provided) in a non-catalytic state. Here, D50 of the terephthalic acid (TPA) was 130 μm.

Next, the mixture was pretreated by stirring at 60° C. and 100 rpm for 1 hour, and a slurry was obtained by phase separation.

In Table 2, the contents of the pretreated nanocellulose, the diisopropyl adipate, the tetrahydrofuran and the cyclopentanone were ppm based on the total weight of the input raw materials.

As shown in Tables 2 and 4 below, the compositions of reactants and process conditions in the first esterification and the second esterification were varied. Other processes, except for the contents and the processes, were substantially the same as those of Example 1.

Comparative Examples 1 to 5

As shown in Tables 1 and 2 below, the contents of adipic acid, dimethyl terephthalate, terephthalic acid, cellulose nanocrystals, a light stabilizer and additives were varied. In addition, as shown in Tables 3 and 4, process temperatures and times in the first esterification and the second esterification were varied. In addition, the esterification was performed without the application of the pretreatment process. Other processes, except for the contents and the processes, were substantially the same as those of Example 1.

Manufacture of Biodegradable Polyester Sheet

After preparing two Teflon sheets, a stainless steel (SUS) mold (area: 12 cm×12 cm) was placed on one Teflon sheet, and about 7 g of the prepared polyester resin pellet was put into the stainless steel (SUS) mold (area: 12 cm×12 cm). Next, the mold was covered with another Teflon sheet, and placed in the center of a hot press (manufacturer: Widlab, model name: WL 1600SA) having a surface size of about 25 cm×25 cm. The mold was maintained at about 210° C. under a pressure of about 10 Mpa for about 3 minutes, and then detached, followed by immediately cooling in water of 20° C. for about 30 seconds. Next, a biodegradable polyester sheet having an area of about 10 cm×10 cm and a thickness of about 300 μm was manufactured.

Manufacture of Biodegradable Polyester Film

After drying the biodegradable polyester resin pellet at 80° C. for 5 hours, melt extrusion was carried out at 160° C. using Blown Film Extrusion Line (Manufacturer: YOOJIN ENGINEERING), thereby manufacturing a biodegradable polyester film having a thickness of 50 μm.

TABLE 1

| Classification | 1,4-BDO (mol %) | TPA (mol %) | adipic acid (mol %) | CNC (wt %) | Light stabilizer (wt %) | DPA (wt %) |
|---|---|---|---|---|---|---|
| Example 1 | 140 | 60 | 40 | 0.9 | | |
| Example 2 | 140 | 55 | 45 | 0.1 | 0.1 | |
| Example 3 | 140 | 53 | 47 | 0.7 | | |
| Example 4 | 140 | 60 | 40 | | 0.3 | |
| Example 5 | 140 | 55 | 45 | | 0.2 | |
| Example 6 | 140 | 53 | 47 | | | 0.01 |
| Example 7 | 140 | 60 | 40 | 0.9 | | 0.01 |
| Comparative Example 1 | 120 | 42 | 58 | | | |
| Comparative Example 2 | 120 | 80 | 20 | | | |
| Comparative Example 3 | 120 | 30 | 70 | | | |

TABLE 2

| Classification | First esterification slurry (parts by weight) | First esterification BDO (parts by weight) | First esterification AA (parts by weight) | Second esterification BDO (parts by weight) | Second esterification AA (parts by weight) | DPA (ppm) | THF (ppm) | CPN (ppm) | CNC (ppm) |
|---|---|---|---|---|---|---|---|---|---|
| Example 8 | 290.4 | 18 | 29.2 | 108 | 146 | 500 | 700 | 600 | 700 |
| Example 9 | 301 | 18 | 29.2 | 108 | 146 | 500 | 700 | 700 | |
| Example 10 | 301 | 27 | 43.8 | 108 | 146 | 500 | 1000 | 1000 | |
| Example 11 | 319.2 | 18 | 29.2 | 108 | 146 | 1000 | 1500 | 1500 | 700 |

TABLE 2-continued

| Classification | First esterification slurry (parts by weight) | First esterification BDO (parts by weight) | First esterification AA (parts by weight) | Second esterification BDO (parts by weight) | Second esterification AA (parts by weight) | DPA (ppm) | THF (ppm) | CPN (ppm) | CNC (ppm) |
|---|---|---|---|---|---|---|---|---|---|
| Example 12 | 290.4 | 27 | 58.8 | 108 | 146 | 1000 | 2000 | 1500 | |
| Example 13 | 290.4 | 9 | 14.6 | 108 | 146 | 1500 | 2000 | 1800 | |
| Example 14 | 319.2 | 36 | 58.4 | 108 | 146 | 1500 | 2000 | 1800 | 700 |
| Comparative Example 4 | 302 | | | 108 | 146 | | | | |
| Comparative Example 5 | 219 | | | 108 | 146 | | | | |

TABLE 3

| Classification | First esterification temperature (° C.) | First esterification time (hours) | Second esterification temperature (° C.) | Second esterification time (hours) | Pre-treatment |
|---|---|---|---|---|---|
| Example 1 | 220 | 1.5 | 240 | 1.5 | ○ |
| Example 2 | 225 | 1.5 | 225 | 2.0 | ○ |
| Example 3 | 220 | 2.0 | 225 | 2.0 | ○ |
| Example 4 | 215 | 2.0 | 230 | 2.0 | ○ |
| Example 5 | 220 | 1.5 | 220 | 2.5 | ○ |
| Example 6 | 220 | 1.5 | 220 | 2.0 | ○ |
| Example 7 | 220 | 2.0 | 215 | 2.0 | ○ |
| Comparative Example 1 | 200 | 2.0 | 205 | 2.0 | X |
| Comparative Example 2 | 200 | 2.0 | 205 | 2.0 | X |
| Comparative Example 3 | 200 | 2.0 | 205 | 2.0 | X |

TABLE 4

| Classification | First esterification temperature (° C.) | First esterification time (hours) | Second esterification temperature (° C.) | Second esterification time (hours) | Pre-treatment |
|---|---|---|---|---|---|
| Example 8 | 220 | 2 | 220 | 2 | ○ |
| Example 9 | 205 | 1.5 | 215 | 2.5 | ○ |
| Example 10 | 200 | 2.0 | 205 | 2.0 | ○ |
| Example 11 | 195 | 2.0 | 210 | 2.0 | ○ |
| Example 12 | 200 | 1.5 | 210 | 2.5 | ○ |
| Example 13 | 200 | 1.5 | 210 | 2.0 | ○ |
| Example 14 | 200 | 2.0 | 205 | 2.0 | ○ |
| Comparative Example 4 | 200 | 2.0 | 205 | 2.0 | X |
| Comparative Example 5 | 200 | 2.0 | 205 | 2.0 | X |

EVALUATION EXAMPLES

Evaluation Example 1: An Average Particle Diameter (D50) and a Standard Deviation <Average Particle Diameter (D50) and Standard Deviation of Aromatic Dicarboxylic Acid>

With regard to a particle size distribution (PSD), the average particle diameter (D50) and standard deviation (SD) of an aromatic dicarboxylic acid (TPA or DMT) were obtained using a particle size analyzer Microtrac S3500 (Microtrac Inc) according to the following conditions:

Use Environment

Temperature: 10 to 35° C., humidity: 90% RH, non-condensing maximum

D50 and SD, which are average particle size distributions for each section, were measured.

The standard deviation means the square root of the variance and may be calculated using software.

<Particle Diameter of Nanocellulose>

The particle size and average particle deviation of nanocellulose were measured using the principle of dynamic light scattering (DLS) at 25° C. and a measurement angle of 175° using Zetasizer Nano ZS (Manufacturer: Marven). Here, a peak value derived through the polydispersity index (PdI) in a confidence interval of 0.5 was measured as a particle diameter.

Evaluation Example 2: Tensile Strength and Elongation at Break

The biodegradable polyester sheet having a thickness of about 300 μm manufactured in each of the examples and the comparative examples was cut based on ASTM D638 V-type to produce a specimen, and then tested at a tensile speed of 100 mm/min by means of a universal testing machine (UTM, model name 4206-001) manufactured by INSTRON, followed by measuring a tensile strength (kgf/mm$^2$=9.8 Mpa) and an elongation at break using a program built in the equipment.

Evaluation Example 3: QUV Test

The polyester sheet (thickness: about 300 μm) was continuously irradiated at an intensity of about 0.75 W/m$^2$ with ultraviolet rays from a UVA 340 ultraviolet light lamp. After a certain time had elapsed, a tensile strength and an elongation at break were measured.

In addition, the polyester sheet (thickness: about 300 μm) was continuously irradiated at an intensity of about 0.35 W/m$^2$ with the ultraviolet rays from a UVA 340 ultraviolet light lamp. After a certain time had elapsed, a tensile strength and an elongation at break were measured.

Evaluation Example 4: Molecular Weight Reduction Rate

Flakes (about 3 cm×3 cm) produced from the biodegradable polyester resin sheet manufactured in each of the examples and the comparative examples were mixed with compost (Manufacturer: Taeheung F&G, Product Name: Jisaengto (by-product fertilizer grade 1 compost), Compost components: 40 wt % of pig manure, 15 wt % of chicken manure, 37 wt % of sawdust, 5 wt % of zeolite, a microbial agent 3 wt %), and subjected to a biodegradation acceleration test at 60° C. and a humidity of 90%. In the polyester resin compositions of the examples and the comparative examples, a number average molecular weight after 63 days had elapsed was measured using gel permeation chromatography (GPC). A molecular weight reduction rate was derived by dividing a difference between the initial number average molecular weight and the number average molecular weight after a certain period by the initial number average molecular weight.

GPC equipment and measurement conditions were as follows:

Sample pretreatment: 0.035 mg of PBAT chip was dissolved in 1.5 ml of THF
Measurement apparatus: e2695 manufactured by Waters
Flow rate: 1 ml/min in THF
Flow amount: 50 µℓ
Column temperature: 40° C.
Detector: ELSD
Column: Styragel Column HR 5E, HR4, HR2

[Equation 3]

$$\text{Molecular weight reduction rate (\%)} = \frac{\text{Initial number average molecular weight} - \text{number average molecular weight after 63 days}}{\text{Initial number average molecular weight}} \times 100$$

Evaluation Example 5: Biodegradability

With respect to the samples of the examples and the comparative examples, the generation amount of carbon dioxide was measured according to KS M3100-1 to determine a biodegradability. Specifically, an inoculum container containing only compost prepared in a compost factory was prepared, and a test container in which a film was added in an amount of 5% by weight of the dry weight of the compost to the compost was prepared. Next, the container was incubated for 180 days under conditions of 58±2° C., a moisture content ranging from 50% and an oxygen concentration of 6% or more, and carbon dioxide generated in each container was collected and titrated with an aqueous solution of phenolphthalein to measure the amount of carbon dioxide generated in each container. A biodegradability was calculated according to Equation 3 below using the measured carbon dioxide generation amounts:

[Equation 4]

$$\text{Biodegradability (\%)} = \frac{\text{Amount of } CO_2 \text{ generated from test container} - \text{Amount of } CO_2 \text{ generated from inoculum container}}{\text{Theoretical } CO_2 \text{ generation amount of biodegradable resin}} \times 100$$

Evaluation Example 6: Nuclear Magnetic Resonance Spectroscopy

About 5 mg of a sample was prepared from each of the biodegradable polyester resin compositions of the examples and the comparative examples, and the sample was dissolved in a NMR solvent CDCl3. Next, the $^1$H-NMR of the solution was analyzed using a nuclear magnetic resonance (NMR) instrument (company JEOL, 500 MHz, 90° pulse) at room temperature. Next, in the obtained NMR data, the peaks of the terephthalic acid, the adipic acid and the 1,4-butanediol were integrated.

Apparatus: JNM-LA3000 manufactured by JEOL
Pulse: 90°
Repeat time: 4 sec
Number of integrations: 8 measurements
Temperature: 25° C.

Evaluation Example 7: Tensile Strength and Elongation at Break

The biodegradable polyester sheet having a thickness of about 300 µm manufactured in each of the examples and the comparative examples was cut based on ASTM D638 V-type to produce a specimen, and then tested at a tensile speed of 100 mm/min by means of a universal testing machine (UTM, model name 4206-001) manufactured by INSTRON, followed by measuring a tensile strength ($kgf/mm^2$=9.8 Mpa) and an elongation at break using a program built in the equipment.

Evaluation Example 8: Shore D Hardness

The hardness of the polyester block was measured using a Shore hardness tester (SAUTER® Digital Professional Shore Hardness Tester). Next, the polyester block was cut into a size of about 3 cm×3 cm, and the hardness of the polyester block was measured by means of the Shore hardness tester.

Evaluation Example 9: Crystallinity

Using a differential scanning calorimeter (DSC, TA instrument Q500), 4 mg of a sample was sampled in an Al pan, heated from 40° C. to 180° C. at a rate of 10° C./min, and then isothermally heated for 5 minutes to perform a first thermal history removal process, and cooled from 180° C. to −50° C. at a rate of 10° C./min to perform an isothermal cooling process for 5 minutes. Next, changes in the calorific value of endotherm and exotherm of the biodegradable polyester resin were measured while raising the temperature from −50° C. to 180° C. at a heating rate of 10 V° C./min. As in Equation 12, the measured melting enthalpy was divided by 114 J/g and multiplied by 100 to determine the crystallinity.

As in Table 5 below, an initial tensile strength and a tensile strength after a certain period were measured by QUV test at an intensity of about 0.75 W/m².

TABLE 5

| Classification | Initial tensile strength (MPa) | Tensile strength (MPa) after 1 day | Tensile strength (MPa) after 3 days | Tensile strength (MPa) after 6 days | Tensile strength (MPa) after 7 days |
|---|---|---|---|---|---|
| Example 1 | 50.9 | 34.1 | 15.9 | 9 | 9.1 |
| Example 2 | 42.4 | 32 | 17.3 | 11.5 | 11.5 |
| Example 3 | 44.2 | 35.6 | 18.3 | 11.3 | 11.5 |
| Example 4 | 45.2 | 33.7 | 15.8 | 9.4 | 9.3 |

TABLE 5-continued

| Classification | Initial tensile strength (MPa) | Tensile strength (MPa) after 1 day | Tensile strength (MPa) after 3 days | Tensile strength (MPa) after 6 days | Tensile strength (MPa) after 7 days |
|---|---|---|---|---|---|
| Example 5 | 42.9 | 31.5 | 15.9 | 10.6 | 10.5 |
| Example 6 | 41.8 | 26.5 | 13.2 | 9 | 8.9 |
| Example 7 | 49.5 | 33.5 | 18.6 | 11.4 | 11.4 |
| Comparative Example 1 | 42.8 | 24.4 | 12 | 9.5 | 9.6 |
| Comparative Example 2 | 41.4 | 23.3 | 13 | 10.3 | 10.1 |
| Comparative Example 3 | 43.7 | 26.1 | 12.5 | 10.1 | 10 |

As shown in Table 6 below, tensile strength reduction rates after a certain period were derived by QUV test at an intensity of about 0.75 W/m².

TABLE 6

| Classification | Tensile strength reduction rate (%) after 1 day | Tensile strength reduction rate (%) after 3 days | Tensile strength reduction rate (%) after 6 days | Tensile strength reduction rate (%) after 7 days |
|---|---|---|---|---|
| Example 1 | 33 | 69 | 82 | 82 |
| Example 2 | 25 | 59 | 73 | 73 |
| Example 3 | 19 | 59 | 74 | 74 |
| Example 4 | 25 | 65 | 79 | 79 |
| Example 5 | 27 | 63 | 75 | 76 |
| Example 6 | 37 | 68 | 78 | 79 |
| Example 7 | 32 | 62 | 77 | 77 |
| Comparative Example 1 | 43 | 72 | 78 | 78 |
| Comparative Example 2 | 44 | 69 | 75 | 76 |
| Comparative Example 3 | 40 | 71 | 77 | 77 |

As shown in Table 7 below, an initial elongation at break and an elongation at break after a certain period were measured by QUV test at an intensity of about 0.75 W/m².

TABLE 7

| Classification | Initial elongation at break (%) | Elongation at break (%) after 1 day | Elongation at break (%) after 3 days | Elongation at break (%) after 6 days | Elongation at break (%) after 7 days |
|---|---|---|---|---|---|
| Example 1 | 1021 | 786 | 388 | 89 | 62 |
| Example 2 | 852 | 657 | 361 | 55 | 37 |
| Example 3 | 868 | 725 | 393 | 53 | 38 |
| Example 4 | 937 | 693 | 365 | 74 | 51 |
| Example 5 | 887 | 714 | 381 | 65 | 41 |
| Example 6 | 873 | 797 | 365 | 58 | 45 |
| Example 7 | 1037 | 765 | 375 | 59 | 36 |
| Comparative Example 1 | 890 | 619 | 261 | 48 | 44 |
| Comparative Example 2 | 920 | 631 | 290 | 51 | 47 |
| Comparative Example 3 | 897 | 617 | 271 | 53 | 50 |

As shown in Table 8 below, an elongation decrease rate at break after a certain period was derived by QUV test at an intensity of about 0.35 W/m².

TABLE 8

| Classification | Elongation decrease rate at break (%) after 1 day | Elongation decrease rate at break (%) after 3 day | Elongation decrease rate at break (%) after 6 day | Elongation decrease rate at break (%) after 7 day |
|---|---|---|---|---|
| Example 1 | 23 | 62 | 91 | 94 |
| Example 2 | 23 | 58 | 94 | 96 |
| Example 3 | 16 | 55 | 94 | 96 |
| Example 4 | 26 | 61 | 92 | 95 |
| Example 5 | 20 | 57 | 93 | 95 |
| Example 6 | 9 | 58 | 93 | 95 |
| Example 7 | 26 | 64 | 94 | 97 |
| Comparative Example 1 | 30 | 71 | 95 | 95 |
| Comparative Example 2 | 31 | 68 | 94 | 95 |
| Comparative Example 3 | 31 | 70 | 94 | 94 |

As shown in Table 9 below, an initial tensile strength and a tensile strength after a certain period were measured by QUV test at an intensity of about 0.35 W/m².

TABLE 9

| Classification | Initial tensile strength (MPa) | Tensile strength (MPa) after 1 day | Tensile strength after 2 days (MPa) | Tensile strength (MPa) after 3 days | Tensile strength (MPa) after 7 days | Tensile strength (MPa) after 9 days |
|---|---|---|---|---|---|---|
| Example 1 | 50.9 | 43.8 | 30.1 | 26.1 | 15.6 | 11.3 |
| Example 2 | 42.4 | 36.5 | 27.5 | 21.5 | 11.2 | 9.7 |
| Example 3 | 44.2 | 35.4 | 28.6 | 22.3 | 12.7 | 10.5 |
| Example 4 | 45.2 | 42.7 | 29.6 | 22.8 | 12.5 | 9.4 |
| Example 5 | 42.9 | 36.8 | 29.8 | 25.3 | 14.4 | 12.1 |
| Example 6 | 41.8 | 37.6 | 28.5 | 23.2 | 14.5 | 12.1 |
| Example 7 | 49.5 | 41.3 | 31.3 | 27.1 | 14.9 | 12.7 |
| Comparative Example 1 | 42.8 | 29 | 22 | 16 | 10.1 | 9.7 |
| Comparative Example 2 | 41.4 | 27 | 20 | 17 | 10.2 | 9.8 |
| Comparative Example 3 | 43.7 | 28 | 20.5 | 16.3 | 9.9 | 9.6 |

As shown in Table 10 below, a tensile strength reduction rate after a certain period was derived by QUV test at an intensity of about 0.35 W/m².

TABLE 10

| Classification | Tensile strength reduction rate (%) after 1 day | Tensile strength reduction rate (%) after 2 days | Tensile strength reduction rate (%) after 3 days | Tensile strength reduction rate (%) after 7 days | Tensile strength reduction rate (%) after 9 days |
| --- | --- | --- | --- | --- | --- |
| Example 1 | 14 | 41 | 49 | 69 | 78 |
| Example 2 | 14 | 35 | 49 | 74 | 77 |
| Example 3 | 20 | 35 | 50 | 71 | 76 |
| Example 4 | 06 | 35 | 50 | 72 | 79 |
| Example 5 | 14 | 31 | 41 | 66 | 72 |
| Example 6 | 10 | 32 | 44 | 65 | 71 |
| Example 7 | 17 | 37 | 45 | 70 | 74 |
| Comparative Example 1 | 32 | 49 | 63 | 76 | 77 |
| Comparative Example 2 | 35 | 52 | 59 | 75 | 76 |
| Comparative Example 3 | 36 | 53 | 63 | 77 | 78 |

As shown in Table 11 below, an initial elongation at break and an elongation at break after a certain period were measured by QUV test at an intensity of about 0.35 W/m².

TABLE 11

| Classification | Initial elongation at break (%) | Elongation at break (%) after 1 day | Elongation at break (%) after 2 days | Elongation at break (%) after 3 days | Elongation at break (%) after 7 days | Elongation at break (%) after 9 days |
| --- | --- | --- | --- | --- | --- | --- |
| Example 1 | 1021 | 903 | 789 | 610 | 333 | 132 |
| Example 2 | 852 | 735 | 643 | 574 | 312 | 65 |
| Example 3 | 868 | 741 | 665 | 532 | 321 | 111 |
| Example 4 | 937 | 897 | 770 | 596 | 323 | 124 |
| Example 5 | 887 | 765 | 635 | 560 | 315 | 40 |
| Example 6 | 873 | 838 | 623 | 525 | 320 | 69 |
| Example 7 | 1037 | 896 | 781 | 607 | 331 | 121 |
| Comparative Example 1 | 890 | 710 | 564 | 495 | 61 | 41 |
| Comparative Example 2 | 920 | 708 | 575 | 505 | 52 | 45 |
| Comparative Example 3 | 897 | 693 | 574 | 493 | 74 | 43 |

As shown in Table 12 below, an elongation decrease rate at break after a certain period was derived by QUV test at an intensity of about 0.35 W/m².

TABLE 12

| Classification | Elongation decrease rate at break (%) after 1 day | Elongation decrease rate at break (%) after 2 day | Elongation decrease rate at break (%) after 3 day | Elongation decrease rate at break (%) after 7 day | Elongation decrease rate at break (%) after 9 day |
| --- | --- | --- | --- | --- | --- |
| Example 1 | 12 | 23 | 40 | 67 | 87 |
| Example 2 | 14 | 25 | 33 | 63 | 92 |
| Example 3 | 15 | 23 | 39 | 63 | 87 |
| Example 4 | 4 | 18 | 36 | 66 | 87 |
| Example 5 | 14 | 28 | 37 | 64 | 95 |
| Example 6 | 4 | 29 | 40 | 63 | 92 |
| Example 7 | 14 | 25 | 41 | 68 | 88 |
| Comparative Example 1 | 20 | 37 | 44 | 93 | 95 |
| Comparative Example 2 | 23 | 38 | 45 | 94 | 95 |
| Comparative Example 3 | 23 | 36 | 45 | 92 | 95 |

As shown in Table 13 below, a molecular weight reduction rate and a biodegradability were derived.

TABLE 13

| Classification | Molecular weight reduction rate (%) | Biodegradability (%) |
| --- | --- | --- |
| Example 1 | 90 | 90 |
| Example 2 | 91 | 91 |
| Example 3 | 91 | 90 |
| Example 4 | 90 | 90 |
| Example 5 | 91 | 90 |
| Example 6 | 90 | 90 |
| Example 7 | 92 | 91 |
| Comparative Example 1 | 90 | 90 |
| Comparative Example 2 | 91 | 90 |
| Comparative Example 3 | 89 | 89 |

As shown in Table 14 below, the biodegradability of each of the examples and the comparative examples was measured.

TABLE 14

| Classification | Molecular weight reduction rate (%) after 7 days | Molecular weight reduction rate (%) after 14 days | Molecular weight reduction rate (%) after 21 days | Molecular weight reduction rate (%) after 28 days | Molecular weight reduction rate (%) after 42 days | Molecular weight reduction rate (%) after 63 days |
|---|---|---|---|---|---|---|
| Example 8 | 54 | 52 | 71 | 78 | 87 | 91 |
| Example 9 | 52 | 63 | 71 | 78 | 88 | 90 |
| Example 10 | 52 | 61 | 70 | 78 | 88 | 91 |
| Example 11 | 52 | 61 | 70 | 78 | 87 | 91 |
| Example 12 | 57 | 64 | 71 | 79 | 86 | 91 |
| Example 13 | 52 | 62 | 70 | 78 | 86 | 90 |
| Example 14 | 53 | 61 | 70 | 79 | 87 | 91 |
| Comparative Example 4 | 46 | 52 | 65 | 74 | 82 | 85 |
| Comparative Example 5 | 60 | 64 | 76 | 83 | 89 | 92 |

As shown in Table 15 below, a hydrolysis degree was measured.

TABLE 15

| Classification | Molecular weight reduction rate (%) after 7 days | Molecular weight reduction rate (%) after 14 days | Molecular weight reduction rate (%) after 21 days | Molecular weight reduction rate (%) after 28 days | Molecular weight reduction rate (%) after 42 days | Molecular weight reduction rate (%) after 63 days |
|---|---|---|---|---|---|---|
| Example 8 | 47 | 87 | 94 | 95 | 97 | 97 |
| Example 9 | 52 | 89 | 94 | 96 | 97 | 97 |
| Example 10 | 57 | 87 | 94 | 96 | 97 | 97 |
| Example 11 | 47 | 87 | 94 | 95 | 96 | 97 |
| Example 12 | 51 | 88 | 94 | 96 | 97 | 97 |
| Example 13 | 58 | 89 | 94 | 96 | 97 | 97 |
| Example 14 | 49 | 87 | 94 | 96 | 97 | 97 |
| Comparative Example 4 | 45 | 86 | 93 | 95 | 96 | 96 |
| Comparative Example 5 | 65 | 90 | 95 | 97 | 97 | 97 |

As shown in Table 16 below, peaks by $^1$H-NMR and the areas of the peaks were measured.

TABLE 16

| Classification | 8.085 ppm | 4.423 ppm | 4.366 ppm | 4.148 ppm | 4.078 ppm | 2.324 ppm | 1.963 ppm | 1.84 ppm | 1.806 ppm | 1.681 ppm | 1.648 ppm |
|---|---|---|---|---|---|---|---|---|---|---|---|
| Example 8 | 1 | 0.47 | 0.50 | 0.5 | 0.54 | 1.04 | 0.45 | 0.51 | 0.55 | 0.54 | 1.06 |
| Example 9 | 1 | 0.47 | 0.53 | 0.52 | 0.57 | 1.07 | 0.48 | 0.53 | 0.55 | 0.57 | 1.05 |
| Example 10 | 1 | 0.48 | 0.51 | 0.51 | 0.54 | 1.06 | 0.48 | 0.51 | 0.50 | 0.54 | 1.11 |
| Example 11 | 1 | 0.46 | 0.51 | 0.52 | 0.54 | 1.11 | 0.47 | 0.52 | 0.49 | 0.54 | 1.08 |
| Example 12 | 1 | 0.47 | 0.52 | 0.52 | 0.58 | 1.10 | 0.46 | 0.54 | 0.56 | 0.57 | 1.07 |
| Example 13 | 1 | 0.46 | 0.50 | 0.52 | 0.56 | 1.06 | 0.47 | 0.52 | 0.50 | 0.54 | 1.10 |
| Example 14 | 1 | 0.46 | 0.53 | 0.52 | 0.57 | 1.08 | 0.45 | 0.53 | 0.55 | 0.56 | 1.09 |
| Comparative Example 4 | 1 | 0.73 | 0.31 | 0.32 | 0.38 | 0.72 | 0.74 | 0.32 | 0.31 | 0.38 | 0.73 |
| Comparative Example 5 | 1 | 0.26 | 0.67 | 0.66 | 0.63 | 1.34 | 0.36 | 0.68 | 0.67 | 0.63 | 1.35 |

As shown in Table 17 below, an alternating degree, a tensile strength, an elongation at break, a crystallinity and a hardness were derived.

TABLE 17

| Classification | Tensile strength (MPa) | Elongation at break (%) | Alternating degree | Sheet crystallinity (%) | Film crystallinity (%) | Molded article crystallinity (%) | Shore D hardness |
|---|---|---|---|---|---|---|---|
| Example 8 | 46.3 | 905 | 0.5 | 12.6 | 12.7 | 12.6 | 38.1 |
| Example 9 | 44.6 | 897 | 0.502 | 12.8 | 12.9 | 12.7 | 39.2 |
| Example 10 | 44.3 | 1002 | 0.507 | 13.1 | 13.3 | 13.2 | 37.8 |
| Example 11 | 45.8 | 965 | 0.497 | 12.5 | 12.8 | 12.6 | 38.3 |
| Example 12 | 46.2 | 885 | 0.5 | 13.2 | 13.2 | 13.2 | 38.4 |
| Example 13 | 45.5 | 934 | 0.5 | 12.7 | 12.9 | 12.8 | 37.9 |
| Example 14 | 45.9 | 878 | 0.507 | 12.6 | 12.9 | 12.8 | 38.1 |
| Comparative Example 4 | 43.8 | 835 | 0.357 | 15.9 | 16.8 | 16.3 | 40.3 |
| Comparative Example 5 | 42.8 | 824 | 0.601 | 16.8 | 16.9 | 16.7 | 41.3 |

As shown in Tables 5 to 13, the biodegradable polyester resin compositions according to the examples had a low tensile strength reduction rate and a low elongation decrease rate at break 1 day after ultraviolet irradiation.

In addition, the biodegradable polyester resin compositions according to the examples had a high tensile strength reduction rate and a high elongation decrease rate at break 7 days after ultraviolet irradiation or 9 days after the ultraviolet irradiation.

In addition, the biodegradable polyester resin compositions according to the examples had a high molecular weight reduction rate and a high biodegradability.

In addition, as shown in Tables 14 to 17, the biodegradable polyester resin compositions according to the examples may have an adequate initial hydrolysis degree and a high later hydrolysis degree. In addition, the biodegradable polyester resin compositions according to the examples may have a high biodegradability degree while having appropriate mechanical strength.

A biodegradable molded article, biodegradable polyester resin composition and biodegradable polyester film according to the disclosed embodiments has a low tensile strength reduction rate from the beginning of ultraviolet rays to 1 day. That is, when the biodegradable molded article, biodegradable polyester resin composition and biodegradable polyester film according to the disclosed embodiments is exposed to ultraviolet rays, the initial tensile strength reduction rate thereof is low. Accordingly, the biodegradable molded article and biodegradable polyester film according to one embodiment have a low decrease in tensile strength when exposed to ultraviolet rays within a normal use period.

Accordingly, the biodegradable molded article and biodegradable film according to one embodiment can appropriately maintain mechanical strength within a normal period of use.

In addition, the biodegradable molded article, biodegradable polyester resin composition and film according to one embodiment can exhibit a high tensile strength reduction rate when exposed to ultraviolet rays for a long time. For example, in the biodegradable molded article, polyester resin composition and biodegradable film according to the disclosed embodiments in the examples, a tensile strength reduction rate after 6 days from the beginning of ultraviolet irradiation may be 67% or more.

Accordingly, the biodegradable molded article, biodegradable polyester resin composition and biodegradable film according to the disclosed embodiments can be degraded when exposed to sunlight for a long time after being discarded. The biodegradable molded article, biodegradable polyester resin composition and biodegradable film according to one embodiment can be degraded by sunlight as well as biodegradation. In addition, a molded article made of the biodegradable polyester resin composition according to one embodiment can be more efficiently degraded in a natural state because decomposition by sunlight promotes biodegradation. The biodegradable molded article and biodegradable film according to one embodiment can be decomposed by ultraviolet rays or the like even when discarded in the sea.

Therefore, the biodegradable molded article, biodegradable polyester resin composition and biodegradable polyester film according to the disclosed embodiments can reduce the burden on the global environment, particularly can reduce pollution of the marine ecosystem.

For example, the biodegradable polyester resin composition according to one embodiment can include a crystallinity regulator. Accordingly, the biodegradable polyester resin composition according to one embodiment can have appropriate crystallinity.

In particular, a chain extension reaction and/or a post-treatment reaction can be performed in the process of preparing the biodegradable polyester resin composition according to one embodiment. Here, the biodegradable polyester resin composition according to this embodiment can have appropriate crystallinity by appropriately applying the crystallinity regulator. For example, when the chain extension reaction and/or the post-treatment reaction are performed, the crystallinity can increase. Here, the crystallinity regulator can appropriately lower the crystallinity.

Accordingly, a molded article made of the biodegradable polyester resin composition according to one embodiment can appropriately maintain mechanical strength within a normal period of use.

For example, the biodegradable polyester resin composition according to this embodiment can have appropriate tensile strength, appropriate elongation at break and/or appropriate hardness.

In addition, even though the biodegradable polyester resin composition according to one embodiment includes aliphatic carboxylic acid in a high content, it can have improved mechanical properties. Accordingly, the biodegradable polyester resin composition according to this embodiment can have both improved mechanical properties and appropriate biodegradability.

A molded article made of the biodegradable polyester resin composition according to one embodiment can be efficiently decomposed when discarded while maintaining required mechanical properties within an actual use period.

Although the preferred embodiments of the present disclosure have been disclosed for illustrative purposes, those skilled in the art will appreciate that various modifications, additions and substitutions are possible, without departing from the scope of the disclosure.

DESCRIPTION OF SYMBOLS slurry stirrer 100
esterification part 200
polycondensation reaction part 300
post-treatment part 400
first recovery part 510
second recovery part 520

What is claimed is:

1. A biodegradable molded article, comprising: a polyester resin comprising a diol, an aromatic dicarboxylic acid and an aliphatic dicarboxylic acid, wherein, when irradiated with ultraviolet rays from a UVA 340 ultraviolet light lamp at an intensity of 0.75 W/m2, a tensile strength decrease rate from a beginning of the ultraviolet irradiation to 1 day ranges from 5% to 40% based on a thickness of 300 μm of the molded article, wherein an alternating ratio of the polyester resin ranges from 0.37 to 0.59, wherein the alternating ratio is a ratio of a diol quantity, bonded between the aromatic dicarboxylic acid and the aliphatic dicarboxylic acid, to a total quantity of diols in the polyester resin, wherein the polyester resin include the following bonding structures:

| | |
|---|---|
| Aromatic dicarboxylic acid-diol-aliphatic dicarboxylic acid- | [Bonding Structure 1] |
| Aromatic dicarboxylic acid-diol-aromatic dicarboxylic acid- | [Bonding Structure 2] |
| Aliphatic dicarboxylic acid-diol-aliphatic dicarboxylic acid-, | [Bonding Structure 3] | wherein the alternating ratio is calculated according to Equation 1 below:

$$\text{Alternating ratio} = \frac{DM1}{DM1 + DM2 + DM3} \quad \text{[Equation 1]}$$

where DM1 is a molar ratio of a diol included in Bonding Structure 1, DM2 is a molar ratio of a diol included in Bonding Structure 2, and DM3 is a molar ratio of a diol included in Bonding Structure 3, wherein an initial tensile strength ranges from 40 MPa to 60 MPa, and a tensile strength after 7 days ranges from 1 MPa to 15 MPa, wherein the biodegradable molded article comprises a crystallinity regulator, wherein the crystallinity regulator comprises diisopropyl adipate, wherein the crystallinity regulator further comprises tetrahydrofuran.

2. The biodegradable molded article according to claim 1, comprising nanocellulose that has an average diameter ranging from 0.5 nm to 10 nm and an average length ranging from 20 nm to 300 nm and that comprises a metal.

3. The biodegradable molded article according to claim 1, comprising a light stabilizer that has a weight average molecular weight ranging from 1800 g/mol to 5000 g/mol.

4. A biodegradable polyester resin composition, comprising: a polyester resin comprising a diol, an aromatic dicarboxylic acid and an aliphatic dicarboxylic acid, wherein, when continuously irradiated with ultraviolet rays from a UVA 340 ultraviolet light lamp at an intensity of 0.75 W/m$^2$, a tensile strength decrease rate from a beginning of the ultraviolet irradiation to 1 day ranges from 5% to 40%, wherein the tensile strength decrease rate is measured by the method below:

in the measurement method, the biodegradable polyester resin composition is dried at 80° C., placed in a stainless steel mold, and compressed at 210° C. under a pressure of 10 MPa for 3 minutes to produce a polyester sheet having a thickness of 300 μm, and the tensile strength decrease rate is obtained by dividing a difference between an initial tensile strength of the polyester sheet and a tensile strength after ultraviolet irradiation of the polyester sheet by the initial tensile strength, wherein an alternating ratio of the polyester resin ranges from 0.37 to 0.59, wherein the alternating ratio is a ratio of a diol quantity, bonded between the aromatic dicarboxylic acid and the aliphatic dicarboxylic acid, to a total quantity of diols in the polyester resin, wherein the polyester resin include the following bonding structures:

| | |
|---|---|
| Aromatic dicarboxylic acid-diol-aliphatic dicarboxylic acid- | [Bonding Structure 1] |
| Aromatic dicarboxylic acid-diol-aromatic dicarboxylic acid- | [Bonding Structure 2] |
| Aliphatic dicarboxylic acid-diol-aliphatic dicarboxylic acid-, | [Bonding Structure 3] | wherein the alternating ratio is calculated according to Equation 1 below:

$$\text{Alternating ratio} = \frac{DM1}{DM1 + DM2 + DM3} \quad \text{[Equation 1]}$$

where DM1 is a molar ratio of a diol included in Bonding Structure 1, DM2 is a molar ratio of a diol included in Bonding Structure 2, and DM3 is a molar ratio of a diol included in Bonding Structure 3, wherein the initial tensile strength ranges from 40 MPa to 60 MPa, and a tensile strength after 7 days ranges from 1 MPa to 15 MPa, wherein the biodegradable molded article comprises a crystallinity regulator, wherein the crystallinity regulator comprises diisopropyl adipate, wherein the crystallinity regulator further comprises tetrahydrofuran.

5. The biodegradable polyester resin composition according to claim 4, wherein the tensile strength decrease rate from the beginning of the ultraviolet irradiation to 3 days is 40% to 65%.

6. The biodegradable polyester resin composition according to claim 4, wherein the tensile strength decrease rate from the beginning of the ultraviolet irradiation to 6 days is 67% or more.

7. The biodegradable polyester resin composition according to claim 4, wherein, when irradiated with the ultraviolet rays at an intensity of 0.35 W/m2, the tensile strength decrease rate from the beginning of the ultraviolet irradiation to 1 day is 1% to 20%.

8. The biodegradable polyester resin composition according to claim 7, wherein, when irradiated with the ultraviolet rays at an intensity of 0.35 W/m2, the tensile strength decrease rate from the beginning of the ultraviolet irradiation to 9 days is 65% or more.

9. The biodegradable polyester resin composition according to claim 4, wherein an elongation decrease rate at break from the beginning of the ultraviolet irradiation to 1 day ranges from 5% to 40%, and the elongation decrease rate at break from the beginning of the ultraviolet irradiation to 7 days is 80% or more.

10. The biodegradable polyester resin composition according to claim 4, wherein, when irradiated with the ultraviolet rays at an intensity of 0.35 W/m2, an elongation decrease rate at break from the beginning of the ultraviolet irradiation to 1 day ranges from 1% to 20%, and
the elongation decrease rate at break from the beginning of the ultraviolet irradiation to 9 days is 80% or more.

11. A biodegradable polyester resin composition, comprising:
a polyester resin comprising a diol, an aromatic dicarboxylic acid and an aliphatic dicarboxylic acid; and
a crystallinity regulator,
wherein the biodegradable polyester resin composition has a crystallinity ranging from 10% to 15%,
wherein an alternating ratio of the polyester resin ranges from 0.37 to 0.59,
wherein the alternating ratio is a ratio of a diol quantity, bonded between the aromatic dicarboxylic acid and the aliphatic dicarboxylic acid, to a total quantity of diols in the polyester resin,
wherein the polyester resin include the following bonding structures:

Aromatic dicarboxylic acid-diol-aliphatic
  dicarboxylic acid-          [Bonding Structure 1]

Aromatic dicarboxylic acid-diol-aromatic
  dicarboxylic acid-          [Bonding Structure 2]

Aliphatic dicarboxylic acid-diol-aliphatic
  dicarboxylic acid-,         [Bonding Structure 3]

wherein the alternating ratio is calculated according to Equation 1 below:

$$\text{Alternating ratio} = \frac{DM1}{DM1 + DM2 + DM3} \quad \text{[Equation 1]}$$

where DM1 is a molar ratio of a diol included in Bonding Structure 1, DM2 is a molar ratio of a diol included in Bonding Structure 2, and DM3 is a molar ratio of a diol included in Bonding Structure 3,
wherein the crystallinity regulator comprises diisopropyl adipate,
wherein the crystallinity regulator further comprises tetrahydrofuran.

12. The biodegradable polyester resin composition according to claim 11, wherein the diisopropyl adipate is comprised in a content ranging from 10 ppm to 10000 ppm based on a weight of the polyester resin.

13. The biodegradable polyester resin composition according to claim 11, wherein the biodegradable polyester resin composition has a tensile strength ranging from 40 MPa to 60 MPa,
wherein the tensile strength is measured by the measurement method below:
in the measurement method, the biodegradable polyester resin composition is dried at 80° C., placed in a stainless steel mold, and compressed at 210° C. under a pressure of 10 MPa for 3 minutes to produce a polyester sheet having a thickness of 300 μm, and the tensile strength of the polyester sheet is measured.

14. The biodegradable polyester resin composition according to claim 13, wherein the biodegradable polyester resin composition has an elongation at break ranging from 800% to 1200%,
wherein the elongation at break is measured by the measurement method below:
in the measurement method, the elongation at break of the polyester sheet is measured.

15. The biodegradable polyester resin composition according to claim 14, wherein the biodegradable polyester resin composition has a Shore D hardness of 30 to 45,
wherein the Shore D hardness is measured by the measurement method below:
in the measurement method, the biodegradable polyester resin composition is dried at 80° C., placed in a stainless steel mold, and compressed at 210° C. under a pressure of 10 MPa for 3 minutes to manufacture a polyester block having a thickness of 2.5 mm, and the Shore D hardness of the polyester block is measured.

16. The biodegradable polyester resin composition according to claim 11, wherein a weight ratio of the diisopropyl adipate to the tetrahydrofuran ranges from 1:1 to 1:5.

* * * * *